United States Patent
Ishizaka

(10) Patent No.: US 8,269,857 B2
(45) Date of Patent: Sep. 18, 2012

(54) IMAGE PROCESSING DEVICE, IMAGING APPARATUS, IMAGE-PROCESSING METHOD, AND PROGRAM FOR FACE DETECTION, DISCRIMINATION AND FILE ENTRY CORRELATION

(75) Inventor: Toshihiro Ishizaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 507 days.

(21) Appl. No.: 12/511,600

(22) Filed: Jul. 29, 2009

(65) Prior Publication Data

US 2010/0026842 A1 Feb. 4, 2010

(30) Foreign Application Priority Data

Aug. 4, 2008 (JP) ................................ 2008-201295

(51) Int. Cl.
*H04N 5/76* (2006.01)

(52) U.S. Cl. .............. 348/231.2; 348/208.14; 348/222.1
(58) Field of Classification Search .................. 348/169, 348/208.14, 222.1, 231.2, 231.3
See application file for complete search history.

(56) References Cited

U.S. PATENT DOCUMENTS

| 2006/0161588 A1* | 7/2006 | Nomoto ..................... 707/104.1 |
| 2009/0016576 A1* | 1/2009 | Goh et al. ..................... 382/118 |
| 2009/0087038 A1* | 4/2009 | Okada et al. ................. 382/118 |
| 2010/0026842 A1* | 2/2010 | Ishizaka ..................... 348/231.2 |

FOREIGN PATENT DOCUMENTS

| JP | 2002-223412 | 8/2002 |
| JP | 2004-336466 | 11/2004 |
| JP | 2008-17042 | 1/2008 |

* cited by examiner

*Primary Examiner* — Gevell Selby
(74) *Attorney, Agent, or Firm* — Oblon, Spivak, McClelland, Maier & Neustadt, L.L.P.

(57) ABSTRACT

An image processing device includes a storage unit, a face detection unit, a face discrimination unit, and a control unit. The storage unit is provided for storing a content management file that stores a file entry for managing contents and a particular face entry for managing a particular face. Each of the file entry and the particular face entry is a hierarchical entry with a hierarchical structure. The face detection unit is provided for detecting a face contained in the contents. The face discrimination unit is provided for determining whether the detected face is the particular face by comparing the particular face with the detected face. The control unit is provided for performing control of correlating the particular face entry with the file entry when the detected face is identified as the particular face.

14 Claims, 37 Drawing Sheets

PRESS REGISTRATION BUTTON

FIG. 15

| FIELD NAME | SIZE | CONTENTS |
|---|---|---|
| 631 HEADER SIZE | 2 byte | DATA SIZE OF HEADER |
| 632 METADATA VERSION | 2 byte | FACE METADATA VERSION INFORMATION |
| 633 CONTENT UPDATE DATE AND TIME | 4 byte | DATE AND TIME OF UPDATE OF CONTENT FILE |
| 660 FACE DATA STRUCTURE FLAG | 16 byte | INFORMATION INDICATING PRESENCE OR ABSENCE OF FIELD IN FACE DATA |
| 634 TIME SCALE | 4 byte | TIME SCALE OF TIME INFORMATION USED IN FACE DATA SECTION |
| 635 FACE DATA UNIT COUNT | 2 byte | COUNT OF FACE DATA UNITS PRESENT IN FACE DATA SECTION |
| 636 FACE DATA SIZE | 2 byte | DATA SIZE OF ONE FACE DATA UNIT |
| 637 FACE DETECTION ENGINE VERSION | 16 byte | INFORMATION REGARDING FACE DETECTION ENGINE |
| 638 CONTENT IMAGE SIZE | 4 byte | SIZE OF IMAGE FROM WHICH FACE HAS BEEN DETECTED |
| 639 ERROR DETECTION CODE VALUE | 2 byte | ERROR DETECTION CODE VALUE CALCULATED WITHIN PREDETERMINED RANGE OF FACE DATA |

| FIELD NAME | | SIZE | | CONTENTS |
|---|---|---|---|---|
| 641 | FACE DETECTION TIME INFORMATION | 5 byte | | DETECTION TIME OF FACE DATA |
| 642 | BASIC FACE INFORMATION — FACE POSITION | 8 byte | UPPER 4 byte | POSITION INFORMATION OF DETECTED FACE |
| | FACE SIZE | | LOWER 4 byte | IMAGE SIZE OF DETECTED FACE |
| 643 | FACE SCORE | 4 byte | | SCORE INFORMATION INDICATING LIKELINESS OF FACE |
| 644 | SMILING FACE SCORE | 4 byte | | SCORE INFORMATION OF DEGREE OF SMILE |
| 645 | IMPORTANCE OF FACE | 1 byte | | INFORMATION INDICATING IMPORTANCE OF FACE IMAGES DETECTED AT THE SAME TIME |
| 646 | PERSONAL IDENTIFICATION ID | 16 byte | | INFORMATION FOR DISCRIMINATING INDIVIDUALS OF REGISTERED FACES |
| 647 | | 8 byte | | DISCRIMINATION INFORMATION FOR DISCRIMINATING ALGORITHM, DICTIONARY, AND THE LIKE USED IN EXTRACTION OF FEATURE QUANTITY |
| | FEATURE QUANTITY OF FACE | N byte | | FEATURE QUANTITY FOR DISCRIMINATING INDIVIDUALS (SIZE DEPENDS ON THE ABOVE DISCRIMINATION INFORMATION) |

| Bit | FLAG NAME<br>(CORRESPONDING TO FIELD<br>NAME IN FACE DATA SECTION) |
|---|---|
| 0 | FACE DETECTION TIME INFORMATION |
| 1 | BASIC FACE INFORMATION |
| 2 | FACE SCORE |
| 3 | SMILING FACE SCORE |
| 4 | FACE IMPORTANCE |
| 5 | PERSONAL IDENTIFICATION ID |
| 6 | FEATURE QUANTITY OF FACE |
| 127-7 | RESERVED AREA = 0 |

FIG. 18A

| FACE DATA |
|---|
| FACE DETECTION TIME INFORMATION |
| BASIC FACE INFORMATION |
| FACE SCORE |
| SMILING FACE SCORE |
| FACE IMPORTANCE |
| PERSONAL IDENTIFICATION ID |
| FEATURE QUANTITY OF FACE |

| Bit | FLAG NAME (CORRESPONDING TO FIELD NAME IN FACE DATA SECTION) | VALUE |
|---|---|---|
| 0 | FACE DETECTION TIME INFORMATION | 1 |
| 1 | BASIC FACE INFORMATION | 1 |
| 2 | FACE SCORE | 1 |
| 3 | SMILING FACE SCORE | 1 |
| 4 | FACE IMPORTANCE | 1 |
| 5 | PERSONAL IDENTIFICATION ID | 1 |
| 6 | FEATURE QUANTITY OF FACE | 1 |
| 127-7 | RESERVED AREA = 0 | 0 |

FIG. 19A

| FACE DATA |
|---|
| PERSONAL IDENTIFICATION ID |
| FEATURE QUANTITY OF FACE |

| Bit | FLAG NAME (CORRESPONDING TO FIELD NAME IN FACE DATA SECTION) | VALUE |
|---|---|---|
| 0 | FACE DETECTION TIME INFORMATION | 0 |
| 1 | BASIC FACE INFORMATION | 0 |
| 2 | FACE SCORE | 0 |
| 3 | SMILING FACE SCORE | 0 |
| 4 | FACE IMPORTANCE | 0 |
| 5 | PERSONAL IDENTIFICATION ID | 1 |
| 6 | FEATURE QUANTITY OF FACE | 1 |
| 127-7 | RESERVED AREA = 0 | 0 |

FIG. 20A

| FACE DATA |
|---|
| FACE DETECTION TIME INFORMATION |
| BASIC FACE INFORMATION |
| FACE SCORE |
| PERSONAL IDENTIFICATION ID |
| FEATURE QUANTITY OF FACE |

| Bit | FLAG NAME (CORRESPONDING TO FIELD NAME IN FACE DATA SECTION) | VALUE |
|---|---|---|
| 0 | FACE DETECTION TIME INFORMATION | 1 |
| 1 | BASIC FACE INFORMATION | 1 |
| 2 | FACE SCORE | 1 |
| 3 | SMILING FACE SCORE | 0 |
| 4 | FACE IMPORTANCE | 0 |
| 5 | PERSONAL IDENTIFICATION ID | 1 |
| 6 | FEATURE QUANTITY OF FACE | 1 |
| 127-7 | RESERVED AREA = 0 | 0 |

FIG. 21A

| FACE DATA |
|---|
| FACE DETECTION TIME INFORMATION |
| BASIC FACE INFORMATION |
| FACE SCORE |
| SMILING FACE SCORE |
| FACE IMPORTANCE |
| PERSONAL IDENTIFICATION ID |
| FEATURE QUANTITY OF FACE |
| GENDER SCORE |
| ANGLE INFORMATION |

| Bit | FLAG NAME (CORRESPONDING TO FIELD NAME IN FACE DATA SECTION) | VALUE |
|---|---|---|
| 0 | FACE DETECTION TIME INFORMATION | 1 |
| 1 | BASIC FACE INFORMATION | 1 |
| 2 | FACE SCORE | 1 |
| 3 | SMILING FACE SCORE | 1 |
| 4 | FACE IMPORTANCE | 1 |
| 5 | PERSONAL IDENTIFICATION ID | 1 |
| 6 | FEATURE QUANTITY OF FACE | 1 |
| 7 | GENDER SCORE | 1 |
| 8 | ANGLE INFORMATION | 1 |
| 127-9 | RESERVED AREA = 0 | 0 |

FIG. 22A

| FACE DATA |
|---|
| FACE DETECTION TIME INFORMATION |
| BASIC FACE INFORMATION |
| FACE SCORE |
| FACE IMPORTANCE |
| PERSONAL IDENTIFICATION ID |
| FEATURE QUANTITY OF FACE |
| ANGLE INFORMATION |

| Bit | FLAG NAME (CORRESPONDING TO FIELD NAME IN FACE DATA SECTION) | VALUE |
|---|---|---|
| 0 | FACE DETECTION TIME INFORMATION | 1 |
| 1 | BASIC FACE INFORMATION | 1 |
| 2 | FACE SCORE | 1 |
| 3 | SMILING FACE SCORE | 0 |
| 4 | FACE IMPORTANCE | 1 |
| 5 | PERSONAL IDENTIFICATION ID | 1 |
| 6 | FEATURE QUANTITY OF FACE | 1 |
| 7 | GENDER SCORE | 0 |
| 8 | ANGLE INFORMATION | 1 |
| 127-9 | RESERVED AREA = 0 | 0 |

FIG. 24A
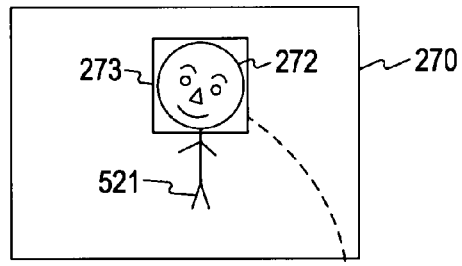
FIG. 24B
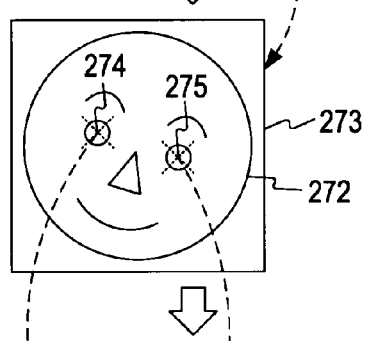
FIG. 24C
FIG. 24D
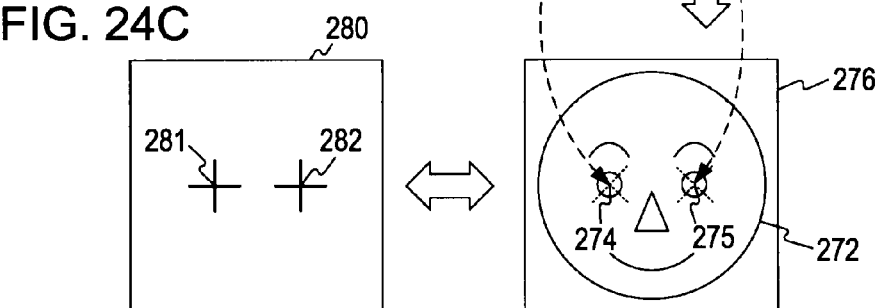
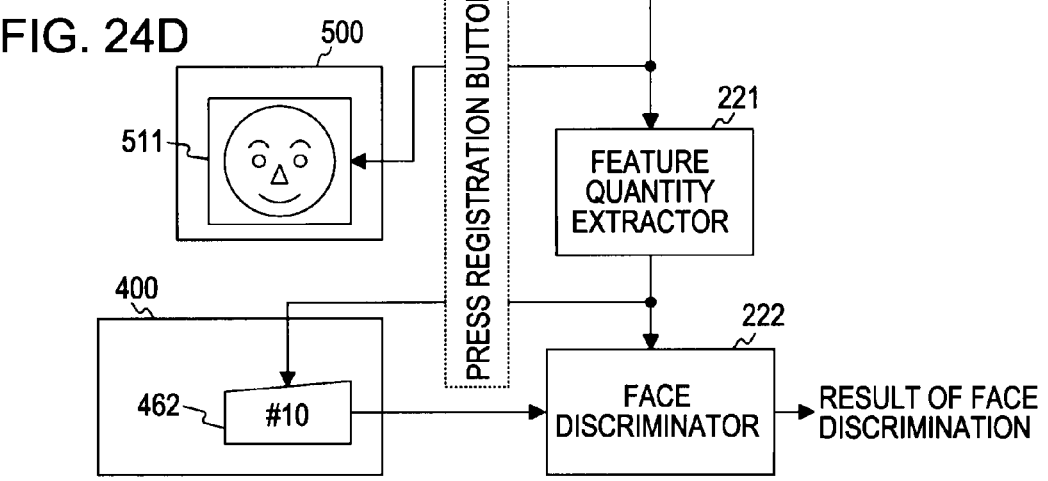

IMAGE PROCESSING DEVICE, IMAGING APPARATUS, IMAGE-PROCESSING METHOD, AND PROGRAM FOR FACE DETECTION, DISCRIMINATION AND FILE ENTRY CORRELATION

BACKGROUND OF THE INVENTION

1. Field of the Invention

The present invention relates to an image processing device, particularly an image processing device capable of detecting faces in contents. The present invention also relates to an imaging apparatus provided with such an image processing device. Furthermore, the present invention relates to an image processing method used in each of the image processing device and the imaging apparatus. Furthermore, the present invention relates to a program for allowing a computer to execute such an image processing method.

2. Description of the Related Art

Techniques have been proposed to facilitate various operations using metadata. Here, content data such as a still image or a video is correlated with metadata incidental thereto and stored in a memory before the use. In recent years, there is a technique for detecting a character's face contained in content data such as a still image or a video. In addition, a technique for registering information about the detected face as metadata has been proposed.

For example, in a proposed metadata registration method, a face is detected in a captured image. A rectangular region containing the face is combined with personal information such as a corresponding person's name of the face and then stored as metadata in an XML format. Subsequently, the metadata is registered by being written on part of an image file (see, for example, Japanese Unexamined Patent Application Publication No. 2004-336466 (FIG. 2)).

SUMMARY OF THE INVENTION

According to the above proposed method, for example, click on a face of interest when the image file with metadata is viewed allows a user to perform any operation with reference to the registered metadata corresponding to the face.

Here, a plurality of contents may be searched using the metadata registered by the above method to find a content containing a particular face. In this case, however, metadata is written in each of contents. Thus, there is a need of repetitively opening and closing the contents one by one to read the desired metadata to be used for the search operation. Detecting and verifying each metadata are time consuming, leading to longer retrieval time for the content containing the particular face. For this reason, retrieval time of contents containing a specific face increases.

In recent years, a technology for discriminating faces to determine whether a person's face in an image corresponds to the face of a particular person (particular face) has been proposed. In recent years, furthermore, another technology for discriminating faces which may perform a face-discrimination process at high speed such an extent that a user hardly recognizes a latency time. An image processing device capable of discriminating faces at high speed may be used for searching a plurality of contents to find a content containing a particular face. In this case, however, there is a need of repetitively opening and closing each of the contents one by one to carry out a face-discrimination process. Therefore, such a process takes a much time to read each of contents and perform the face-discrimination process, leading to an increase in time for retrieving a content containing a particular face. Therefore, the user hardly picks up and uses the content containing the particular face within a short time.

It is thus desirable to pick up and use a content containing a particular face quickly.

A first embodiment of the present invention is an image processing device including a storage unit, a face detection unit, a face discrimination unit, and a control unit, which are configured as follows. The storage unit is provided for storing a content management file that stores a file entry for managing contents and a particular face entry for managing a particular face which is a face of a particular person. Here, each of the file entry and the particular face entry is a hierarchical entry with a hierarchical structure. The face detection unit is provided for detecting a face contained in the contents. The face discrimination unit is provided for determining whether the detected face corresponds to the particular face by comparing the particular face with the detected face. The control unit is provided for performing control of correlating the particular face entry with the file entry when the detected face is identified as the particular face. The present embodiment also includes a process carried out in such an image processing device and a program for allowing a computer to execute such a process. Therefore, it is possible to compare any detected face with a particular face and determine whether the detected face corresponds to the particular face. The control unit performs the control of correlating the file entry of the detected face with the entry of the particular face when the detected face corresponds to the particular face.

In the first embodiment, the content management file may store a feature quantity entry which is a hierarchical entry and contains the feature quantity of the particular face is linked to a lower level of the hierarchy (also simply referred to as a lower layer) of the particular face entry. In addition, the imaging apparatus may further include a feature quantity extractor that extracts feature quantity of the detected face may be further provided. Thus, the face discrimination unit identifies whether the detected face is the particular face by comparing the feature quantity contained in the feature quantity entry with the extracted feature quantity. Therefore, it is possible to extract the feature quantity of the detected face and compare the feature quantity of the detected face with the feature quantity contained in a feature quantity entry to determine whether the detected face corresponds to the particular face.

In the first embodiment, the content management file stores metadata which is a hierarchical entry containing face data corresponding to the detected face while the metadata is linked to a lower layer of the file entry. When the detected face is identified as the particular face, the control unit may store the extracted feature quantity in the face data contained in the metadata entry. Therefore, when the detected face is identified as the particular face, it is possible to store the extracted feature quantity in face data contained in the metadata entry.

In addition, in the first embodiment, the particular face entry stores a particular person identifier for identifying the particular person. The content management file stores metadata which is a hierarchical entry containing face data corresponding to the detected face while the metadata is linked to a lower layer of the file entry. The control unit may store the particular person identifier in the face data contained in the metadata entry when the detected face is identified as the particular face. Therefore, when the detected face is identified as the particular face, it is possible to store the particular person identifier in the face data contained in the metadata entry.

In the first embodiment, furthermore, each of the hierarchical entries may be provided with an entry identifier for identifying the hierarchical entry. The control unit may correlate the particular face entry with the file entry by storing an entry identifier of the file entry in the particular face entry when the detected face is identified as the particular face. Therefore, it is possible to store the entry identifier of the file entry in the particular face entry when the detected face is identified as the particular face.

In this embodiment, the content management file may store a particular face image containing at least a part of the particular face, and the particular face entry may store a storage position of the particular face image on the content management file. Therefore, it is possible to perform control of indirectly correlating the final entry with the particular face image when the detected face is identified as the particular face.

Furthermore, a second embodiment of the present invention is an image processing device that includes a content storage unit, a content management file storage unit, an operation input receiver, a selector, an extractor, and a display, which are configured as follows. The content storage unit is provided for storing contents. The content management file storage unit is provided for storing a content management file. The content management file has a hierarchical structure and stores each of hierarchical entries provided with repetitive entry identifiers for identifying the corresponding hierarchical entries. The content management file stores a file entry, a particular face entry, and a particular face image. The file entry is a hierarchical entry for managing the content. The particular face entry is provided as a hierarchical entry for managing a particular face which is a face of a particular person and provided for storing an entry identifier of a file entry corresponding to a content containing the particular face among contents stored in the content storage unit. The particular face image is provided as an image containing at least a part of the particular face and correlated with the particular face entry. The operation input receiver is provided for receiving a selection operation for selecting a desired particular face image from particular face images currently stored in the content management file. The selector is provided for a particular face entry corresponding to the selected particular face image from particular face entries currently stored in the content management file. The extractor is provided for a content corresponding to an entry identifier currently stored in the selected particular face entry from contents stored in the content storage unit. The display is provided for displaying the extracted content. The present embodiment further includes a processing method carried out in such an image processing device and a program that allows a computer to execute such a processing method. There, it is possible to select a desired particular face image from particular face images, and then select a particular face entry corresponding to the selected particular face image from particular face entries. In addition, it is possible to extract from contents a content corresponding to an entry identifier currently stored in the selected particular face to display the extracted content.

A third embodiment of the present invention is an imaging apparatus including a storage unit, an imaging unit, a face detection unit, a face discrimination unit, and a control unit, which are configured as follows. The storage unit is provided for storing a content management file that stores a file entry for managing a captured video and a particular face entry for managing a particular face which is a face of a particularly person, where each of the file entry and the particular face entry is a hierarchical entry with a hierarchical structure. The imaging unit is provided for capturing an image of a subject to generate captured video. The face detection unit is provided for detecting a face contained in the captured video. The face discrimination unit is provided for determining whether the detected face is the particular face by comparing the particular face with the detected face. The control unit is provided for performing control of correlating the particular face entry with the file entry when the detected face is identified as the particular face. The present embodiment further includes a processing method carried out in such an image processing device and a program that allows a computer to execute such a processing method. Therefore, it is possible to determine whether the detected face is the particular face by comparing the particular face with the detected face and then control of correlating the particular face entry with the file entry when the detected face is identified as the particular face.

Therefore, any of the embodiments of the present invention is advantageously used for quickly picking up and using a content containing a particular face.

BRIEF DESCRIPTION OF THE DRAWINGS

FIG. 15 illustrates a summary of information to be stored in a header section;

FIG. 16 is a diagram schematically illustrating face data stored in a face data section;

FIG. 17 illustrates a data structure of the face data structure flag of a header section;

FIG. 18 illustrates a relationship between bits stored in a face data structure flag and face data stored in a face data section;

FIG. 19 illustrates a relationship between bits stored in a face data structure flag and face data stored in a face data section;

FIG. 20 illustrates a relationship between bits stored in a face data structure flag and face data stored in a face data section;

FIG. 21 illustrates a relationship between bits stored in a face data structure flag and face data stored in a face data section;

FIG. 22 illustrates a relationship between bits stored in a face data structure flag and face data stored in a face data section;

FIG. 24 is a diagram schematically illustrating a series of steps in a process of discriminating a face in a captured image and in a process of registering such a face in a captured image as a registered face image in accordance with an embodiment of the present invention;

DESCRIPTION OF THE PREFERRED EMBODIMENTS

Next, an embodiment of the invention is described in detail with reference to a drawing.

Figure 1:
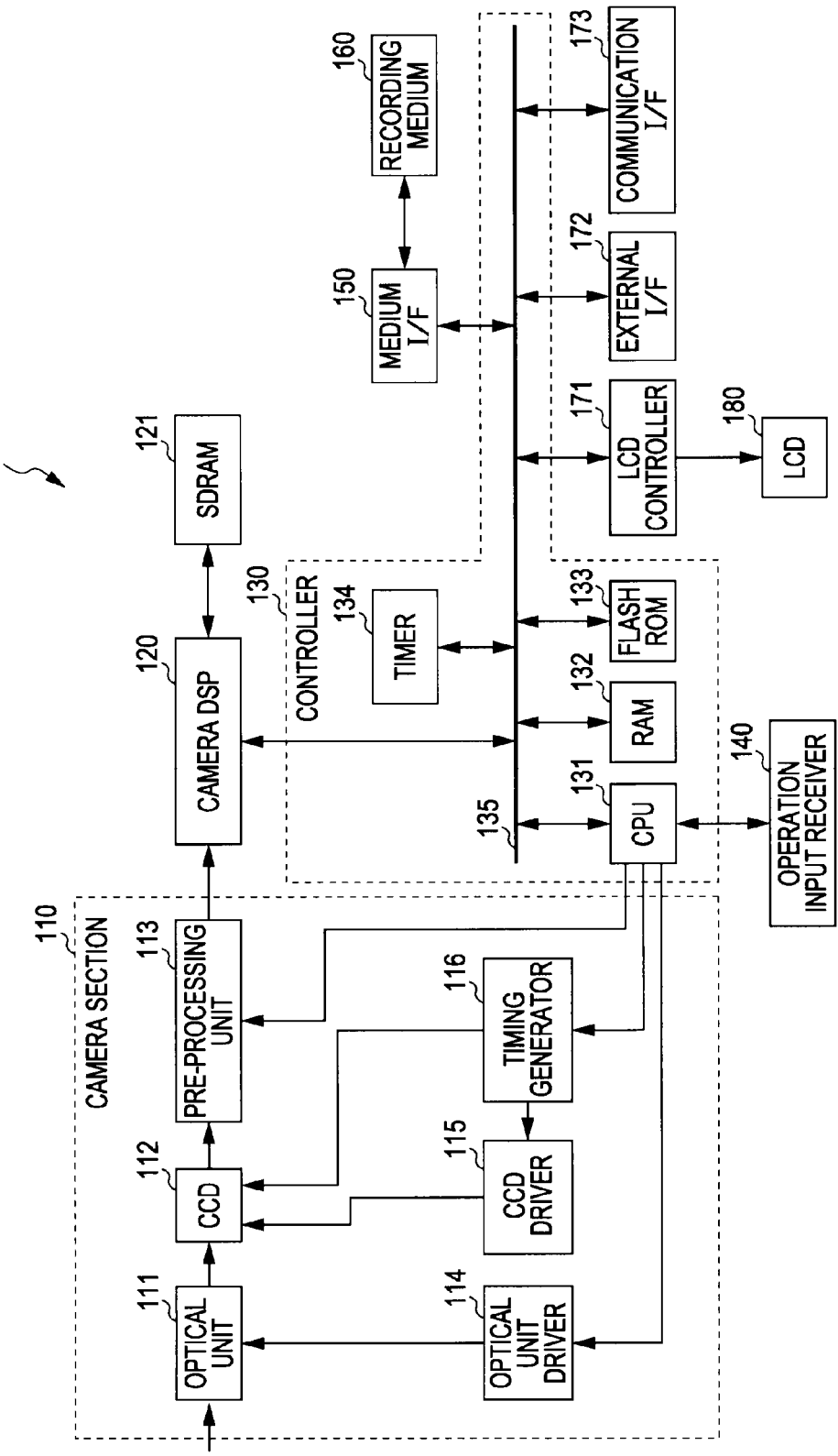
FIG. 1 is a block diagram illustrating an exemplary configuration of an imaging device in accordance with an embodiment of the present invention.

FIG. 1 is a block diagram illustrating an exemplary configuration of an imaging device 100 in accordance with one embodiment of the present invention. The imaging device 100 includes a camera section 110, a camera digital signal processor (DSP) 120 and a synchronous dynamic random access memory (SDRAM) 121. The imaging device 100 also includes a controller 130, an operation unit 140, and a medium interface (I/F) 150. The imaging device 100 further includes a liquid-crystal display (LCD) controller 171, an external interface (I/F) 172, a communication interface (I/F) 173, and a LCD 180. The imaging device 100 may be a camcorder. Here, the term "camcorder" derives from both "camera" and "video recorder". The camcorder extracts the feature quantity of a captured image of a subject by image analysis and performs various kinds of image processing using the extracted feature quantity.

The camera section 110 includes an optical unit 111, a charge-coupled device (CCD) 112, a pre-processing unit 113, an optical block driver 114, a CCD driver 115, and a timing generator 116. The optical unit 111 includes a plurality of lens that collects light from a photographic subject, a focus mechanism, a shutter mechanism, an iris mechanism, and the like. The optical unit 111 outputs light incident from the subject to the CCD 112 via the lenses and the shutter mechanism.

The CCD 112 operates in response to a driving signal from the CCD driver 115 and incorporates from the optical unit 111 the incident light from the subject. In response to a timing signal from the timing generator 116, the CCD 112 photoelectrically converts the incident light into an electric signal. The generated electrical signal (image information) is then output to the pre-processing unit 113. A photoelectric converter (image sensor) such as a complementary metal-oxide semiconductor (CMOS) sensor may be substituted for the CCD 112.

The pre-processing unit 113 performs various kinds of signal processing of the electric signal output from the CCD 112 and generates digital image data to the camera DSP 120. In other words, the pre-processing unit 113 performs a correlated double sampling (CDS) process on the electrical signal as the image information supplied from the CCD 112 in order to keep signal-to-noise (S/N) ratio at an excellent level. The pre-processing unit 113 also performs automatic gain control (AGC) process on the electrical signal, thereby controlling gain. Furthermore, the pre-processing unit 113 performs an analog-to-digital conversion (A/D) process on the electrical signal to generate a digital signal (digital image data).

The optical block driver 114 generates a driving signal for operating the optical unit 111 under the control of the controller 130 and then supplies the generated driving signal to the optical unit 111. The focus mechanism, shutter mechanism, and of the optical unit 111, iris mechanism of the optical unit 111 can be controlled in response to the driving signal from the optical block driver 114. The CCD driver 115 generates a driving signal for operating the CCD 112 in response to a timing signal from the timing signal generator 116 and then supplies the generated timing signal to the CCD 112.

The timing generator 116 generates a timing signal for providing a predetermined timing under the control of the controller 130 and then outputs the generated timing signal to both the CCD 112 and the CCD driver 115.

The camera DSP 120 is connected to the SDRAM 121 and performs various kinds of camera-signal processing on the digital image data output from the pre-processing unit 113. The camera-signal processing may be, for example, an auto focus (AF) process, an auto exposure (AE) process, or an auto white balance (AWB) process. The image data subjected to such camera-signal processing is encoded with a predetermined coding mode, such as joint photographic experts group (JPEG) or JPEG 2000. The encoded image data is then supplied to a storage medium 160 via a system bus 135 and an interface I/F 150, followed by being stored as a file in the storage medium 160. The camera DSP 120 decodes encoded image data which was read out from storage medium 160 via medium I/F 150, and supplies this decoded image data to LCD controller 171 via system bus 135. The camera DSP 120 detects a face contained in the image data supplied from one of the pre-processing unit 113 and the storage medium 160 and then normalizes the face image containing the detected face to generate a normalized face image. Subsequently, the camera DSP 120 outputs to the controller 130 the face detection information about the detected face and the normalized face image.

The controller 130 includes a central processing unit (CPU) 131, a random-access memory (RAM) 132, a flash read-only memory (ROM) 133, and a timer 134. In addition, the CPU 131, the RAM 132, the flash ROM 133, and the timer 134 are connected to each other via the system bus 135. The controller 130 may be a general-purpose built-in microcomputer or a dedicated large scale integrated circuit (LSI).

The CPU 131 performs the respective processes based on various programs stored in the flash ROM 133 or the like. The RAM 132 serves as a working area to temporarily store interim results of each process performed by the CPU 131.

The flash ROM 133 stores a variety of programs executed by the CPU 131, data necessary for the CPU 131 in each process, and the like.

The timer 134 gives the CPU 131 the present date, present day of the week, and the present time. The timer 134 also gives the CPU 131 the image-capturing date and time.

An operation unit 140 is provided for accepting the contents of operation input by a user and generating a control signal corresponding to the accepted contents of operation, followed by outputting the control signal to the CPU 131.

The operation unit 140 may include operation members, such as a setup/release button for registered-face-recording mode, a registration button, a setup/release button for video-storing mode, and a recording button, on the imaging device 100. In addition, the operation unit 140 may further include a setup/release button for mode of storing still images, a shutter button, a setup/release button for mode of replay, a replay button, and the like. Furthermore, for example, the operation unit 140 may be constructed of a touch panel as shown in FIG. 28 to FIG. 31. The setup/release button for registered-face-recording mode is a button for performing a setup or release of a mode for recording registered faces. This mode is used is a process of discriminating faces in image data output from the pre-processing unit 113 or the storage medium 160. The registration button is a button to be pressed when registering faces (face images) while taking images under the registered-face-recording mode. The setup/release button for video-storing mode is a button for performing a setup or release of a video-storing mode that allows a video to be stored. The recording button is a button to be pressed when starting or ending the recording of a video while being set to a video-storing mode. The setup/release button for mode of storing still images is a button for performing a setup or release of a still-image-storing mode that allows still images to be stored. The shutter button is a button to be pressed in still-image-storing mode when storing an image (still image) being imaged. The setup/release button for mode of replay is a button for performing a setup or release of a replay mode that allows a content file stored in the storage medium 160 or a content file obtained from an external device to be replayed. The replay button is a button to be placed when starting or ending the recording of a video while being set to a replay mode.

The medium I/F 150 is an interface for transmission and reception of various kinds of image data and other kinds of information between the storage medium 160 and the control unit 130.

The storage medium 160 is a storage medium that stores a content file corresponding to image data generated by the camera DSP 120. In addition, the storage medium 160 is also provided for storing image data which is output from an external personal computer (PC) (not shown) to the imaging apparatus 100. Furthermore, the storage medium 160 is provided for storing various kinds of information corresponding to image data obtained by the imaging apparatus 100 through a network. Here, the storage medium 160 may be installed in the imaging apparatus 100 or may be removably attached on the imaging apparatus 100. In addition, examples of the storage medium 160 which can be used in the present embodiment include a memory card, an optical storage medium, a magnetic disk, and a hard disk drive (HDD). Here, the optical storage medium may be, for example, a recordable digital versatile disc (DVD), a recordable compact disc (CD), and Blue-ray Disc (registered trademark).

The LCD controller 171 is provided for generating an image signal and supplying the generated image signal to the LCD 180. Here, the image signal is responsible for displaying an image output of the camera DSP 120 on the LCD 180.

The external I/F 172 is an interface used for transmission and reception of various kinds of data between an external device such as PC (not shown) and the imaging apparatus 100. For example, the imaging apparatus 100 may be connected to the PC through the external I/F 172 to receive image data from the PC and to store the input image data in the storage medium 160. In addition, the imaging apparatus 100 may supply the image data from the storage medium 160 to the PC.

The communication I/F 173 is an interface constructed of a network interface card (NIC) or the like to connect to a network such as the Internet to perform transmission and reception of various kinds of image data and other kinds of information therethrough. Furthermore, the communication I/F 173 may be a wired interface complying with a predetermined standard. For example, the standard may be the Institute of Electrical and Electronic Engineers (IEEE) 1394 or the Universal Serial Bus (USB). Alternatively, the communication I/F 164 may be a wireless interface complying with IEEE 802.11a, IEEE 802.11b, IEEE 802.11g or the Bluetooth (registered trademark) standard. In other words, therefore, the communication I/F 173 may be which interface of a cable or radio.

The LCD 180 is provided for displaying an image corresponding to an image signal generated by the LCD controller 171. For example, a video corresponding to a video content file stored in the storage medium 160 is displayed on the LCD

180. By the way, an example of the display will be described later in detail with reference to FIG. 28 to FIG. 31.

As described above, therefore, the imaging apparatus 100 stores in the storage medium 160 an image or a video obtained by imaging a photographic subject. In addition, the imaging apparatus 100 reads the image or the video stored in the storage medium 160 and then displays the image or the video on the LCD 180. Furthermore, the imaging apparatus 100 may store image data output of the external PC, image data obtained through the network, or the like in the storage medium 160. Moreover, the image data or the like, which has been obtained from the external PC or the like and stored in the recording medium 160, may be read and displayed on the LCD 180.

Referring now to the attached drawings, real files stored in the storage medium 160 will be described.

Figure 2:
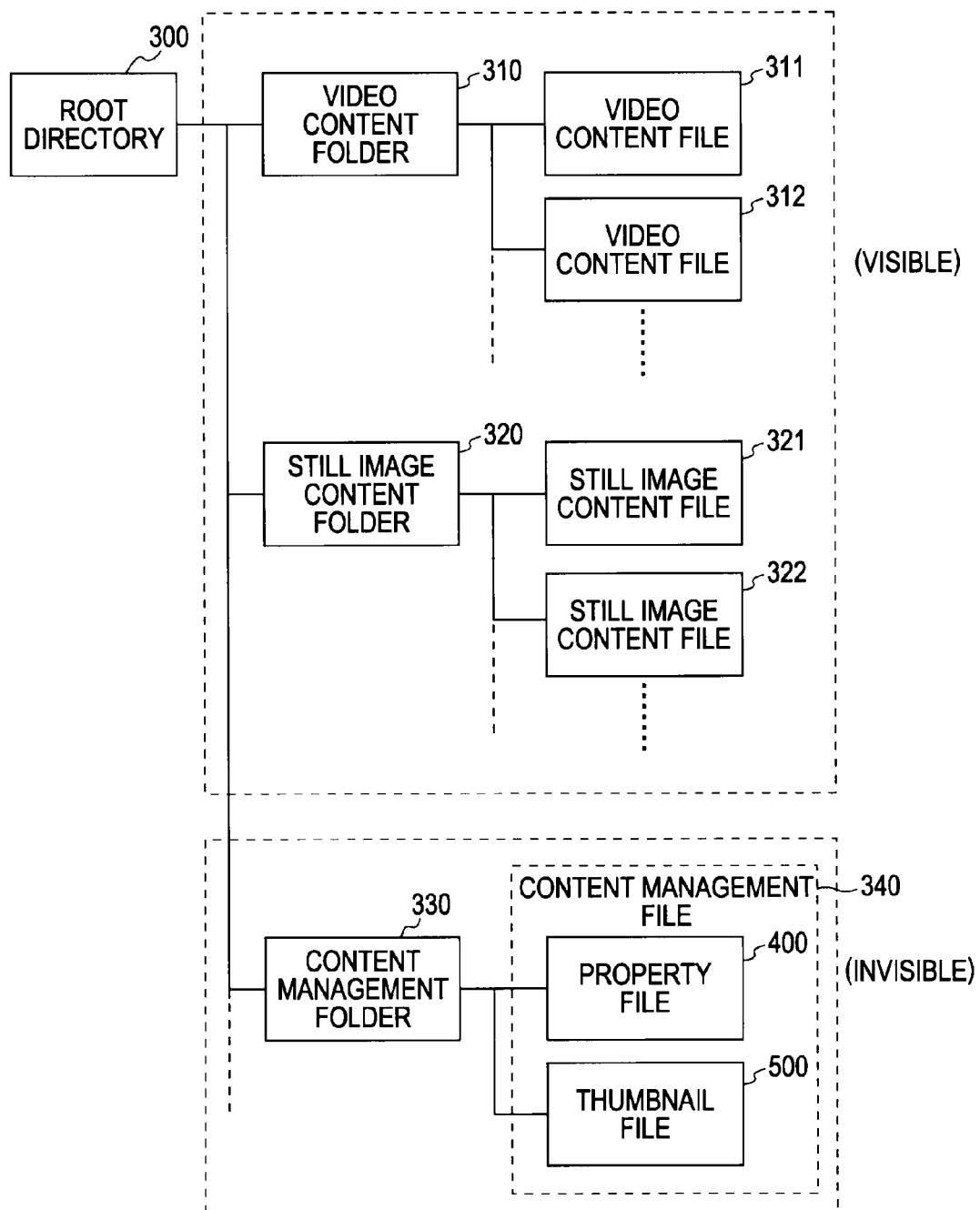
FIG. 2 is a diagram schematically illustrating the file structure of real files registered on a file system according to an embodiment of the present invention.
Figure 9:
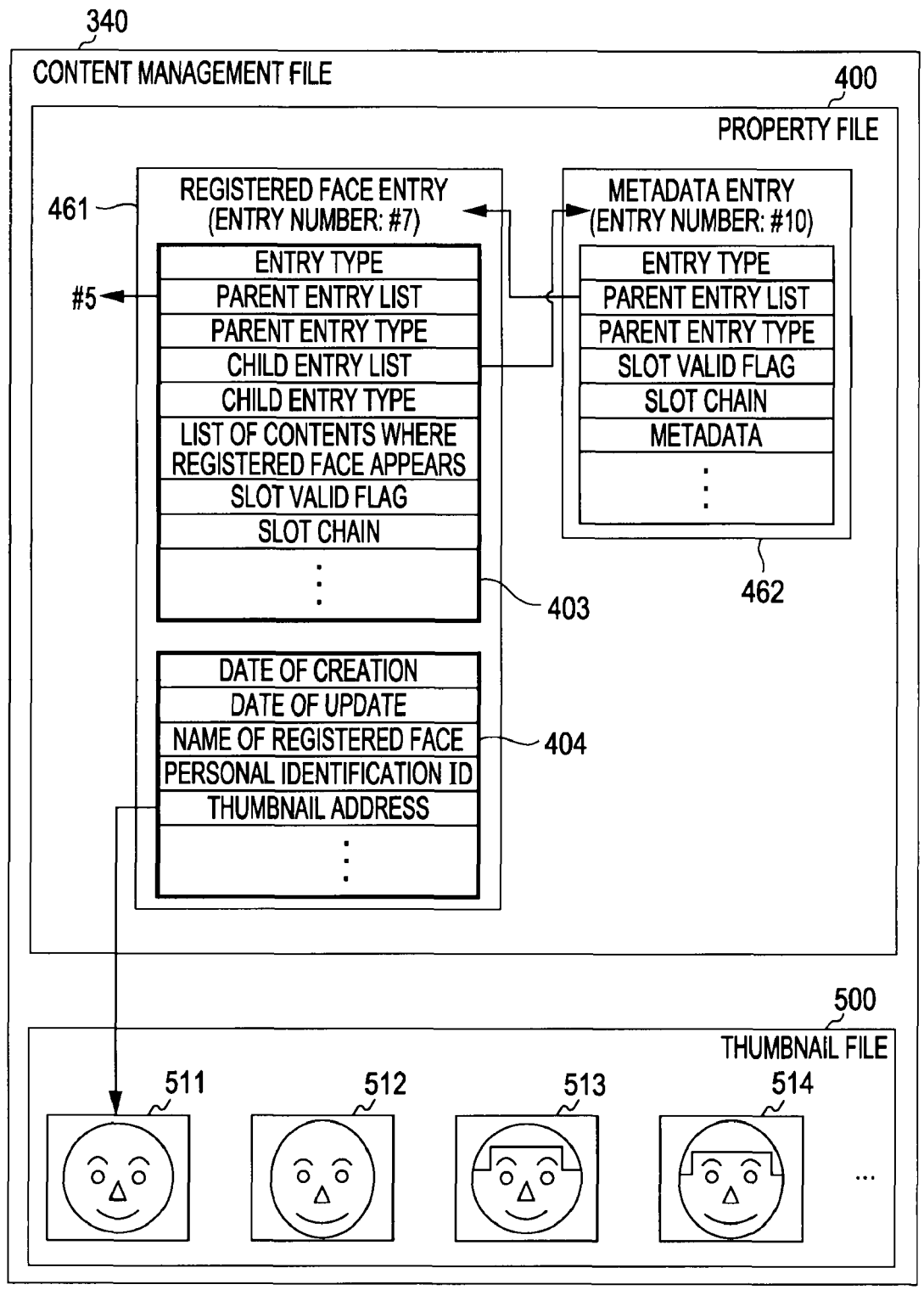
FIG. 9 is a diagram schematically illustrating the relationship between a property file and a thumbnail file, which constitute a content management file, in accordance with an embodiment of the present invention.

FIG. 2 is a diagram schematically illustrating the file structure of real files registered on a file system according to an embodiment of the present invention. In this embodiment, video content files or still image content files, face metadata related to these content files, and registered face information are managed in hierarchical entries in a hierarchical structure different from their real directories. Specifically, the storage medium 160 stores content management files 340 for managing these files, the face metadata, and the registered face information in addition to the video or still image content files. Here, the registered-face information is information about the face of a particular person (particular face) registered in the imaging apparatus 100, including registered-face-management information, registered-face-attribute information, and so on as shown in FIG. 9. The information is stored in the content management file 340. In the embodiment of the present invention, furthermore, the particular face, where the registered face information thereof is stored in the content management file 340, will be described as a registered face.

A root directory 300 contains a video content folder 310, a still image content folder 320, and a content management folder 330.

The video content folder 310 contains video content files 311 and 312 generated by the imaging device 100. In other words, in this embodiment, the video content files 311 and 312 belong to the video content folder 310.

The still image content folder 320 contains still image content files 321 and 322 which are still image data generated by the imaging device 100. In other words, in this embodiment, the still image content files 321 and 322 belong to the still image content folder 320.

A content management folder 330 contains a content management file 340. The content management file 340 manages the content files belonging to each of the video content folder 310 and the still image content folder 320 by hierarch zed entries. The content management folder 330 is constructed of a property file 400 and a thumbnail file 500. The property file 400 stores file entries and metadata entries for management of the respective content files, registered face entries and metadata entries for management of registered face information, and so on. The thumbnail file 500 stores a representative thumbnail image of each content file and a registered face image containing the resisted face. The property file 400 and the thumbnail file 500 will be described in detail later with reference to FIG. 3 to FIG. 11.

Each of video content files belonging to the video content folder 310 and each of still image content files belonging to the still image content folder 320 are visible to a user. In other words, the user is allowed to display on the LCD 180 an image corresponding to each content file specified by a user's operation input. In this case, for example, the image may be an icon that represents the content file. On the other hand, the content management file 340 is invisible to the user so that the content of the content management file 340 may not be modified by the user. The content of the content management file 340 is set to be invisible to the user, for example, by setting on a flag to render the content management folder 330 of a file system. The flag may be set to be on when the imaging apparatus 100 recognizes that the imaging apparatus 100 is connected a personal computer (PC) via a universal serial bus (USB) interface (in mass storage connection). In this case, for example, the above flag is turned on when the imaging apparatus has recognized the connection (i.e., when receiving from the PC a signal that connection has been correctly established). The entry structure of the property file 400 will be described in detail with reference to the drawing.

Figure 3:
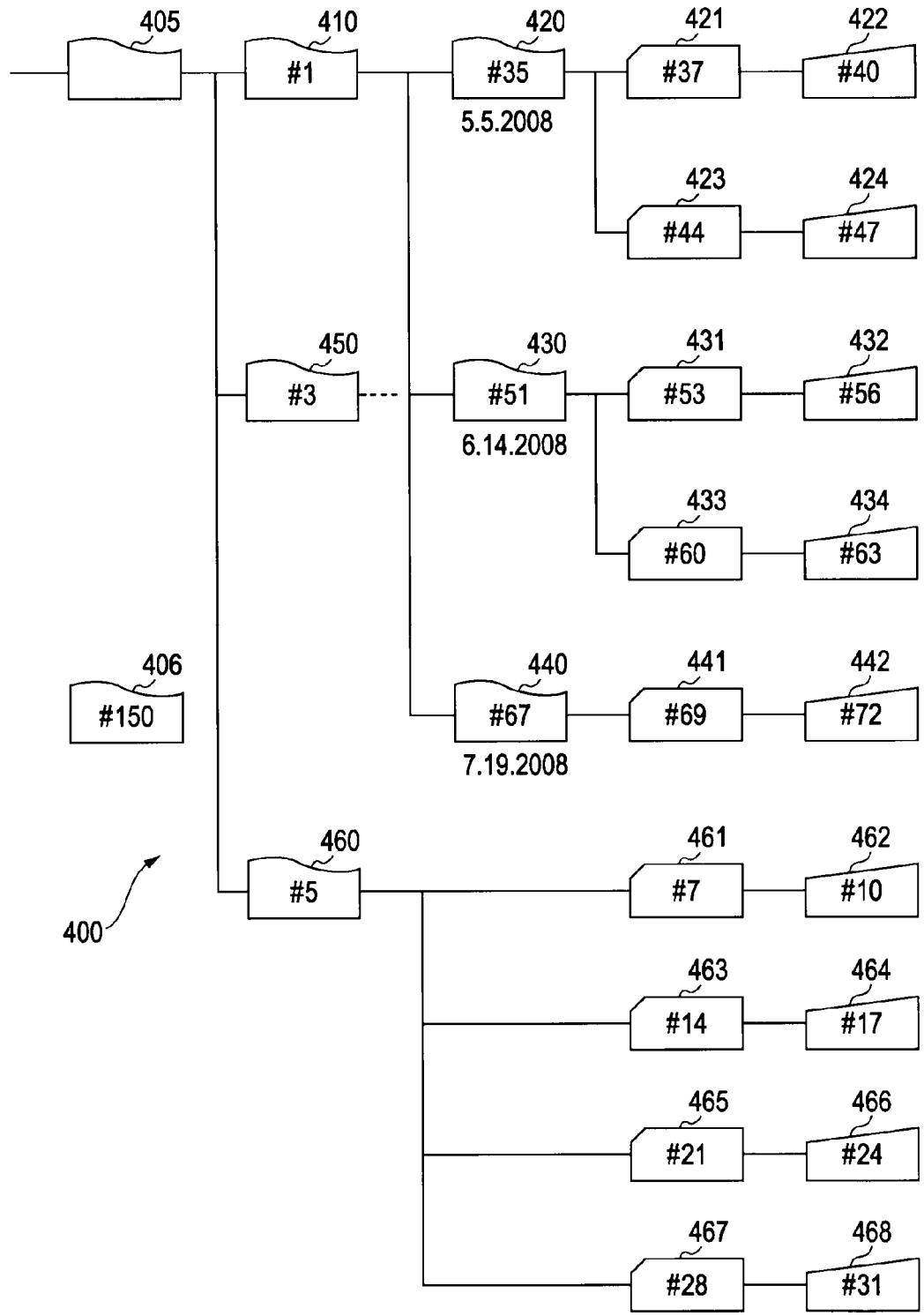
FIG. 3 is a diagram illustrating an example of the hierarchical arrangements of folders and files which are managed by a property file in accordance with an embodiment of the present invention.

FIG. 3 is a diagram illustrating an example of the hierarchical arrangements of folders and files which are managed by the property file 400 in accordance with the embodiment of the present invention.

The property file 400 manages the video files and the still image content files stored in the storage medium 160. The property file 400 flexibly manages the files in response to applications. For example, the property file 400 may manage each of the video or still image content files according to the date and time when it is recorded by the imaging apparatus 100. In addition, each of the video or still image content files may be managed according to the type thereof.

In this embodiment, an example of the management method for classifying and managing each of the video content files according to the recording date and time thereof and managing the video content file containing the registered face while linking the file to the registered face. In FIG. 3, the entries have their respective numbers for identifying themselves. In the following description, the entry numbers will be appended with "#". The details of the entry number will be described later in detail with reference to FIG. 12 and FIG. 13.

A root entry 405 is above all of other entries in a hierarchical entry arrangement. In this example, a video folder entry (#1) 410, a still-image folder entry (#3) 450, and a registered-face folder entry (#5) 460 belong to the root entry 405. In addition, a profile entry (#150) 406 correctively stores the codec information (e.g., coding formats, image sizes, and bit rates) of the respective file entries. The details of the profile entry (#150) 406 will be described later in detail with reference to FIG. 12C.

The video folder entry (#1) 410 manages date folder entries for videos on lower layers. In this example, date folder entries (#35) 420, (#51) 430, and (#67) 440 belong to the video folder entry 410 (#1).

A still image folder entry (#3) 450 manages date folder entries for still images on lower layers. In the embodiment of the invention, the description of entries will focus on each entry for video, and the description of each entry for still image will be partially omitted.

The date folder entry (#35) 420, (#51) 430, and (#67) 440 are entries for classifying and managing video content files by date and the classified video content files are then managed on lower layers. In this example, the date folder entry (#35) 420 manages video content files recorded on "5/5/2008". Both a video file entry (#37) 421 and a video entry (#44) 423 belong to the date folder entry (#35) 420. In addition, the date folder entry (#51) 430 manages video content files recorded on "6/14/2008". Both a video file entry (#53) 431 and a video entry (#60) 423 belong to the date folder entry (#51) 430. Furthermore, the date folder entry (#67) 440 manages video content files recorded on "7/19/2008". A video entry (#69)

441 belong to the date folder entry (#67) 440. Details of the folder entries will be described in detail with reference to FIG. 8.

The video file entries (#37) 421, (#44) 423, (#53) 431, (#60) 433, and (#69) 441 store content-management information and content-attribute information to manage video content files, respectively. In addition, each video file entry is linked to a metadata entry that stores metadata associated with the corresponding video content file. The relationship between the video file entry and the video content file will be described later in detail with reference to FIG. 4. In addition, the details of file entries of content-management information, content-attribute information, and so on will be described later in detail with reference to FIG. 8.

Each of metadata entries (#40) 422, (#47) 424, (#56) 432, (#63) 434, and (#72) 442 stores metadata associated with a video content file managed by a video file entry linking thereto. In this example, in each metadata entry belonging to the corresponding video file entry contains face data extracted from the video content file. The face data contains a variety of data related to the face extracted from the video content file. As shown in FIG. 16, for example, the face data contains data of face detection time information, basic face information, a face score, and a smiling face score. The metadata entry will be described in detail with reference to FIG. 8 to FIG. 14.

Registered-face folder entry (#5) 460 manages a registered face entry for managing a registered face in a lower level of the hierarchic structure. In this example, registered face entries (#7) 461, (#14) 463, (#21) 465, and (#28) 467 belong to the registered-face folder entry (#5) 460. The registered face entries (#7) 461, (#14) 463, (#21) 465, and (#28) 467 are entries that manage registered faces, respectively. Each of these registered face entries contains a list of contents in which the registered face appears and also contains attribute information of the registered face. The relationship between the registered face entry and the particular person will be described in detail with reference to FIG. 4. In addition, the details of the registered face entry according to the embodiment of the present invention will be described in detail with reference to FIG. 9.

Each of metadata entries (#10) 462, (#17) 464, (#24) 466, and (#31) 468 stores metadata associated with a registered face managed by a registered face entry linking thereto. In this example, the metadata stores a feature quantity extracted from a registered face image containing a registered face. Here, the feature quantity is identification information used for determining whether a face detected from content data corresponds to the registered face. In other words, for example, the feature quantity is data that represents the features and properties of a face image for recognizing positional relationships of face parts, such as the eyes, nose, mouth, and eyebrows, and the shapes thereof. The feature quantity may be extracted on the basis of levels of color, brightness, and so on. The details of the metadata entry according to the embodiment of the present invention will be described in detail with reference to FIG. 9 to FIG. 14.

Figure 4:
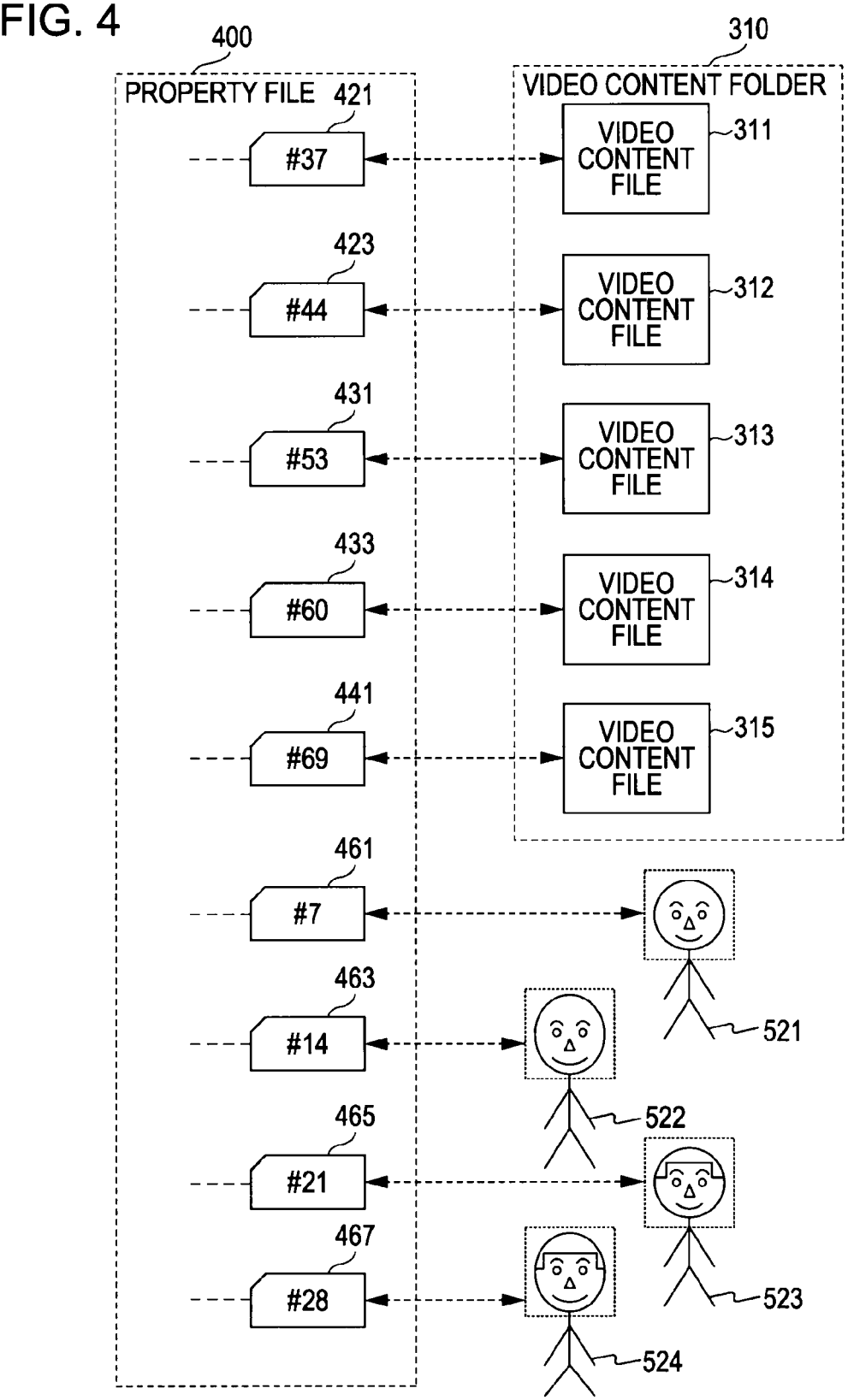
FIG. 4 is a schematic diagram that illustrates the relationship among a property file, video content files, and particular persons, in accordance with an embodiment of the present invention.

FIG. 4 is a schematic diagram that illustrates the relationship among the property file 400, video content files, and particular persons, in accordance with the embodiment of the present invention. Here, video file entries (#37) 421, (#44) 423, (#53) 431, (#60) 433, and (#69) 441 and registered face entries (#7) 461, (#14) 463, (#21) 465, and (#28) 467 are the same as those represented in FIG. 3. In this embodiment, ICHIRO KODA 521, GORO OTOGUCHI 522, HANAKO YAMAKAWA 523, and YOSHIMI ICHIYA 524 will be described as examples of the particular parsons whose faces are registered in the imaging apparatus 100.

Video content files 311 to 315 are captured by the imaging device 100 and stored in the storage medium 160. In addition, these video content files 311 to 31 belong to a video content folder 310. In FIG. 4, the correspondences between the video content files 311 to 315 and the video file entries (#37) 421, (#44) 423, (#53) 431, (#60) 433, and (#69) 441 are represented by dashed arrows that connect the corresponding members together.

Four persons, ICHIRO KODA 521, GORO OTOGUCHI 522, HANAKO YAMAKAWA 523, and YOSHIMI ICHIYA 524 (hereinafter, these persons are simply referred to as persons 521 to 524, respectively), are particular parsons whose faces are registered and managed in registered face entries 461, 463, 465, and 467, respectively. In addition, the feature quantities of the respective face images of the persons 521 to 524 are stored in the metadata entries (#10) 462, (#17) 464, (#24) 466, and (#31) 468 in FIG. 3. In FIG. 4, the correspondences between the persons 521 to 524 and the registered face entries (#7) 461, (#14) 463, (#21) 465, and (#28) 467 are represented by dashed arrows that connect the corresponding members together.

Figure 5:
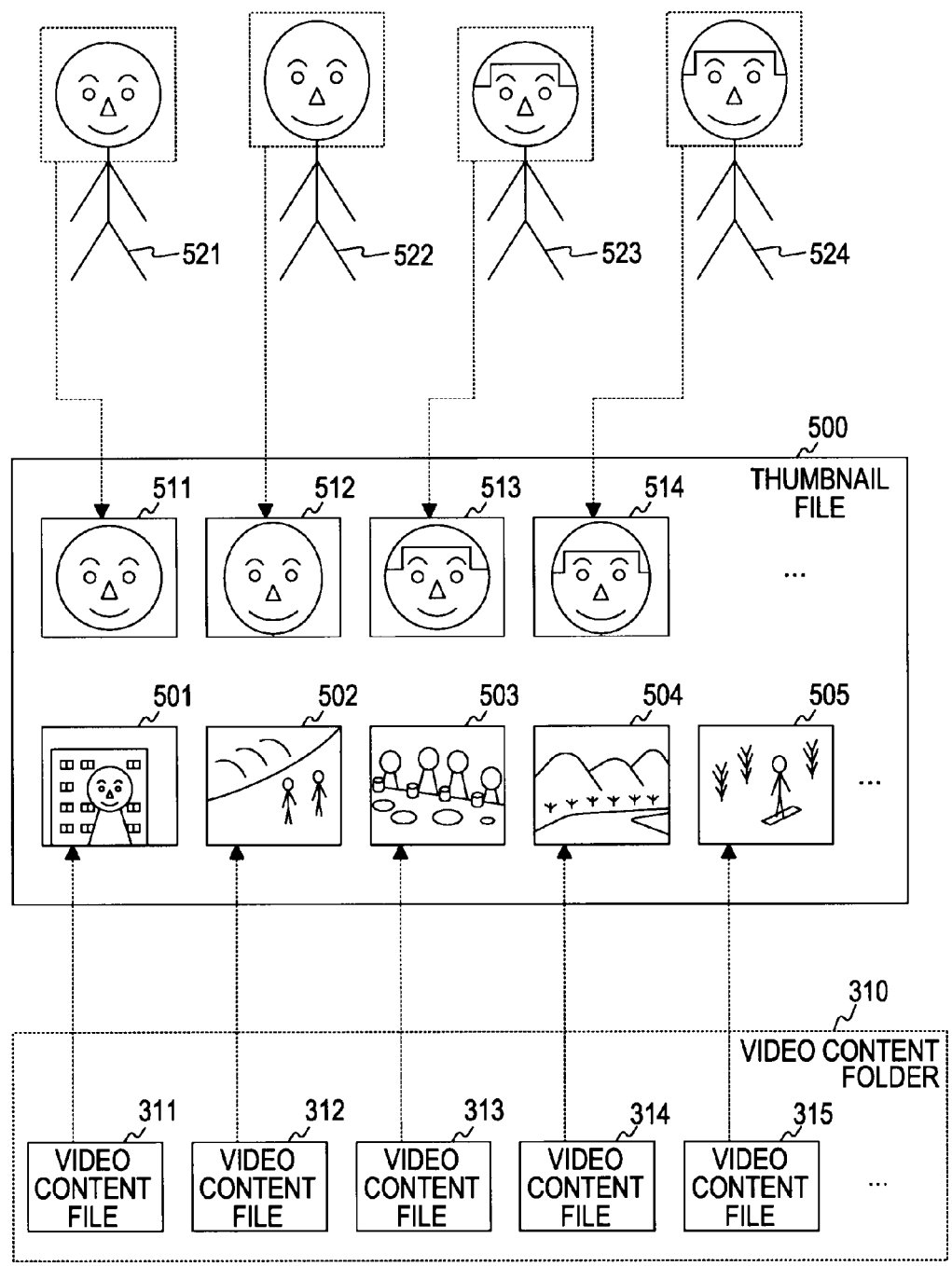
FIG. 5 is a diagram schematically illustrating the correspondences among the respective images stored in a thumbnail file, video content files, and persons in accordance with an embodiment of the present invention.

FIG. 5 is a diagram schematically illustrating the correspondences among the respective images stored in a thumbnail file 500, video content files, and persons in accordance with the embodiment of the present invention. The persons 521 to 524 and the video content files 311 to 315 shown in FIG. 5 are the same as those shown in FIG. 4.

The thumbnail file 500 stores: representative thumbnail images which are representative images of the respective content files; and registered face images each of which contains at least part of the face of a particular person. The representative thumbnail image may be at least one image extracted from the video content file. For example, an image corresponding to the first frame of the video content file is extracted as a representative thumbnail image.

For example, as shown in FIG. 5, face images 511 to 514 are stored as the registered face images of the persons 521 to 524 in the thumbnail file 500. In addition, representative thumbnail images 501 to 506 are stored as representative images of the video content files 311 to 315 in the thumbnail file 500. Furthermore, the details of a method for registering the registered face images will be described in detail with reference to FIG. 6 to FIG. 24.

FIG. 6 is a schematic diagram illustrating a method for registering registered face images stored in the thumbnail file 500 in accordance with the embodiment of the present invention. An example shown in FIG. 6 is a method for registering the registered face images when the imaging apparatus 100 is in registered-face-recording mode.

Figure 6A:
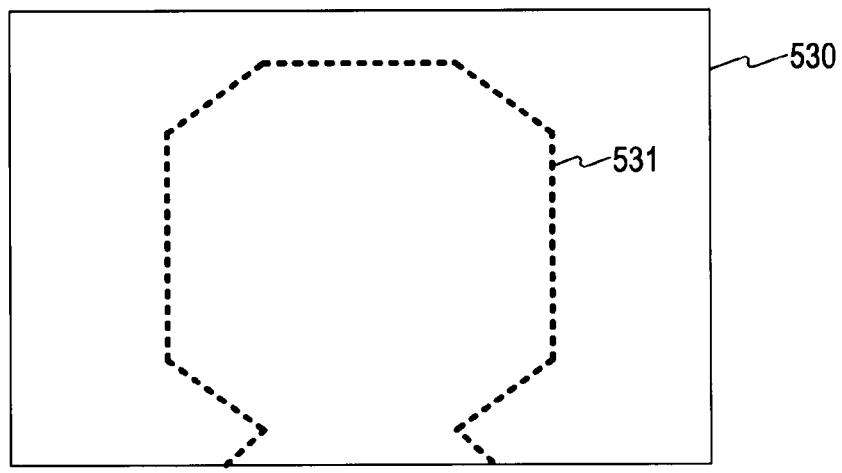
FIG. 6 is a schematic diagram illustrating a method for registering registered face images stored in a thumbnail file in accordance with an embodiment of the present invention.
Figure 6B:
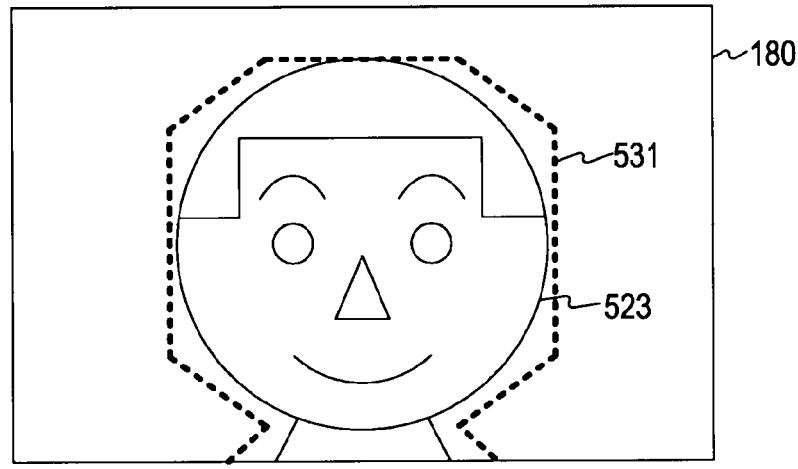

FIG. 6A illustrates a template image 530 that contains an assist image 531 to be represented on the LCD 180 when the imaging apparatus 100 is in registered-face-recording mode. The assist image 531 is provided for facilitating the positioning of a person's face as an imaging subject at an appropriate position in a captured image when the face image is captured for registration. For example, as shown in FIG. 6B, the LCD 180 displays the assist image 531 in registered-face-recording mode. Then, the LCD 180 displays a captured image (so-called a through image) generated by the camera DSP 120 while displaying the assist image 531 thereon.

Figure 6C:
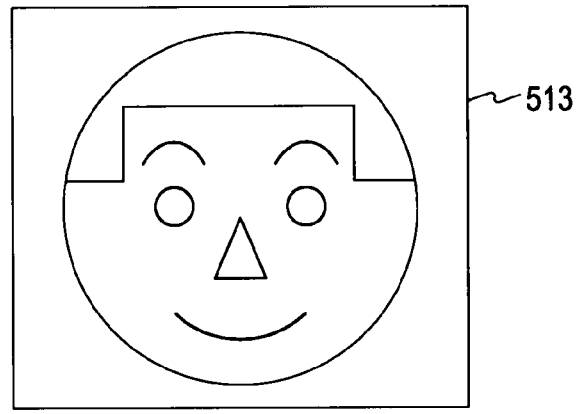

Here, as shown in FIG. 6B, the user may press a registration button when the assist image 531 displayed on the LCD 180 substantially matches the outline of the face (face to be registered) in the captured image. In FIG. 6B, there is represented a case in which the image of HANAKO YAMASHITA 523 is captured. Thus, when the registration button is pressed as described above, an image within a predetermined area of the captured image generated by the camera DSP 120 is recorded as a registered face image in the thumbnail file 500. In FIG. 6C, there is represented a case in which the image of HANAKO YAMASHITA 523 is captured as a registered face image to be stored in the thumbnail file 500. In addition to store the resisted face image in the thumbnail file 500, the registered-face-management information, the registered-face-management information, and the registered-face-attribute information (shown in FIG. 9) are stored in a registered face entry on the lower layer of the registered-face folder entry (#5) 460. Furthermore, the feature quantity of the face is extracted from the registered face image and the extracted feature quantity is then stored in a metadata entry linking to the lower layer of the registered face entry. For example, as shown in FIG. 5, the registered face image 513 of HANAKO YAMAKAWA 523 is stored in the thumbnail file 500. In addition, both the registered-face-management information and the registered face attribute information of the registered face image 513 of HANAKO YAMAKAWA 523 is stored in the registered face entry (#21) 465 (shown in FIG. 4). In addition, the feature quantity of the registered face image 513 of HANAKO YAMAKAWA 523 is stored in a metadata entry (#24) 466 (shown in FIG. 3). Furthermore, the extraction of the feature quantity of a registered face image will be described with reference to FIG. 24. Alternatively, the registered face image may be stored in the thumbnail file 500 after normalization with reference to the eyes.

Figure 7:
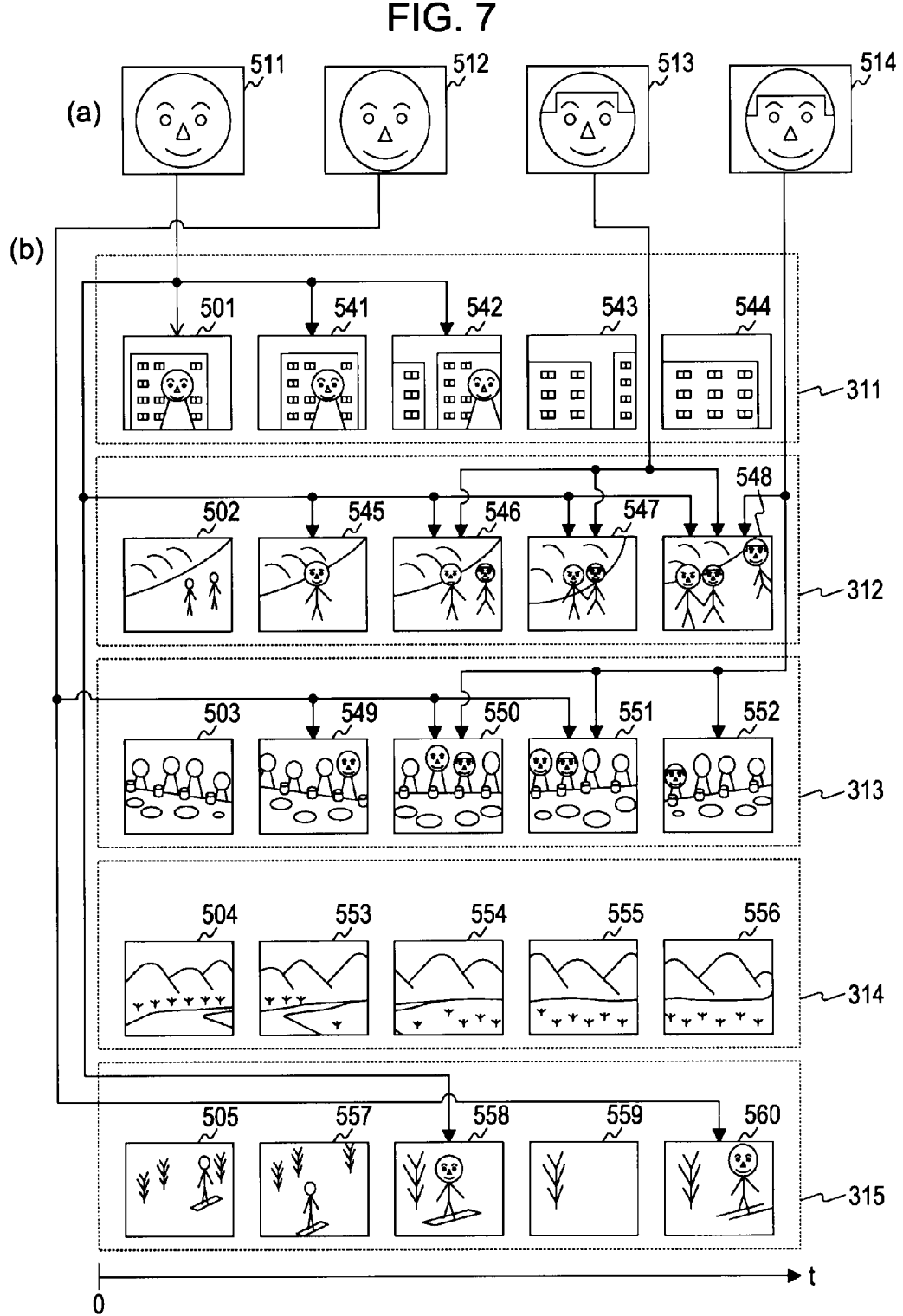
FIG. 7 is a schematic diagram illustrating the relationship between video content files and registered face images, which are stored in a storage medium, in accordance with an embodiment of the present invention.

FIG. 7 is a schematic diagram illustrating the relationship between the video content files 311 to 315 and the registered face images 511 to 514, which are stored in the storage medium 160, in accordance with the embodiment of the present invention. In FIG. 7, each of the video content files 311 to 315 is typically represented by a rectangle. Images corresponding to frames are arranged at regular intervals in the rectangle. In addition, the representative thumbnail images 501 to 506, which are images corresponding to the head of the frames, are arranged on the left corners of the respective rectangles. For example, in the rectangle that represents the video content file 311, the representative thumbnail image 501 and images 541 to 544, which correspond to frames at regular intervals, are lined up along with a sequence of imaging times. In this example, each of the representative thumbnail image 501 and the images 541 and 542 includes the face of the registered face image 511 (ICHIRO KODA).

In addition, for example, each of the representative thumbnail image 502 and the images 545 and 548, which constitute the video content file 312, includes the face of the registered face image 511 (ICHIRO KODA). Similarly, each of images 546 to 548 includes the face of the registered face image 513 (HANAKO YAMAKAWA). The image 548 includes the face of the registered face image 514 (YOSHIMI ICHIYA). Therefore, in FIG. 7, the images that constitute the corresponding video content files 311 to 315 are represented such that the image containing the faces of the respective registered face images 511 to 514 are represented by lines connected to the corresponding registered images 511 to 514.

Here, face data about the face detected in each frame of the video content file is sequentially stored in metadata connected to the lower layer of the video file entry corresponding to the video content file. In addition, faces are sequentially identified on the basis of the feature quantities extracted from the respective detected faces. Subsequently, when the detected face is identified as a registered face, the entry number of the video file entry is stored in the registered face entry corresponding to such a registered face. In the embodiment of the present invention furthermore, an example in which the individual discrimination ID corresponding to the registered face is included in the face data and stored in the metadata entry will be described. Furthermore, these storage procedures will be described with reference to FIG. 10 and FIG. 11.

Next, the relationship between the content management file 340 and the content files will be described with reference to the attached drawings.

Figure 8:
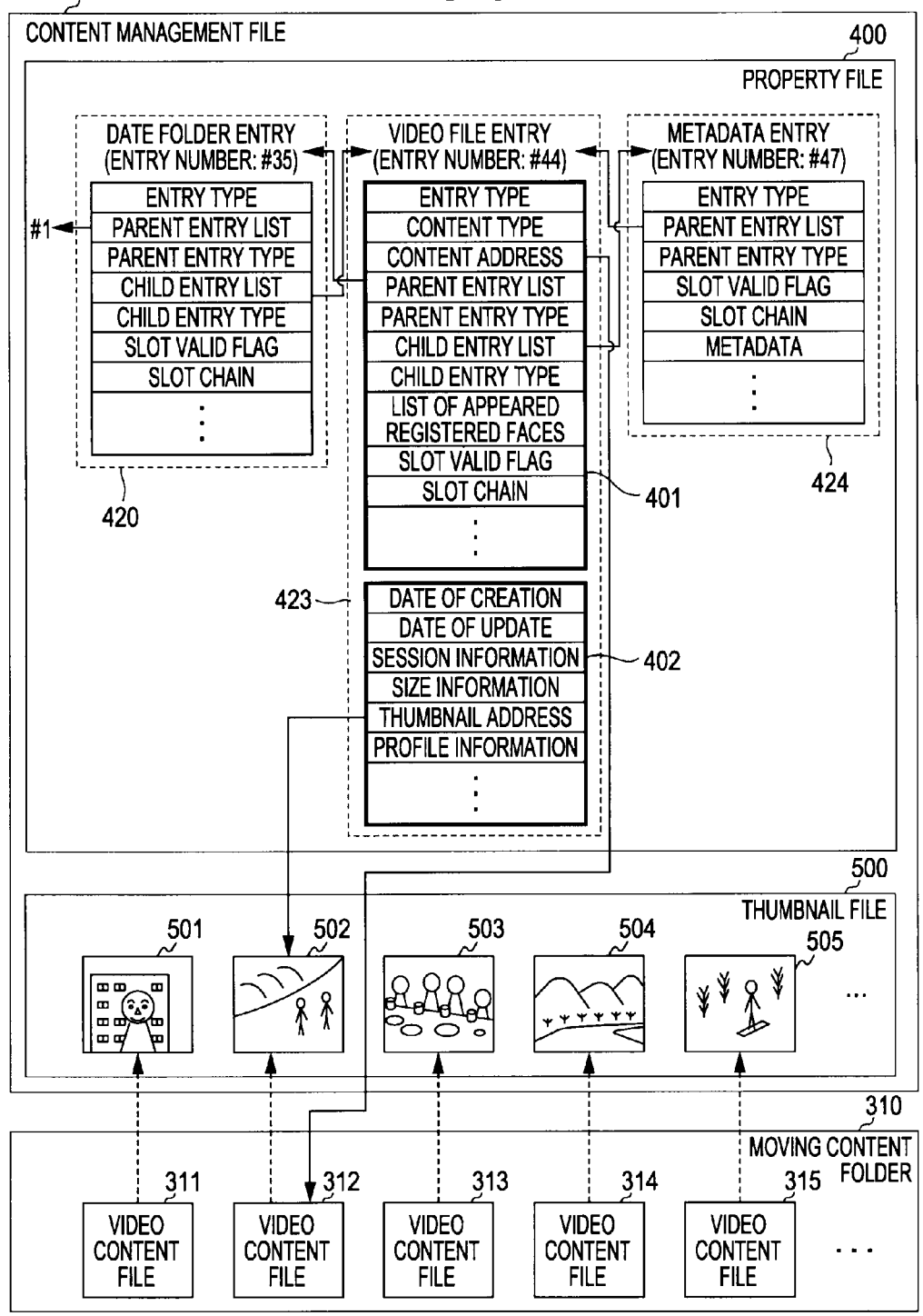
FIG. 8 is a schematic diagram that illustrates the relationship of a property file and a thumbnail file with video content files in accordance with an embodiment of the present invention.

FIG. 8 is a schematic diagram illustrating the relationship between the property file 400 and the thumbnail file 500 that constitute the content management file 340 and the video content files 311 to 315 belonging to the video content folder 310 in accordance with the embodiment of the present invention. Here, the correspondences among the date folder entry (#35) 420, the video file entry (#44) 423, and the metadata entry (#47) 424, which are shown in FIG. 3, the representative thumbnail image 502, and the video content file 312 will be mainly described. The representative thumbnail images 501 to 505 in the thumbnail file 500 and the video content files 311 to 315 in the video content folder 310 are the same as those shown in FIG. 5 and the description thereof will be omitted.

The date folder entry (#35) 420 manages the date of an actual content file. The date folder entry (#35) 420 contains "entry type", "parent entry list", "parent entry type", "child entry list", "child entry type", "slot valid flag", "slot chain", and so on. Each entry number identifies the corresponding entry. For example, the date folder entry 420 is assigned entry number "#3". The method of assigning the entry number will be described with reference to FIG. 12 and FIG. 13.

The "entry type" indicates a type of an entry. Depending on the type of each entry, the entry type may be one of a "video folder entry", a "still image folder entry", a "date folder entry", "video file entry", a "metadata entry", a "registered face folder entry", and a "registered face entry", and so on. For example, the "date folder entry" is stored in the "entry type" of the date folder entry (#35) 420.

The "parent entry list" contains an entry number corresponding to a parent entry as a higher level of the hierarchy (also simply referred to as a higher layer) to which the corresponding entry belongs. For example, "#1" is stored as the "parent entry list" of the date folder entry (#35) 420.

The "parent entry type" indicates the type of a parent entry corresponding to the entry number stored in the "parent entry list". Depending on the type of the parent entry, the "parent entry type" stores one of a "video folder entry", a "date folder entry", a "video file entry", a "still image folder entry", a "registered face folder entry", a "registered face entry", and so on. For example, the "video folder entry" is stored in the "parent entry type" of the date folder entry (#35) 420.

The "child entry list" stores an entry number corresponding to a child entry as a lower level of the hierarchy (also simply referred to as a lower layer) belonging to this entry. For example, "#37" and "#44" are stored in the "child entry list" of the date folder entry (#35) 420.

The "child entry type" indicates the type of the child entry corresponding to the entry number stored in the "child entry list". Depending on the type of the child entry, the "child entry type" may be one of the "video folder entries", the "still image folder entry", the "date folder entry", the "video file entry", the "still image file entry", the "metadata entry", the "registered face entry", and so on. For example, the "video file entry" is stored in the "child entry type" of the date folder entry (#35) 420.

The "slot valid flag" indicates whether the slot forming the entry is valid or not. The "slot chain" is information related to a link or coupling to each slot forming the entry. The "slot valid flag" and the "slot chain" will be described with reference to FIG. 12.

The video file entry (#44) 423 manages an actual content file and stores content management information 401 and content attribute information 402. The content management information 401 stores "entry type", "content type", "content address", "parent entry list", "parent entry type", and so on. In addition, the content management information 401 stores the "child entry list", the "child entry type", the "appeared registered face list", the "slot valid flag", and the "slot chain". The "entry type", the "parent entry list", the "parent entry type", the "child entry list", the "child entry type", the "slot valid flag", and the "slot chain" are identical to those discussed with reference to the date folder entry (#35) 420, and the discussion thereof is omitted herein.

The "content type" indicates a type of a content file corresponding to the file entry. Depending on the type of content file corresponding to the file entry, the "content type" may be one of the "video content file", and the "still image content file". For example, the content type of the video folder entry (#44) 423 is the "video content file".

The "content address" is information indicating a storage position of the video content file stored in the recording medium 160. Accessing to the video content file stored in the recording medium 160 is possible in accordance with the storage position information. For example, the "content address" of the video file entry 414 is "A312" indicating the address of a video content file 312.

The "appeared registered face list" stores the entry number of a registered face entry corresponding to a registered face contained in a content file corresponding to the file entry. For example, as shown in FIG. 7, the video content file 312 corresponding to the video file entry (#44) 423 contains the faces of the registered face images 511, 513, and 514. Therefore, the "appeared registered face list" of the video file entry (#44) 423 stores the entry numbers "#7", "#21", and "#28" of the respective registered face entries 461, 465, and 467 corresponding to the registered face images 511, 513, and 514 (see FIG. 10).

The content attribute information 402 is attribute information of the content file stored in the content management information 401. The content attribute information 402 contains "date and time of creation", "date and time of update", "session information", "size information", "thumbnail address", "profile information", and so on. The "date and time of creation" stores date and time at which the content file corresponding to the file entry has been created. The "date and time of update" stores date and time at which the content file corresponding to the file entry has been updated. Irregularity of the metadata is determined using the "date and time of update". The "session information" stores the information about a time length of the content file corresponding to the file entry. The "size information" stores the information about a size of the content file corresponding to the file entry.

The "thumbnail address" is information that indicates a storage position of a representative thumbnail image stored in the thumbnail file 500. The storage position information allows a user to access to the representative thumbnail image stored in the thumbnail file 500. For example, the "thumbnail address" of the video file entry (#44) 423 stores an entry number "#02" in the thumbnail file 500 of a representative thumbnail image 502 as a representative thumbnail image of the video content file 312. The entry number in the thumbnail file 500 will be described with reference to FIG. 12.

The "profile information" contains an entry number of a video audio entry stored in the profile entry (#150) 406. The video audio entry will be described in detail with reference to FIG. 12C.

The metadata entry (#47) 424 contains the "entry type", the "parent entry list", the "parent entry type", the "slot valid flag", the "slot chain", the "metadata", and so on. The "entry type", the "parent entry list", the "parent entry type", the "slot valid flag", and the "slot chain" are identical to those described with reference to the date folder entry (#35) 420 and the discussion thereof is omitted herein.

The "metadata" stores various kinds of attribute information (metadata) obtained from the content file corresponding to the video file entry at a higher layer where the metadata entry belongs. Various kinds of information stored in the "metadata" will be described in detail with reference to FIG. 16.

FIG. 9 is a diagram schematically illustrating the relationship between the property file 400 and the thumbnail file 500, which constitute the content management file 340, in accordance with the embodiment of the present invention. Here, the correspondences among the registered face entry (#7) 461, the metadata entry (#10) 462, and the registered face image 511, which are shown in FIG. 3, will be mainly described. The registered face images 511 to 514 in the thumbnail file 500 are identical to those shown in FIG. 5 and the description thereof is thus omitted.

Registered face entry (#7) 461 is an entry which manages a registered face, and registered face management information 403 and registered face attribute information 404 are stored. The registered-face-management information 403 stores "entry type", "parent entry list", "parent entry type", "child entry list", "child entry type", "content list of appeared registered faces", "slot valid flag", "slot chain", and so on. Among these kinds of information, the information identical to one indicated in the date folder entry (#35) 420 or the video file entry (#44) 423 shown in FIG. 8 will not be described. Specifically, the same kind of information includes the "entry type", the "parent entry list", the "parent entry type", the "child entry list", the "child entry type", the "slot valid flag", and the "slot chain".

The "content list of appeared registered faces" shows a list of content files in which registered faces corresponding to the registered face entries are included. Subsequently, the entry number of the file entry corresponding to the content file where the registered face belongs is stored in the list. For example, as shown in FIG. 7, the face of the registered face image 511 corresponding to the registered face entry (#7) 461 appears each of the video content files 311, 312, and 315. Therefore, the entry numbers of the respective video file entries 421, 423, and 441 corresponding to the video content files 311, 312, and 315 are stored in the "content list of appeared registered faces" of the registered face entry (#7) 461 (see FIG. 11). In other words, the "content list of appeared registered faces" stores the entry numbers "#37", "#44", and "#69#" of the video file entries 421, 423, and 441.

The registered face attribute information 404 is the attribute information of the registered face stored in the registered face management information 403. The registered face attribute information 404 includes "date and time of creation", "date and time of update", "name of registered face", "individual discrimination ID", "thumbnail address", and so on.

The "date and time of creation" stores date and time at which the registered face image corresponding to the registered face entry has been created. The "date and time of update" indicates date and time at which the registered face image corresponding to the registered face entry has been updated. The "name of registered face" stores the person's name of the registered face corresponding to the registered face entry. For example, the name may be entered by user's manual operation.

The "individual discrimination ID" stores ID for identifying an individual to be given to the registered face corresponding to the registered face. For example, the individual discrimination ID may be automatically provided with an own identification number in order of registration.

The "thumbnail address" stores a storage position of a registered face image stored in the thumbnail file 500. The storage position information allows a user to access the registered face image stored in the thumbnail file 500. For example, the entry number "#11" in the thumbnail file 500 of the registered face image 511 is stored in the "thumbnail address" of the registered face entry (#7) 461. Here, the entry number in the thumbnail file 500 will be described with reference to FIG. 12.

The metadata entry (#10) 462 stores the "entry type", the "parent entry list", the "parent entry type", the "slot valid flag", the "slot chain", the "metadata", and so on. The "entry type", the "parent entry list", the "parent entry type", the "slot valid flag", the "slot chain" are identical to those described with reference to the date folder entry (#35) 420 and the discussion thereof will be omitted herein.

The "metadata" contains various kinds of attribute information (metadata) obtained from the registered image corresponding to the registered face entry at a higher layer where the metadata entry belongs. Here, the basic configuration of the metadata entry linked to the lower layer of the registered face entry is similar to that of the metadata entry linked to the lower layer of the file entry. However, it differs from the metadata entry linked to the lower layer of the file entry in that the feature quantity to be used for face identification is mainly stored in the "metadata" of the metadata entry linked to the lower layer of the registered face entry. Various kinds of information stored in the "metadata" will be described in detail with reference to FIG. 16.

Referring now to the attached drawings, the parent-child relationship between the respective entries stored in the property file, and the correspondences between an appeared registered face list (a list of appeared registered faces) and an appeared registered face content list (a list of contents where a registered face appears) will be described in detail.

Figure 10:
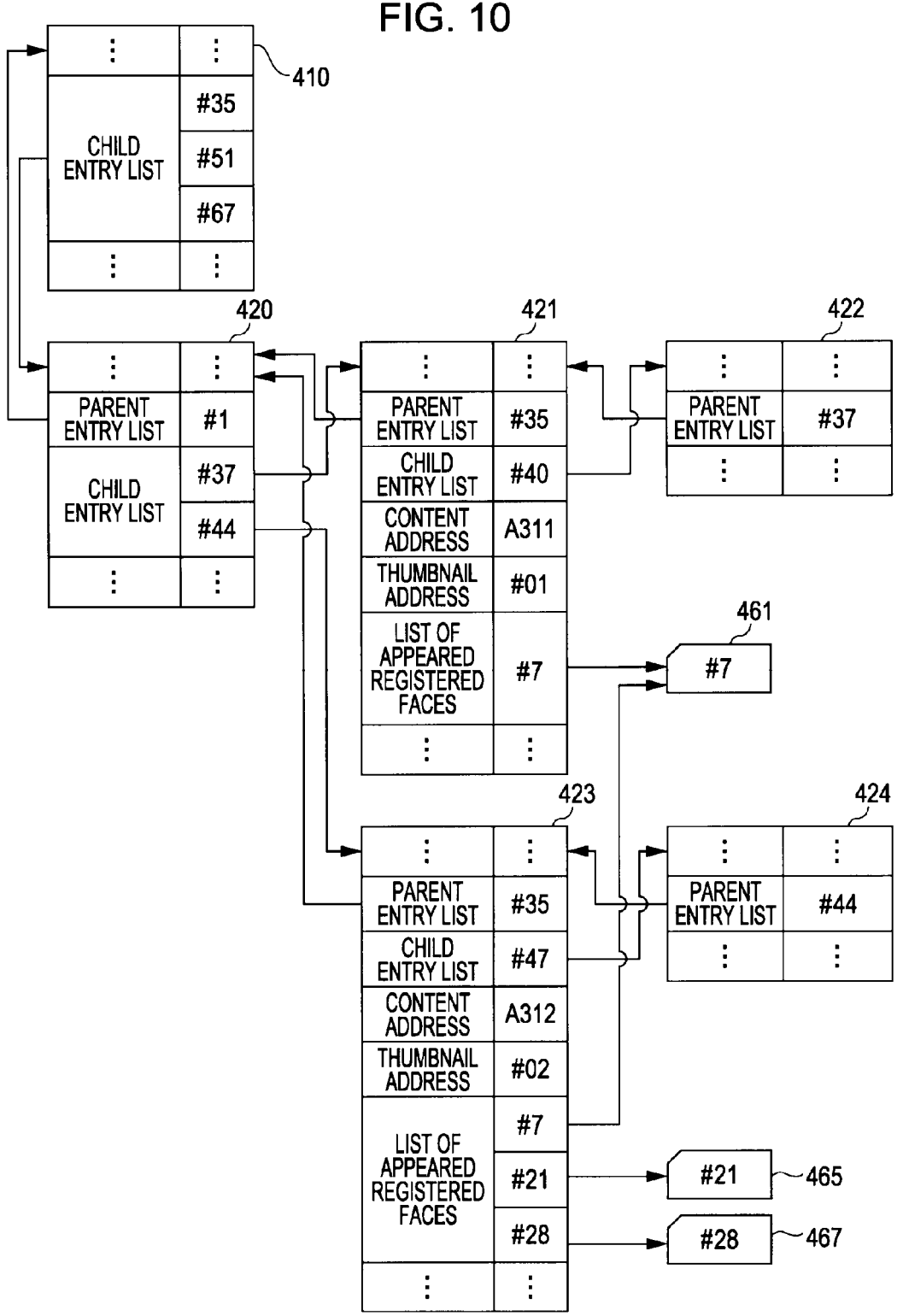
FIG. 10 is a diagram schematically illustrating the parent-child relationship between video folder entries, the parent-child relationship between data folder entries, the parent-child relationship between video file entries, the parent-child relationship between metadata entries, and the correspondence relationship of appeared registered face list.

FIG. 10 is a diagram schematically illustrating the parent-child relationship among the video folder entries, the data folder entries, the video file entries, and the metadata entries and the correspondence relationship of the appeared registered face list. FIG. 10 illustrates an example including the video folder entry (#1) 410, the date folder entry (#35) 420, the video file entries (#37) 421 and (#44) 423, and the metadata entries (#40) 422 and (#47) 424 which are shown in FIG. 3.

The video folder entry (#1) 410 stores information of a "child entry list", and so on. For example, the "child entry list" stores the entries "#35", "#51", and "#67".

The date folder entry (#35) 420 stores information of a "parent entry list", a "child entry list", and so on. For example, the "parent entry list" stores "#1" and the "child entry list" stores "#7" and "#28".

Each of the video file entries (#37) 421 and (#44) 423 stores information of a "parent entry list", a "child entry list", a "content address", a "thumbnail address", a "appeared registered face list", and so on. For example, in the video file entry (#37) 421, the "parent entry list" stores "#35" and the "child entry list" stores "#40". In addition, the "content address" stores "A311", the "thumbnail address" stores "#01", and the "appeared registered face list" stores "#7". Furthermore, "#01" stored in the "thumbnail address" is an entry number in the thumbnail file 500 and is different from the entry number of each entry stored in the property file 400. In addition, the same will be true of a "thumbnail address" shown in FIG. 11.

Each of the metadata entries (#40) 422 and (#47) 424 stores information of a "parent entry list" and so on. For example, in the metadata entry (#40) 422, the "parent entry list" stores "#37". In FIG. 10, the parent-child relationship between the entry lists of the respective entries is represented by an arrow extending from the "parent entry list" or the "child entry list" to the corresponding "child entry list" or the corresponding "parent entry list". In FIG. 10, the correspondence relationship between the appeared registered face lists of the respective video file entries is represented by an arrow extending from the "appeared registered face list" to the corresponding "registered face entry".

Figure 11:
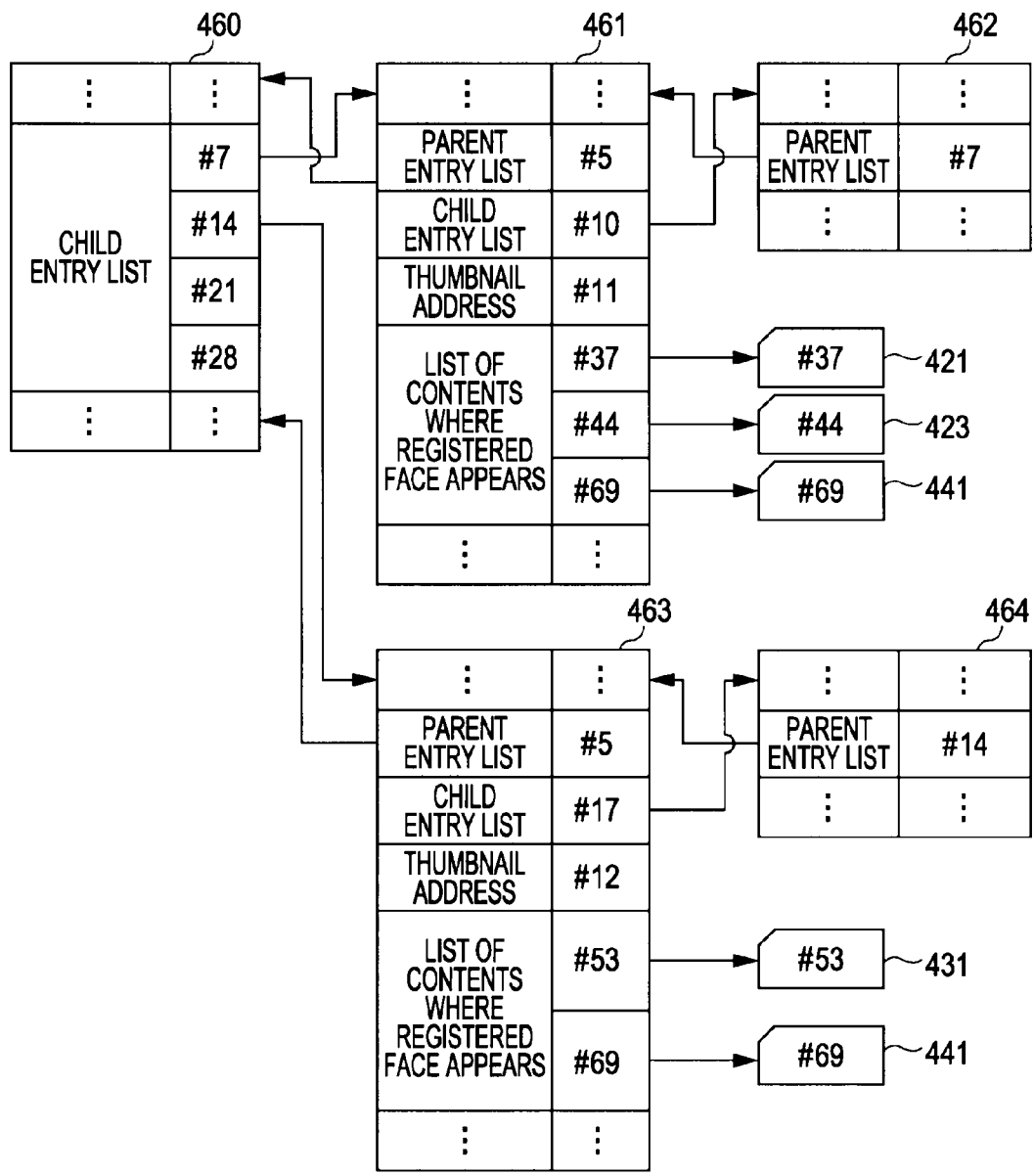
FIG. 11 is a diagram schematically illustrating the parent-child relationship between entry lists of respective registered face folder entries, the parent-child relationship between the entry list of registered face entries and the entry list of metadata entries, and the correspondence relationship between an appeared registered face content list (i.e., a list of contents where a registered face appears) and a video file entry.

FIG. 11 is a diagram schematically illustrating the parent-child relationship among the entry lists of the respective registered face folder entries, the registered face entries, and the metadata entries and the correspondences of the appeared registered face content list. In FIG. 11, example of the parent-child relationship will be described with respect to the registered-face folder entry (#5) 460, registered face entries (#7) 461 and (#14) 463, and metadata entries (#10) 462 and (#17) 464, which are shown in FIG. 3.

The registered-face folder entry (#5) 460 stores information of a "child entry list". For example, "#7", "#14", "#21", and "#28" are stored in the "child entry list".

Each of the registered face entries (#7) 461 and (#14) 463 stores information of a "parent entry list", a "child entry list", a "thumbnail address", a "registered face appearance contents list", and so on. For example, in the registered face entry (#7) 461, "#5" is stored in the "parent entry list" and "#10" is stored in the "child entry list". Furthermore, "#11" is stored in the "thumbnail address" and "#37", "#44", and "#69" are stored in a "registered face appearance contents list".

Each of the metadata entries (#10) 462 and (#17) 464 stores information of a "parent entry list" and so on. In the metadata entry (#10) 462, for example, "#7" is stored in the "parent entry list". In FIG. 11, the parent-child relationship between the entry lists of the respective entries is represented by an arrow extending from the "parent entry list" or the "child entry list" to the corresponding "child entry list" or the corresponding "parent entry list". In FIG. 11, the correspondence relationship between the appeared registered face content lists of the respective registered face entries is represented by an arrow extending from the "appeared registered face content list" to the corresponding "video file entry". The parent-child relationship illustrated in each of FIG. 10 and FIG. 11 is true of all other entries shown in FIG. 3, so that the description thereof will be omitted. In addition, the correspondence relationship illustrated in each of FIG. 10 and FIG. 11 is true of the appeared registered face lists of other video file entries shown in FIG. 3 and the appeared registered face content lists of other registered face entries shown in FIG. 3.

In the property file 400 shown in FIG. 3, there is an example in which one file entry is linked to one corresponding metadata entry. Alternatively, however, one file entry may be linked to two or more metadata entries. In other words, one parent file entry may correspond to two or more child metadata entries.

For example, the child metadata entries of the video file entry (#37) may include a metadata entry (#76) (not shown) that stores GPS information in addition to a metadata entry (#40) 422 that stores face metadata. Then, "#40" and "#76" may be stored in the child entry list of the video file entry (#37) 421. In this case, a storing order of child entry lists may be previously defined according to the types of metadata. Therefore, even in the case of an increase in number of metadata when storing two or more kinds of metadata in one file entry, data management will be prevented from being complicated and the time for extraction of desired metadata will be shortened. Here, the types of metadata may be just the types of data (the types of face metadata, GPS, or the like) or may be the types of cording, such as metadata and binary data.

Furthermore, in the property file 400 shown in FIG. 3, there is an example in which one registered face entry is linked to one corresponding metadata entry. Alternatively, however, one registered face entry may be linked to two or more metadata entries. That is, a plurality of child metadata entries may correspond to one parent registered face entry.

For example, a metadata entry that stores feature data of a usual face of "ICHIRO KODA" is provided as a metadata entry (#10) 462, while a metadata entry that stores feature data of a smile face of "ICHIRO KODA" is provided as a metadata entry (#80) (not shown). Then, "#10" and "#80" are stored in the child entry list of registered face entry (#7) 461 to allow the metadata entry (#10) 462 and the metadata entry (#80) to correspond to the child meta entry of the registered face entry (#7) 461. Alternatively, three or more metadata entries, such as those of smile, angry, and tearful faces may correspond to one registered face entry. Therefore, even when there are two or more contents captured with different facial expressions of "ICHIRO KODA", a user is able to identify a content that includes "ICHIRO KODA" and store the identified content in an appeared registered face content list of the registered face entry (#7) 461.

Figure 12:
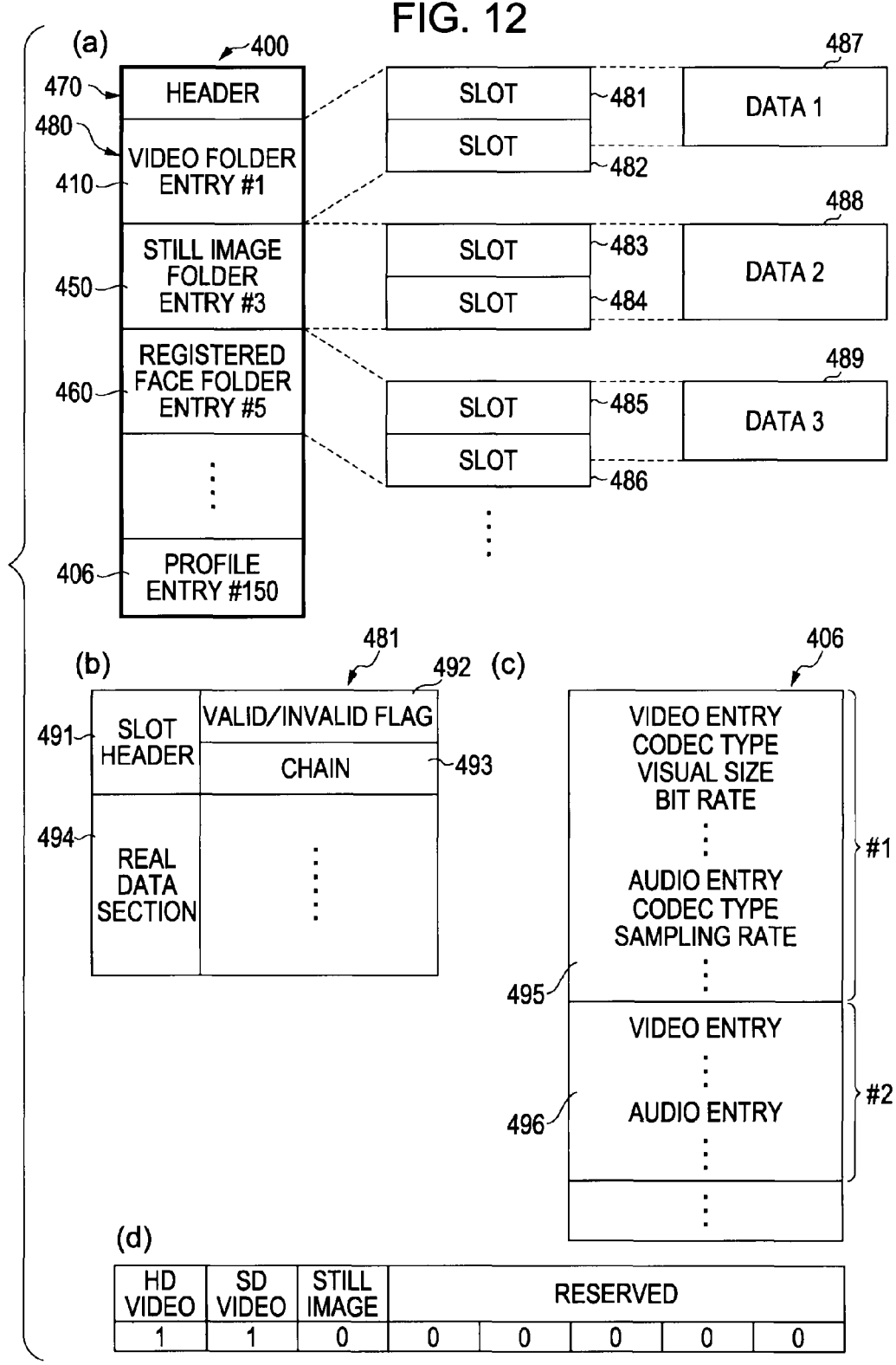
FIG. 12 is a diagram schematically illustrating the basic structure of a property file according to an embodiment of the present invention.

FIG. 12 is a diagram schematically illustrating the basic structure of the property file 400 according to the embodiment of the present invention. FIG. 12A illustrates an example of the basic structure of the property file 400, FIG. 12B illustrates the configuration of a slot in each entry, and FIG. 12C illustrates an example of information in the profile entry (#150) 406. In addition, among different kinds of information contained in a header section 470, FIG. 12D illustrates an example of information representing the types of contents managed by the content management file 340.

Figure 13:
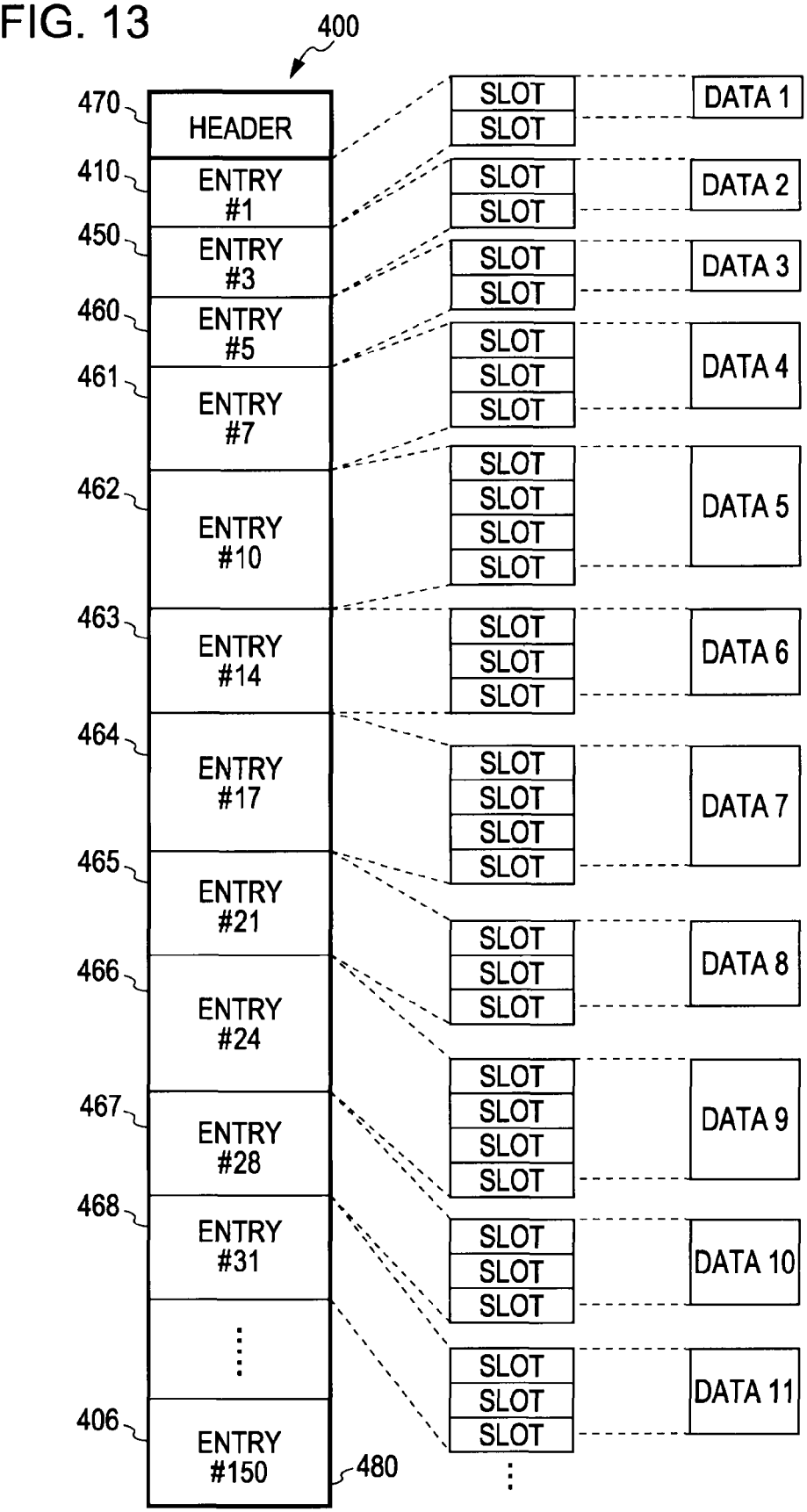
FIG. 13 is a diagram schematically illustrating the entire configuration of a property file according an embodiment of the present invention.

FIG. 13 is a diagram schematically illustrating the entire configuration of the property file 400 according the embodiment of the present invention.

As shown in FIG. 12A, the property file 400 has a basic structure that includes a header section 470 and a entry section 480 in which each of entries is a unit that represents one folder, one file, or the like.

Each of entries that constitute the entry section 480 includes one or more slots. Depending on the volume of data stored in each of the entries, one or more slots are assigned to the entry. In addition, the slot of each entry is defined as a data block with a fixed length determined for every file, such as a property file or a thumbnail file. However, since different entries may have different numbers of slots, the lengths of the respective entries vary in proportion to integral multiplication of the slots.

As shown in FIG. 12A, the video folder entry (#1) 410 is assigned two slots 481 and 482 depending on the data size of data 487 to be stored. The still image folder entry (#3) 450 is assigned two slots 483 and 484 depending on the data size of data 488 to be stored.

Since the slot is fixed in length, the entire area of the slot is not typically filled with valid data. Sometimes, it may suffer data loss. However, the use of the fixed length slot is preferable in terms of improving data accessing and data management.

Each entry of the entry section 480 is managed by entry number as shown in FIG. 3. The entry number is assigned considering the number of slots present from the first slot of the entire property file 400 to the leading slot of the entry. As shown in FIG. 12A and FIG. 13, for example, the leading slot 481 among the slots 481 and 482 of the video folder entry (#1) 410 becomes the first of all the slots in the entire property file 400 when counting from the head thereof. Thus, "#1" is assigned as an entry number of the video folder entry (#1) 410. In addition, the leading slot 483 among the slots 483 and 484 of the still image folder entry (#3) 450 becomes the third of all the slots in the entire property file 400 when counting from the head thereof. Thus, "#31" is assigned as an entry number of the still image folder entry (#3) 450. Furthermore, the leading slot 485 among the slots 485 and 486 of the registered face folder entry (#5) 460 becomes the fifth of all the slots in the entire property file 400 when counting from the head thereof. Thus, "#5" is assigned as an entry number of the still image folder entry (#5) 460. The same is true of the entry numbers of other entries. In accordance with the entry number, the entries are managed and the parent-child relationship of each entry is also managed. In searching an entry, each slot that constitutes the entry section 480 is counted from the beginning, and it retrieves the target entry.

As shown in FIG. 12B, the slots forming each entry contains a slot header section 491 and an actual data section 494. The slot header section 491 includes a valid/invalid flag 492 indicating the validity of the slot and a chain 493.

If a valid corresponding content file is present, a flag is set at the valid/invalid flag 492. If the corresponding content file is deleted, an invalid flag is set. In this way, when the corresponding content file is deleted, the invalid flag is set and this slot looks as if non-existent with deletion of information within the slot corresponding to the deleted content file being inactivated. Without the valid/invalid flag 492, deletion of information within the slot corresponding to the deleted content file becomes necessary if the corresponding content file is deleted. In addition, information within a slot subsequent to a deleted slot should be shifted forward to fill in the deleted slot. Therefore the process becomes complicated when there is no effective/invalid flag 492.

The chain 493 stores information for link and coupling for linking slots. Information contained in the chain 493 forms a single entry linking a plurality of entries. The actual data section 494 stores actual data of each entry.

The profile entry (#150) 406 stores approximately 100 kinds of data, each including a pair of video and audio codec information in each content file. The video entry as the codec information about video stores a "codec type", a "visual size", a "sampling rate", a "bit rate", and so on. The audio entry as the codec information about audio stores "codec type", "sampling rate", and so on. Each pair of video and audio entries is assigned an entry number. The entry number is assigned in the storing order within the profile entry (#150) 406. As shown in FIG. 12C, for example, a first pair of video and audio entries 495 is assigned "#1" and a second pair of video and audio entries 496 is assigned "#2". The entry number of the pair of video and audio entries is stored in "profile information" of the file entry (see FIG. 8). The codec information of the content file corresponding to the file entry is read in accordance with the entry number stored in the "profile information".

The thumbnail file 500 is substantially identical in structure to the property file 400 and each entry includes one or more of slots. Each entry serves as a unit for indicating one representative thumbnail image or registered face image. The thumbnail file 500 has no header section. Each slot is fixed in length in the file. The slot size of one slot is stored in the header section 470 of the property file 400. The correspondence relationship of the entries within the thumbnail file 500 is stored in the property file 400. In this example, the slot size of the thumbnail file 500 is different from that of the property file 400.

The slot size of the thumbnail file 500 may be defined for every thumbnail file and may be stored in the header section 470 of the property file 400. The thumbnail file name of the thumbnail file 500 is stored in the header section 470.

A representative thumbnail image of the content file is stored for each file entry corresponding to the content file in the thumbnail file 500. Here, in the case of a standard thumbnail file, one slot corresponds to one file entry. Each entry of the thumbnail file 500 is assigned an entry number. The entry number of the thumbnail file is a slot number if one entry within the thumbnail file corresponds to one slot. The entry number of the thumbnail file is stored in the "thumbnail address" of each file entry (see FIG. 8 to FIG. 11).

The header section 470 stores a variety of information managing each entry. For example, as shown in FIG. 12D, the header section 470 stores information indicating the type of a content file managed by the content management file 340. In the example of FIG. 12D, the content file managed by the content management file 340 is a high definition (HD) video or a standard definition (SD) video, but is not a still image. In even a content storage device which is capable of storing a video and a still image, the content management file 340 may not manage a still image. The still image stored in the header section 470 as shown in FIG. 12D is managed in a standard file system. Since the video is also managed in the standard file system, the content is played in accordance with information of the file system in a content player device that does not support the content management file. The imaging device 100 may be connected to another content player device or a removable storage medium may be transferred to another content player device for playing. If the other content player device supports the content management file, the content file may be read in accordance with the content management file. The header section 470 stores an entry number of the profile entry (#150) 406. The position of the profile entry is thus identified among the entries of the entry section 480.

FIG. 13 is a diagram schematically illustrating a relationship of each entry of the property file 400, the slot corresponding to the entry, and data stored in each slot. In FIG. 13, a square that represents each entry is only labeled with its entry number. The name of the entry is omitted. In addition, in FIG. 13, entries and profile entries provided with smaller numbers are represented on behalf of all of the entries shown in FIG. 3.

Figure 14:
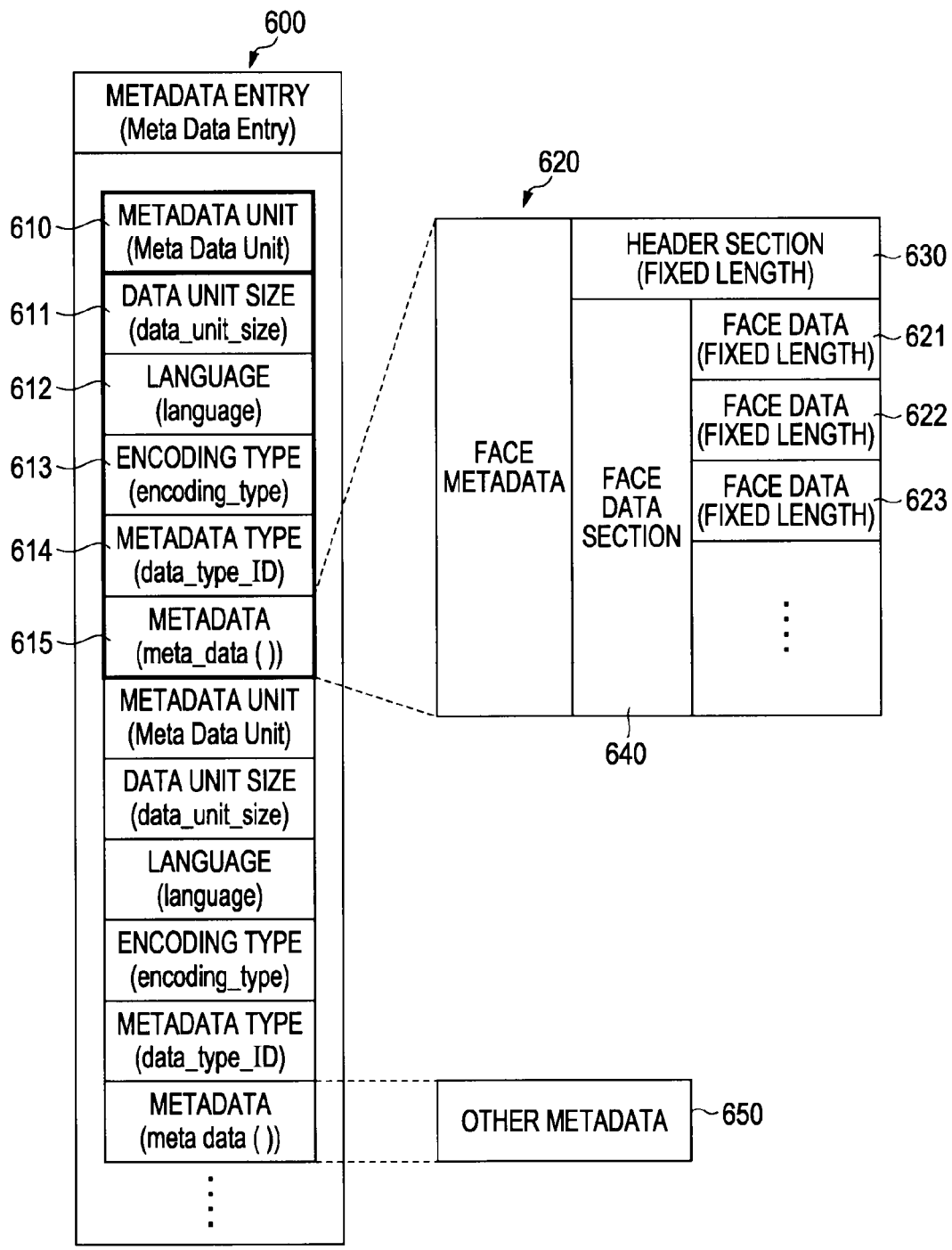
FIG. 14 is a diagram schematically illustrating an internal structure of a metadata entry.

FIG. 14 is a diagram schematically illustrating an internal structure of the metadata entry 600. The metadata entry 600 corresponds to a metadata entry (#40) 422 belonging to the lower layer of the video folder entry (#1) 410 and a metadata entry (#10) 462 belonging to the lower layer of the registered-face folder entry (#5) 460, which are shown in FIG. 3. In the embodiment of the present invention, face metadata is stored for every video content file. In addition, face metadata (feature quantity) is stored for every particular person.

The metadata entry 600 includes one or more of metadata units (Meta_data_Unit) 610. Here, metadata unit 610 is constituted by data unit size (data_unit_size) 611, language (language) 612, and coding format (encoding_type) 613. In addition, the metadata unit 610 further includes metadata type (data_type_ID) 614 and metadata (meta_data( )) 615.

The data unit size 611 contains the size of metadata stored in the metadata unit 610. The language 612 contains the language of metadata stored in the metadata unit 610. The coding format 613 contains the coding format of metadata stored in the metadata unit 610. The metadata type 614 contains identification information for identifying each type of metadata.

Furthermore, the metadata 615 stores face metadata 620 and metadata 650 other than the face metadata. For example, the metadata 650 may include title information and genre information of the content file.

The face metadata 620 includes a header section 630 and a face data section 640. The header section 630 stores information for managing the face metadata. The header section 630 has a fixed length which is defined for every content file or registered face. The face data section 640 corresponding to the content file stores face data of each face to be stored as face metadata, where the face is detected from the content file. For example, the face data section 640 stores face data 621 to 623. As shown in FIG. 16, the face data contains the face detection time information, the basic face information, the face score, the smiling face score, and so on. The face data section 640 stores one video content file as a fixed length. On the other hand, the face data section 640 corresponding to the registered face stores the feature quantity extracted from the registered face image of a particular person as face metadata. As shown in FIG. 16, the face data includes the personal identification ID, the feature quantity of face, and so on. In addition, the face data section 640 stores the registered face image of one person as a fixed length. Since each of the header section 630 and the face data section 640 is a fixed length, accessing to the face data is easily performed.

The other metadata 650 has the same structure as the face metadata 620, so that the description thereof will be omitted.

FIG. 15 illustrates a summary of information to be stored in the header section 630.

The header section 630 stores a header size 631, a metadata version 632, a content update date and time 633, a face data structure flag 660, a time scale 634, and a face data unit count 635. The header section 630 further stores a face data size 636, a face detection engine version 637, a content image size 638, and an error detection code value 639. The data size of each of these storage sections of data is represented by the unit of byte as listed in the column of "size" in FIG. 15. Hereinafter, the face metadata of the video content file (metadata entry on the lower layer of the video file entry) will be mainly described. In the case of the face metadata of a registered face (metadata entry on the lower layer of the registered face entry), for example, "0" is recorded except the header size 631 and the face data structure flag 660.

The header size 631 stores a data size of the header section 630. Thus, when the face data section 640 is accessed, the header size 631 allows an immediate access to the face data section 640 by jumping over the header section 630. The data size of the header size 631 is 2 bytes.

The metadata version 632 stores the version information of the face metadata stored in the face data section 640 corresponding to the header section 630. When a content file is played on the content player device, the content player device examines the version of the face data stored in the metadata version 632 to verify whether the version is the one supported by the player device. In accordance with one embodiment of the present invention, "1.00" is recorded. The data size of the metadata version 632 is 2 bytes where upper 8 bits indicate a major version while lower 8 bits indicate a minor version. If the face metadata format is extended, extended version information is stored here.

The content update date and time 633 stores an update date and time at which the content file has been stored. For example, a video content file captured by the imaging apparatus 100 may be transferred to another device and the edited video content file may be then stored in the imaging apparatus 100. In this case, a discrepancy occurs between the edited video content file and the face metadata. Specifically, for example, the video content file may be transferred in three steps 1 to 3 as described below. In such a case, a discrepancy is detected, face metadata is re-detected from a video content file B, and the discrepancy having occurred between the edited video content file and the face metadata is thus corrected.

(1) Step 1

A video content file A is stored in a content storage device A, and face metadata corresponding to the video content file A is then generated. In this case, the date and time of creation and the date and time of update of the video content file A are identical to the content update date and time of the face metadata.

(2) Step 2

The video content file A is transferred to the content player device B and then edited on the content player device B. The video content file A thus becomes a video content file B. In this case, the update date and time of the video content file B is updated to those at editing.

(3) Step 3

The video content file B is transferred to the content storage device A. In this case, the video content file B and the face metadata are different in the values of the content update date and time.

The face data structure flag 660 contains a flag indicating the presence or absence of the metadata defined by the face data stored in the face data section 640. The face data structure flag 660 will be described in detail with reference to FIG. 17 to FIG. 22.

The time scale 634 contains a record of a time scale (indicating the number of units per second) of time information used in the face data section. More specifically, information indicating time at which a face is detected from the video content file (face detection time information) is stored as the face data on the face data section. The time scale of the time information is stored in the time scale 634. The unit of the time scale 634 is Hz. The face data unit count 635 stores a record of a count of face data units recorded in succession to the header section 630. If no face is detected, "0" is recorded.

The face data size 636 contains information indicating a data size of a single face data unit stored in succession to the header section 630. Jumping to each face data unit is possible in accordance with the information stored in the face data size 636. If no face is detected, "0" is recorded.

The face detection engine version 637 stores information relating a face detection engine for detecting a face from the video content file. If the content player device recognizes, during playing of the face metadata, the face metadata that has been detected by a face detection engine lower in performance than own device, the face detection engine version 637 serves as a criterion as to whether to re-detect the face metadata. The information relating to the face detection engine is described in ASCII code, for example.

For example, if the metadata version is "1.00", data recording is performed on the face data section 640 in the order described in FIG. 16. When a content player device recognizes the metadata version as "1.00", desired data of the face data section 640 is quickly accessed because each data having a fixed length is locate data predetermined location.

The content image size 638 stores information indicating a height and width of the image from which a face is detected. The error detection code value 639 stores information indicating an error detection code value (error correction code value) calculated within a predetermined range of the image from which the face has been detected. For example, a value of a checksum calculated from the corresponding image data is recorded onto the error detection code value 639 during the production of the face metadata. The checksum is used for the error detection code value. Alternatively, the error detection code value may be one of cyclic redundancy check (CRC) value and a hush value based on a hush function.

Like the content update date 633, the content image size 638 and the error detection code value 639 may be used to detect a discrepancy occurring between the video content file and the face metadata. The mechanism of causing a discrepancy is identical to above-described steps 1 to 3. For example, a still image content file contains a large number of still image editing software programs, and in some programs, content date and time in the content data may be left unupdated even when a still image updated. In such a case, comparison process is performed on the content update date and time and content image size. Discrepancy is thus reliably detected.

FIG. 16 is a diagram schematically illustrating the face data stored on the face data section 640 in accordance with the embodiment of the present invention. The face data section 640 stores the face data in the order of bit assignment of the face data structure flag 660 of the header section 630.

The face data section 640 stores face detection time information 641, basic face information 642, a face score 643, a smiling face score 644, a face importance 645, a personal identification ID 646, and a face feature quantity 647. The storage section of these pieces of information is byte. Hereinafter, an example of the face metadata of the video content file (metadata entry on the lower layer of the video file entry) which will be described herein is defined with the metadata version of "1.00". In addition, for example, only the personal identification ID 646 and the face feature quantity 647 are stored as the face metadata of a registered face (metadata entry on the lower layer).

The face detection time information 641 stores time of a frame from which the face data is detected with the head of the corresponding video content file being "0". The face detection time information 641 contains a value that is an integer multiple of the time scale stored in the time scale 634 of the header section 630.

The basic face information 642 stores information regarding a position and size of a face detected from each frame forming the video content file. In the basic face information 642, the face position information is defined by upper 4 bytes and the face size information is defined by lower 4 bytes. For example, the face position information may indicate a difference between the left top corner of the image from which the face is detected and the top left point of the detected face, and a horizontal axis of the face is defined by upper 16 bits and a vertical axis of the face is defined by lower 16 bits. For example, the face size information indicates an image size of the detected face, and a face width is defined by upper 16 bits and a face height is defined by lower 16 bits. The basic face information 642 is the most important metadata in applications that use the face metadata.

The face score 643 stores the information about scores representing a face likeliness of the detected face.

The smiling face score 644 stores the information about scores indicating how much the detected face is smiling.

The face importance 645 stores information indicating the priority order (importance) of images detected at the same time. For example, a plurality of faces may be detected within the same frame. A high priority may be assigned to a face closer to the center of the image or a focused face. In the information contained therein, the smaller the value, the more important the face is. For example, "1" may be the most important value. Even when the image is displayed on a small screen on a mobile terminal, only a face having the highest priority may be displayed in place of displaying the remaining faces in small size.

The personal identification ID 646 stores identifiers provided for the respective registered faces to identify the detected face. In addition, for example, in the case of the face metadata of a registered face (metadata entry on the lower layer), the personal identification ID of the registered face corresponding to the registered face entry on a higher layer is stored. In addition, when it is determined that the detected face corresponds to any of the registered faces, the personal identification ID corresponding to the registered face is stored face metadata of a video content file (metadata entry on the lower layer of the video file entry).

The face feature quantity 647 stores an algorithm to be used when the feature quantity is extracted from the detected face and discrimination information for discriminating a dictionary or the like used in discrimination of faces. In addition, in the case of face metadata of a registered face (metadata entry on the lower layer of a registration face entry), the face feature quantity 647 stores a feature quantity for identifying a person. In the case of face metadata of a video content file (metadata entry on the lower layer of a video file entry), when it is determined that the detected face corresponds to any of the registered faces, a feature quantity extracted from the detected face may be stored.

In accordance with one embodiment of the present invention, when the face data about the detected face is stored, the face data is stored in the order of detection thereof. The face data can thus be searched quickly in a chronological order. Furthermore, the metadata contained in all face data in the same video content file is considered the same type and the face data is stored in the order illustrated in FIG. 16. It is not necessary to store all data of FIG. 16, but the metadata of the same type in the same video content file is stored. In this way, all face data remains in a fixed length, thereby increasing accessibility to the face data. Since the metadata of the same type in the same video content file is stored, accessibility to predetermined metadata is improved.

FIG. 17 illustrates a data structure of the face data structure flag 660 of the header section 630 in accordance of the embodiment of the present invention (shown in FIG. 15). FIGS. 18 and 22 illustrate a relationship between bits stored in the face data structure flag 660 and the face data stored in the face data section 640 in accordance with the embodiment of the present invention.

In accordance with the embodiment of the present invention, as shown in FIG. 16, seven units of metadata of the face data section 640 are defined. data is assigned to 0 bit to 6 bit starting with least significant bit (LSB) of the face data structure flag 660 in accordance with the order of the face data section 640. Each bit of the face data structure flag 660 is filled with an indication of presence or absence of the data of the corresponding data field of the face data. More specifically, if data is present in the data field of the face metadata, "1" is stored in the corresponding bit of the face data structure flag 660 and if no data is present in the data field of the face metadata, "0" is stored in the corresponding bit. In this way, if meta data is present in the face data section 640, "1" is set in the corresponding bit. In the face data structure flag 660, 6 bit and subsequent bits are reserved for future extension. Furthermore, in the face data structure flag 660, 7 bit and subsequent bits are reserved for future extension in the inside of the face data.

More specifically, for example, in the case of face metadata of a video content file, the face data section 640 stores date defined by the metadata version "1.00" as shown in FIG. 18A. In this case, as shown in FIG. 18B, bit 0 through bit 6 starting with LSB are filled in with "1". The imaging apparatus 100 does not necessarily store all the data but stores necessary data. The face metadata is stored flexibly depending on applications of the face metadata and an amount of data handled is thus reduced.

In addition, for example, in the case of face metadata of a registered face (metadata entry on the lower layer of a registration face entry), the face data section 640 stores data of personal identification ID and face feature quantity as shown in FIG. 19A. In this case, as shown in FIG. 19B, bit 0 through bit 4 starting with LSB are filled in with "0" and bit 5 through bit 6 starting with LSB are filled in with "1".

In addition, in the case of face metadata of a video content file (metadata entry on the lower layer of a video file entry), for example, metadata in the face data section 640 is defined as shown in FIG. 20 to FIG. 22.

As shown in FIG. 20A, for example, another content storage device stores three units of data of the seven units of data defined by the metadata version of "1.00" in the face data section 640. In such a case, the order of the recorded metadata is the one illustrated in FIG. 16, and empty fields having no data are filled with data. FIG. 20B illustrates an example of actual data of the face data structure flag 660 stored in another content storage device, and "1" is store data flag assigned to a data field present as the face data. In this way, within the range defiled by the metadata version of "1.00", the content storage device may store any metadata. Even if different metadata is stored in another content storage device, the content player device playing the face metadata references information at the header section, thereby verifying the presence or absence of the metadata in the metadata. Since the face data is fixed in data length, desired metadata is accessed fast.

An extension method of the face data stored in the face data section 640 in accordance with one embodiment of the present invention is described with drawings. If the face detection technique is improved in the future or if the face detection results are used in new applications, the metadata defined by the metadata version of "1.00" alone may be insufficient. Hereinafter, therefore, an example of extending face data stored in the face data section 640 will be described.

FIG. 21A illustrates an example of extended face data. The extended face data includes a "sex difference score" indicating a sex difference in a detected face and "angle information" indicating an angle of the detected face in the frame. The face metadata with these pieces of data added thereto is defined as a metadata version of "1.10", and "1.10" is stored in the field of a metadata version 632 of the header section 630. The metadata is extended by adding new metadata below the data defined by the preceding version. More specifically, when the data is stored in the storage medium 160, the data defined by the version "1.10" is stored in unit of face data from a physical address in succession to a physical address having the data defined by the version of "1.0" recorded thereon. Similarly, subsequent metadata is stored in unit of face data on an address in succession to the physical address having the data defined by the version of "1.10" recorded thereon.

FIG. 22 illustrates metadata stored by one storage device among the metadata defined by the version of "1.10". For example, when the extended face data of FIG. 21A is stored, it is not necessary to store all the face data of FIG. 21A. If any face data is not stored, predetermined face data of the face data of FIG. 21A is stored in the order of data shown in FIG. 22A with empty data fields having no face data is filled with present data.

Along with version upgrade to "1.10", the face data structure flag is also extended. A bit that is reserved in the version of "1.00" is assigned a new bit in the order of fields defined as shown in FIG. 21A. If data is present in the face data section, "1" is set as shown in FIG. 21B. The player device supporting the version of "1.10" verifies the bit train of the face data structure flag of the header section and recognizes the data structure of the face data section. Since each face data is fixed in data length, desired metadata is accessed fast.

The storage device supporting the version of "1.10" may store the face metadata in a removably loaded storage medium thereof and the storage medium may be transferred to a player device that supports the version of "1.00" only. In such a case, the player device can recognize bit 0 through bit 6 of the face data structure flag of the header section. Since specifications of the face data size remain unchanged, the player device can recognize the face data defined by the version of "1.00" if face data not defied by the version of "1.00". In an example shown in FIG. 22, for example, the player device can recognize the "face detection time information", the "basic face information", the "face score", the "face importance", the "personal identification ID", and the "face feature quality". The player device can thus access these pieces of information. The metadata entry has a data structure excellent in accessibility and can support a modification in the structure even when the version of a recorder or player is changed.

The functional structure of the imaging device 100 in accordance with one embodiment of the present invention is described below.

Figure 23:
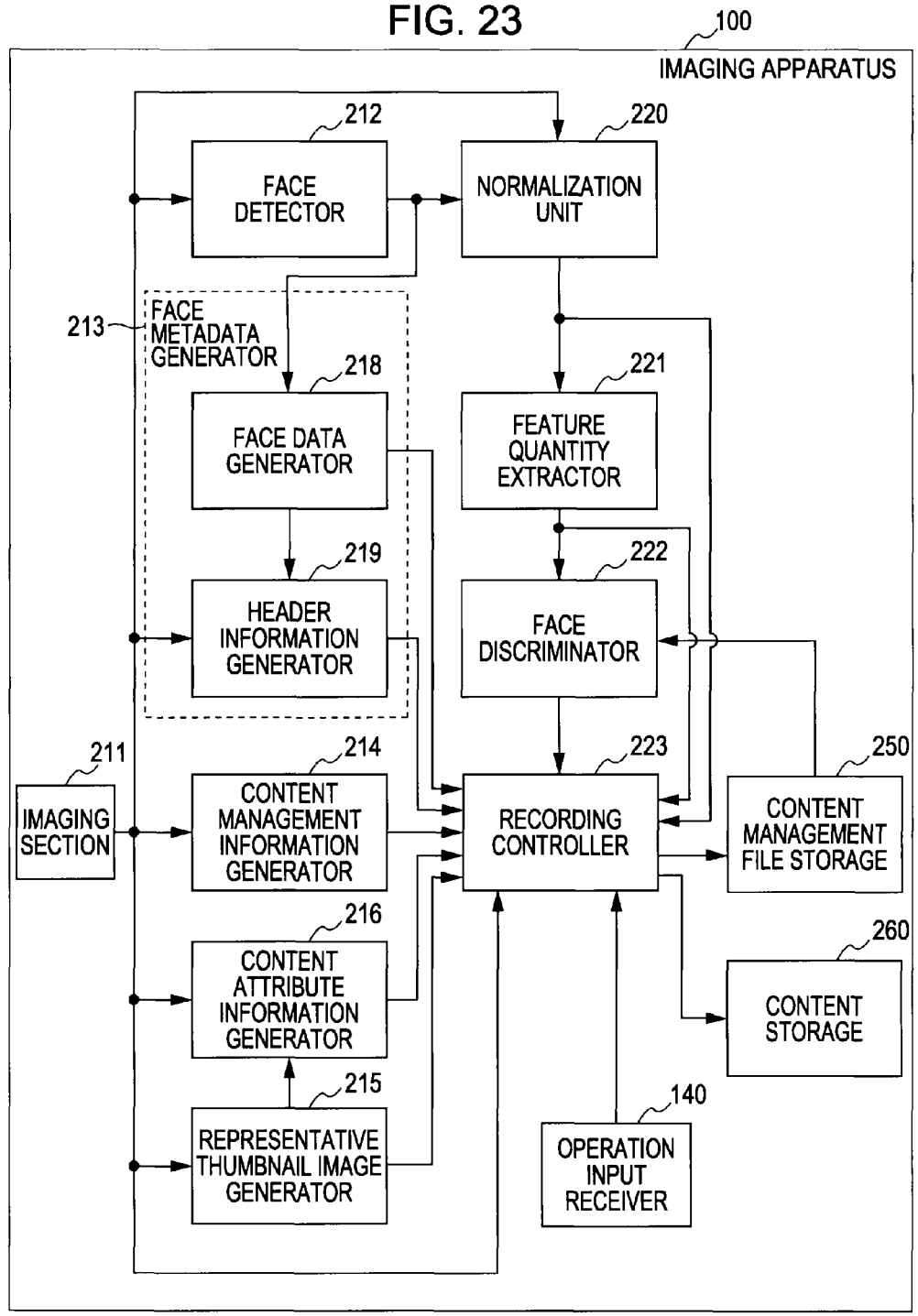
FIG. 23 is a block diagram illustrating an imaging apparatus according to one embodiment of the present invention.

FIG. 23 is a block diagram illustrating the imaging apparatus 100 of one embodiment of the present invention. The imaging apparatus 100 includes an operation input receiver 140, an imaging unit 211, a face detector 212, a face metadata generator 213, a content management information generator 214, a representative thumbnail image extractor 215, and a content attribute information generator 216. In addition, the imaging apparatus 100 further includes a normalization unit 220, a feature quantity extractor 221, a face discriminator 222, a recording controller 223, a content management file storage 250, and a content storage 260. The operation input receiver 140 is identical to one shown in FIG. 5 and the description thereof is thus omitted.

The content management file storage 250 stores the content management file 340 that stores hierarchical entries constructed of a hierarchical structure. Furthermore, the details of the content management file 340 are shown in FIG. 3 to FIG. 11. The content management file storage 250 is an example of the storage device according to the embodiment of the present invention.

The content storage 260 stores a content file such as a video or a still image. Here, for example, the content management file storage 250 and the content storage 260 may correspond to the storage medium 160 shown in FIG. 1.

The imaging unit 211 is provided for generating a captured image (frame) and then transmits the generated image to each part. In other words, the generated image is output to each of the face detector 212, the face metadata generator 213, the content management information generator 214, the representative thumbnail image extractor 215, the content attribute information generator 216, the normalization unit 220, and the recording controller 223. The imaging unit 211 corresponds to, for example, the camera section 110 and the camera DSP 120 shown in an FIG. 1.

The face detector 212 detects a face contained in the content file input by the content input unit 211. The face detector 212 then outputs appearing time and position of the detected face to the face metadata generator 213 and the normalization unit 220. If a plurality of faces is detected at the same time, the appearing time and the position of each detected face are output to the face metadata generator 213. Here, a process for detecting a face may be one including the match between a template in which the luminance distribution of a face is recorded and an actual image of the face (see, for example, Japanese Published Patent Application No. 2004-133637), one based on the color of the skin or the feature quantity of a person's face in a captured image, or the like.

The face metadata generator 213 generates the face metadata based on the content file input via the content input unit 211. The face metadata generator 213 outputs the generated face metadata to the recording controller 223. The face metadata generator 213 includes a face data generator 218 and a header information generator 219. Based on the appearing time and the position of the face detected by the face detector 212, the face data generator 218 generates the face data of the face (each data of the face data section 640 of FIG. 16). In addition, the header information generator 219 generates header information (information of the header section 630 of FIG. 15) managing the face data generated by the face data generator 218. The recording controller 223 receives the face data generated by the face data generator 218 and the header information generated by the header information generator 219. Optionally, the face data generator 218 may have an option not to generate face data of any one of faces detected at predetermined intervals but failing to satisfy a predetermined condition.

The content management information generator 214 generates, based on the content file, the content management information 401 (FIG. 5) for managing the content file input via the content input unit 211.

The content management information generator 214 outputs the generated content management information 401 to the recording controller 223.

The representative thumbnail image extractor 215 extracts representative thumbnail images 501 through 506 (see FIG. 5) of the content file from the content file input via the content input unit 211. Subsequently, the representative thumbnail image extractor 215 outputs the extracted representative thumbnail images to each of the content attribute information generator 216 and the recording controller 223.

The content attribute information generator 216 generates the content attribute information 402 (FIG. 8) related to the content file input via the content input unit 211, based on the content file. Then, the content attribute information generator 216 outputs the generated content attribute information 402 to the recording controller 223. The content attribute information generator 216 generates attribute information including a storage position of a representative thumbnail image extracted by the representative thumbnail image extractor 215. In other words, the content attribute information generator 216 generates attribute information by including a storage position (thumbnail address) of the representative thumbnail image in the thumbnail file 500 in content attribute information related to the content file corresponding to the representative thumbnail image extracted by the representative thumbnail image extractor 215.

The normalization unit 220 normalizes a face image corresponding to a face detected by the face detector 212 with reference to both eyes in the detected face and then outputs the normalized face image (normalized face image) to the feature quantity extractor 221 and the recording controller 223. Here, for example, the eyes may be detected in a manner similar to the process of face detection, including the match between a template in which the luminance distribution of the eyes is recorded and an actual image of the eyes. In addition, the normalization unit 220 holds a normalization template for normalizing and then normalizes a face image based on this normalization template. For example, this normalization template may be a normalization template 280 on the basis of a position of the eyes in a face image as shown in FIG. 24C. In other words, the normalization unit 220 normalizes the face image by subjecting the face image to resolution conversion in addition to a scaling process and a rotating process so that the position of the eyes in the face image will correspond to the position of the eyes in the normalization template 280. Furthermore, the face image normalization and the normalization template will be described in detail with reference to FIG. 24. The feature quantity extractor 221 extracts feature quantity from the normalized face image output from the normalization unit 220 and then outputs the extracted feature to The face discrimination unit 222 and the recording controller 223. This feature quantity is used for face-discrimination processing by The face discrimination unit 222 and stores an algorithm which is used when extracting the feature quantity to the face feature quantity 647 of the face data section 640.

The face discrimination unit 222 determines whether a face detected by the face detector 212 is a registered face stored in content management file storage 250. The face discrimination unit 222 outputs a discrimination result to the recording controller 223. In other words, The face discrimination unit 222 makes a comparison between the feature quantity output from the feature quantity extractor 221 and the feature quantity stored in the metadata entry linked to the lower layer of the registered entry. Then, the face discrimination unit 222 determines whether a face detected by the face detector 212 is a registered face. In addition, for example, the discrimination results include a personal identification ID and face detection time information corresponding to the identified registered face, which are output to the recording controller 223. When two or more registered face entries are stored in the content management file storage 250, the discrimination processing is performed using the feature quantity stored in the metadata entry linked to the lower layer of each registered face entry. For example, this process of face discrimination may be one that extracts feature quantity from each of a registered face image and a normalized face image, which are candidates for comparison, and then performs the face discrimination based on the extracted feature quantity. That is, a comparison between feature quantity extracted from a registered face image and feature quantity extracted from a normalized face image is made to calculate the similarity between these feature quantities. When this calculated similarity exceeds a threshold value, it is determined that a face in the normalized face image corresponds to a registered face. Alternatively, the process of face discrimination may be one that performs discrimination processing with a weak discriminator that uses a difference between the feature quantities obtained at two different points on each of the registered face image and the normalized face image, which are candidates for the comparison. Alternatively, furthermore, the process of face discrimination may be one that performs discrimination processing using a feature vector as feature quantity (see, for example, Japanese Published Patent Application No. 2008-129830).

The recording controller 223 causes the content management file storage 250 to store a video file entry that includes content management information 401 created by the content management information generator 214 and content attribute information 402 created by the content attribute information generator 216. The recording controller 223 also causes the content management file storage 250 to store metadata entry that includes face metadata created by the face metadata generator 213 on the lower layer of a video file entry that corresponds to such a content file. Furthermore, the recording controller 223 causes the content management file storage 250 to store a representative thumbnail image as a thumbnail file 500, which is extracted by the representative thumbnail image extractor 215. Furthermore, when obtaining a result of discrimination of a registered face from The face discrimination unit, the recording controller 223 causes the content management file storage 250 to store the discrimination result in the generated meta-data entry. In addition, the identification number of the registered face entry corresponding to the registered face is stored in the generated video file entry. Furthermore, the entry number of the generated video file entry is stored in a registered face entry corresponding to the registered face. When performing face registration, a normalized face image output from the normalization unit 220 is stored as a registered face image in the thumbnail file 500. Also, the recording controller 223 generates header information based on feature quantity output from the feature quantity extractor 221, where the header information is to be stored in the header section 630 of the face metadata. Subsequently, metadata entry is generated. The metadata entry includes a header section where the generated head information is stored and a face data section where face date corresponding to the feature quality is stored. The recording controller 223 generates a registered face entry that manages a registered face corresponding to the generated metadata entry. Subsequently, both the generated metadata entry and the generated registered face entry are stored in the content management file storage 250. Here, the recording controller 223 is an example of a control unit in accordance with the embodiment of the present invention.

FIG. 24 is a diagram schematically illustrating a series of steps in a process of discriminating a face in a captured image and in a process of registering such a face in the captured image as a registered face image in accordance with the embodiment of the present invention. FIG. 24A represents an image 270 corresponding to a frame output from the imaging unit 211. FIG. 24B represents a face image 273 including a face detected by the face detector 212. In addition, FIG. 24C represents a normalized face image 276 which is normalized using a normalization template 280 and FIG. 24D represents a case in which a face in the normalized face image 276 is identified and a case in which the normalized face image 276 is registered as a registered face image. In this example, a person included in the image 270 is ICHIRO KODA 521.

As shown in FIG. 24A, for example, when the face detector 212 receives the image 270 output from the imaging unit 211, the face detector 212 detects the face 272 of ICHIRO KODA 521 in the image 270. Here, in FIG. 24B, the center positions of the respective eyes of the face 272 of ICHIRO KODA 521 in the face image 273 are represented as positions 274 and 275, respectively.

The normalization unit 220 performs scaling processing, rotating processing, and so on so that the positions 274 and 275 of the eyes in the face image 273 will be overlapped with reference positions 281 and 282 in the normalization template 280 shown in FIG. 24C. Here, the normalization template 280 is held on the normalization unit 220 and used when the normalization unit 220 performs normalization processing. For example, a rotating process may be performed on the face image 273 to generate a normalized face image 276. As shown in FIG. 24C, the positions 274 and 275 of the eyes of the face 272 in the normalized face image 276 are overlapped with the reference positions 281 and 282 on the normalization template 280.

As shown in FIG. 24D, when the feature quantity extractor 221 receives the normalized face image 276 normalized by the normalization unit 220, the feature quantity extractor 221 extracts feature quantity from the normalized face image 276. If this extracted feature quantity is output to the face discrimination unit 222, the face discrimination unit 222 performs face-discrimination processing using the feature quantity currently stored in the metadata entry linked with the lower layer of the registered face entry. The result of this face-discrimination processing is output to the recording controller 223. For example, when it is identified as a result of face-discrimination processing that a face contained in the normalized face image is a registered face, a personal identification ID and face detection time information corresponding to the identified registered face are output to the recording controller 223.

In addition, as shown in FIG. 24D, when a registration button is pressed, a normalized face image output from the normalization unit 220 is stored in the thumbnail file 500 and a registered face entry corresponding to this normalized face image is then created by the property file 400. In addition, metadata entry linked to the lower layer of the registered face entry is created and feature quantity output from the feature quantity extractor 221 is then stored in the metadata entry.

For example, when registering the face of ICHIRO KODA 521, as shown in FIG. 24D, a registered face image 511 is stored in a thumbnail file 500. Subsequently, a metadata entry (#10) 462 storing the feature quantity extracted from the registered face image 511 is created, and this metadata entry (#10) 462 is then stored in a property file 400.

As described above, when registering a specific person's face, a normalized face image can be registered as a registered face image. Alternatively, an original face image captured by the imaging apparatus may be registered as a registered face image. In addition, for example, when a detected faces does not correspond to any of existing registered faces by face-discrimination processing, the detected face may be registered as a new registered face every time it is detected.

In the case of storing a video content file in the storage medium 160, for example, when face data is generated for every faces of all of those detected by the face detector 212, the volume of the generated data becomes enormous. When a time interval for face detection is set up short, an increase in volume of face data may occur and the volume of data stored in the storage medium 160 may increase. Thus, in order to reduce the data volume stored in the storage medium 160, an example of preventing undesired face data from being stored will be described.

For example, among faces detected in one frame, it is possible to define the vale of face data to be stored in the face data section 640. For example, it is possible to define and restrict the maximum value of face data to be stored in the face data section 640 on the basis of the size and position of a face detected in one frame and the predetermined conditions of a face at the high rank of a face score, or the like. Furthermore, for example, the upper limit of the number of faces stored in the face data section 640 may be divided in advance and, when the number of detected faces exceeds the upper limit, face metadata may be restricted on the basis of the size and position of the detected face or the like. The above restriction allows the storage medium 160 to be prevented from being filled up by storing undesired faces (faces under poor conditions, faces which are difficult to be recognized, and so on) in the face data section 640. Therefore, it is not necessary to create face data of all the faces detected in one frame.

Furthermore, for example, face data may be stored only when the number of faces detected from consecutive frames provided as face-detection targets. This example will be described in detail with reference to FIG. 25.

Figure 25:
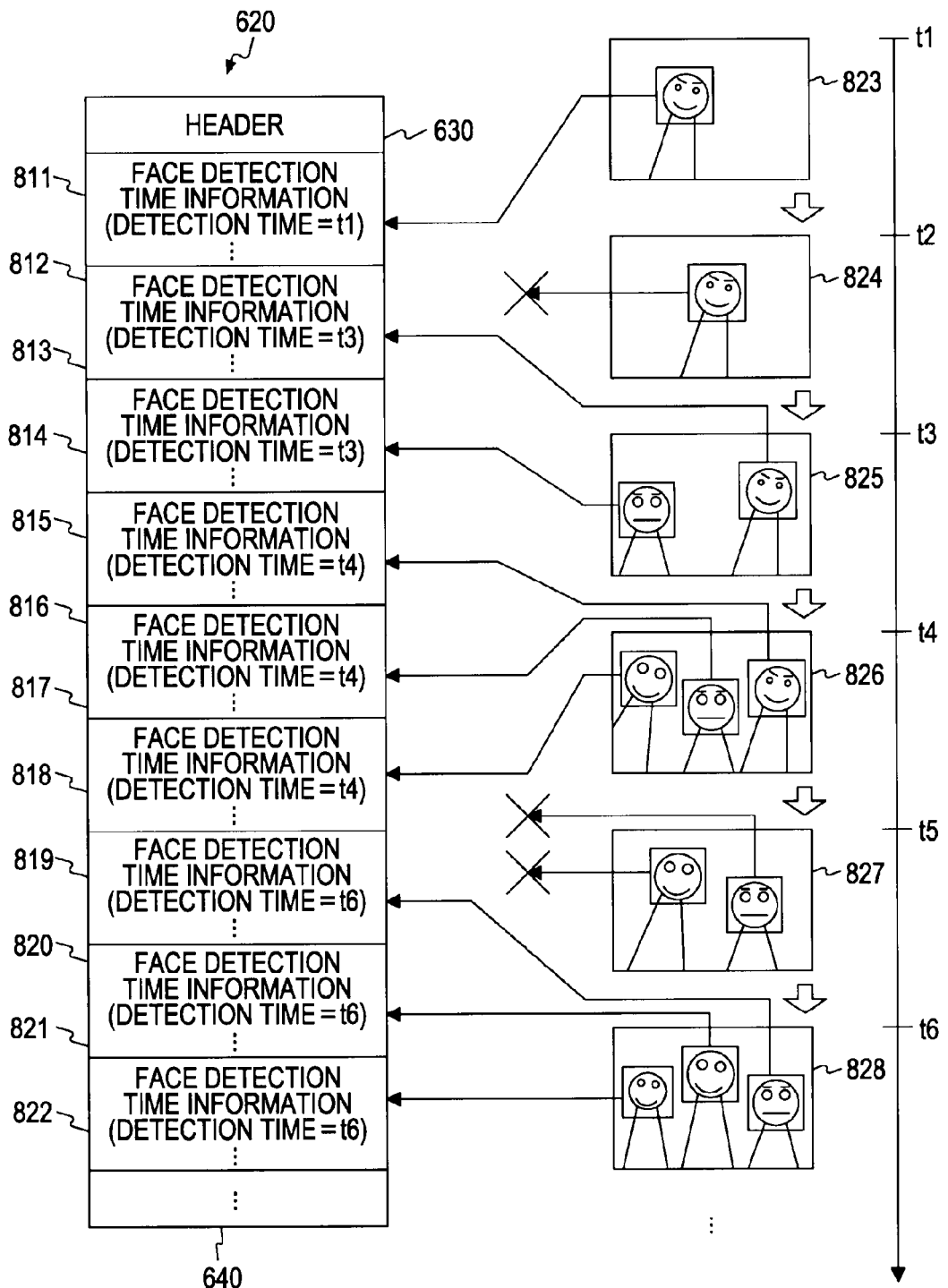
FIG. 25 illustrates a relationship of faces detected from frames included in a video content file and face data stored in a face data section.

FIG. 25 illustrates a relationship of faces detected from frames 823 through 828 included in a video content file and face data 811 through 822 stored in a face data section 840. As shown in FIG. 25, each of the faces detected from the frames 823 through 828 is enclosed in a rectangular outline. One face is detected from each of the frame 823 and the frame 824. Two faces are detected from each of the frames 825 and 827. Three faces are detected from each of the frames 826 and 828.

An example shown in FIG. 25 illustrates a case where condition (1) and condition (2) are set up as those that store face data in a content management file 340. Under the condition (1), if the number of faces detected from a frame at a detection time equals the number of faces detected from a next frame at a next detection time, the face data of the face detected from the frame at the next detection time is not stored in the face data section 640. This is because there is a high possibility of storing the metadata of the same face due to the same number of faces detected in these frames. Under the condition (2), the number of faces detected from a frame at a detection time is smaller than the number of faces detected from a next frame at a next detection time, the face data of the face detected at the next detection time is not stored in the face data section 640. This is because there is a high possibility of storing the metadata of the same face when the number of faces detected from one frame is smaller than that of another frame.

For example, the number of faces detected from the frame 823 at detection time t1 equals the number of faces detected from the frame 824 at detection time t2. In this case, the face data of a face detected from the frame 823 at the detection time t1 is stored in the face data section 640. However, the face data of a face detected from the frame 824 at the detection time t2 is not stored in the face data section 640. In addition, the number of faces detected from the frame 827 at detection time t5 is smaller than the number of faces detected from the frame 826 at detection time t4. In this case, likewise, the face data of a face detected from the frame 826 at the detection time t4 is stored in the face data section 640. However, the face data of a face detected from the frame 827 at the detection time t5 is not stored in the face data section 640. Thus, the face data is stored only when the number of faces detected from consecutive frames provided as targets of face detection. Therefore, it is possible to prevent the storage medium 160 from storing substantially overlapping data.

Figure 26:
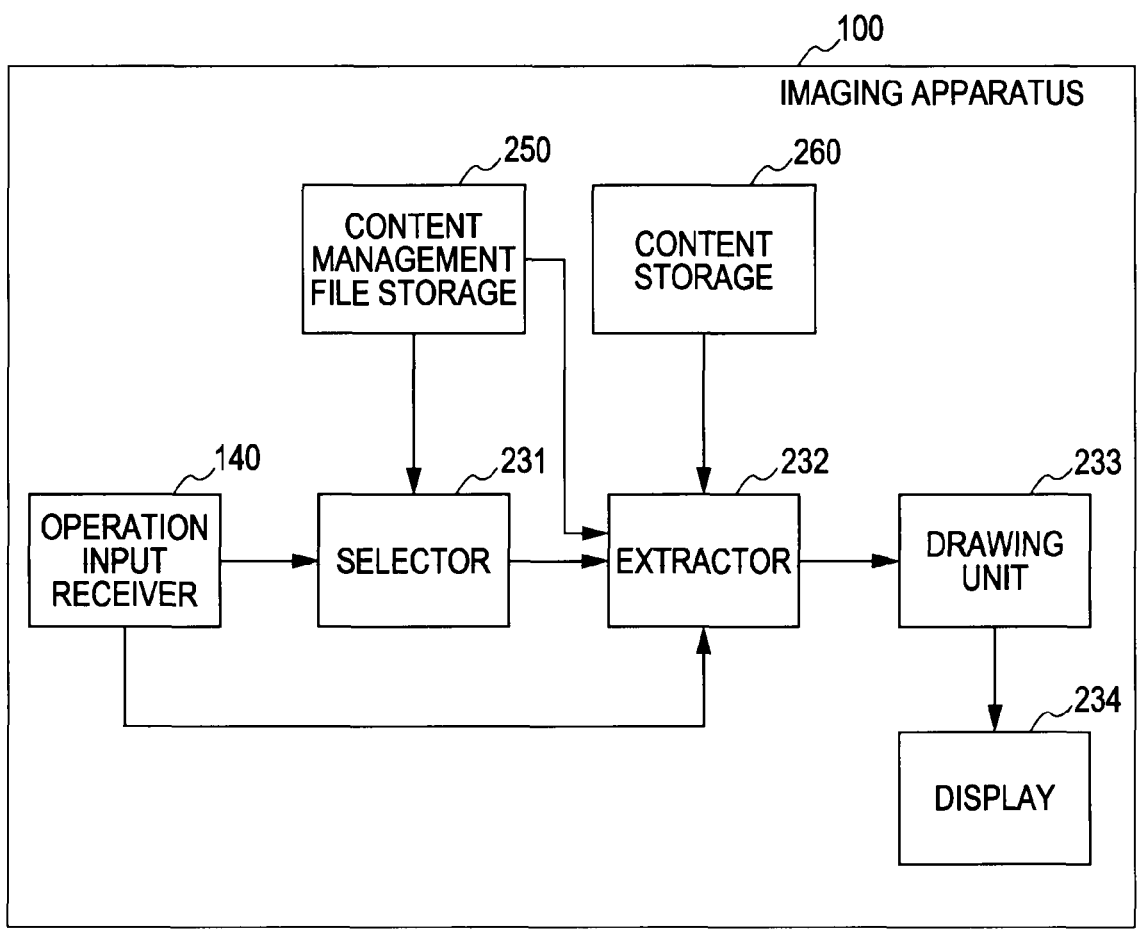
FIG. 26 is a block diagram illustrating an exemplary configuration of an imaging apparatus with respect to a replay function thereof in accordance with an embodiment of the present invention.

FIG. 26 is a block diagram illustrating an exemplary configuration of the imaging apparatus 100 with respect to the replay function thereof in accordance with an embodiment of the present invention. The imaging apparatus 100 includes an operation input receiver 140, a selector 231, an extractor 232, a drawing unit 233, a display unit 234, a content management file storage 250, and a content storage 260. The operation input receiver 140 is identical to one shown in FIG. 1 and the description thereof is thus omitted.

The content management file storage 250 stores the content management file 340 stored by the recording controller 223 shown in FIG. 23. Then, each entry and each image stored in the content management file 340 are supplied to a selector 231 and an extractor 232.

The content storage 260 stores a content file recorded by the recording controller 223 shown in FIG. 23. Then, each contents file currently stored is supplied to the extractor 232.

The selector 231 performs selection processing in response to an operation input entered through the operation input receiver 140 and then outputs the selection result to the extractor 232.

Specifically, when a selection operation for selecting one registered face image from registered face images currently displayed on a display unit 234 is input to the selector 231 via the operation input receiver 140, the selector 231 selects an entry number stored in the list of registered face entries corresponding to the selected registered face image. Then, the entry number of the selected registered face entry is output to the extractor 232. In addition, when a selection operation for selecting one representative thumbnail image from representative thumbnail images currently displayed on a display unit 234 is input to the selector 231 via the operation input receiver 140, the selector 231 selects a file entry corresponding to the selected representative thumbnail image. Then, the entry number of the selected file entry is output to the extractor 232. Furthermore, when a selection operation for selecting one representative thumbnail image from face thumbnail images currently displayed on a display unit 234 is input to the selector 231 via the operation input receiver 140, the selector 231 selects a face data corresponding to the selected face thumbnail image. Then, the face detection time information 641 of the selected face data is output to the extractor 232. In other words, the selector 231 chooses a desired entry from the respective entries currently stored in the content management file 340 in the content management file storage 250. In addition, the selector 231 chooses desired face data from the face data of face metadata contained in the metadata entry.

The extractor 232 extracts a registered face image or a representation thumbnail image stored in the content management file storage 250 based on the entry number output from the selector 231. In addition, the extractor 232 extracts a content file stored by the content storage 260 based on an entry number output from the selector 231. Furthermore, the extractor 232 extracts face data contained in the metadata entry currently stored on the lower layer of a file entry corresponding to the entry number output from the selector 231. Then, a face thumbnail image corresponding to this face data is extracted from the content file based on face detection time information, position information, and so on which are included in the face data. This is based on a file entry currently stored on the higher layer of the metadata entry that contains the face detection time information 641 of the face data output from the selector 231. Furthermore, the extractor 232 extracts a content file. From the content files stored on the content storage 260, the extractor 232 extracts a content file at and after the recording time corresponding to the face detection time information 641. The extractor 232 outputs these extraction results to a drawing unit 233. The selection and extraction processes will be described in detail later with reference to FIG. 27 and FIG. 31. Drawing unit 233 draws an image based on the extraction result output from the extractor 232. In other words, in response to the extraction results input from the extractor 225, the drawing unit 226 draws the face thumbnail image extracted from the content file stored in the content storage 260 and the video extracted from the content file stored on the content storage 260. The drawing unit 233 further draws the representative thumbnail image stored in the thumbnail file 500 of the content management file storage 250.

The display 234 displays an image drawn by drawing section 233. The display 234 may be the LCD 180 shown in FIG. 1. A representation example of the display 234 will be described in detail with reference to FIG. 27 to FIG. 31.

Next, an application of both the property file 400 and the thumbnail file 500 to play a video content file will be described in detail with reference to the attached drawings.

Figure 27:
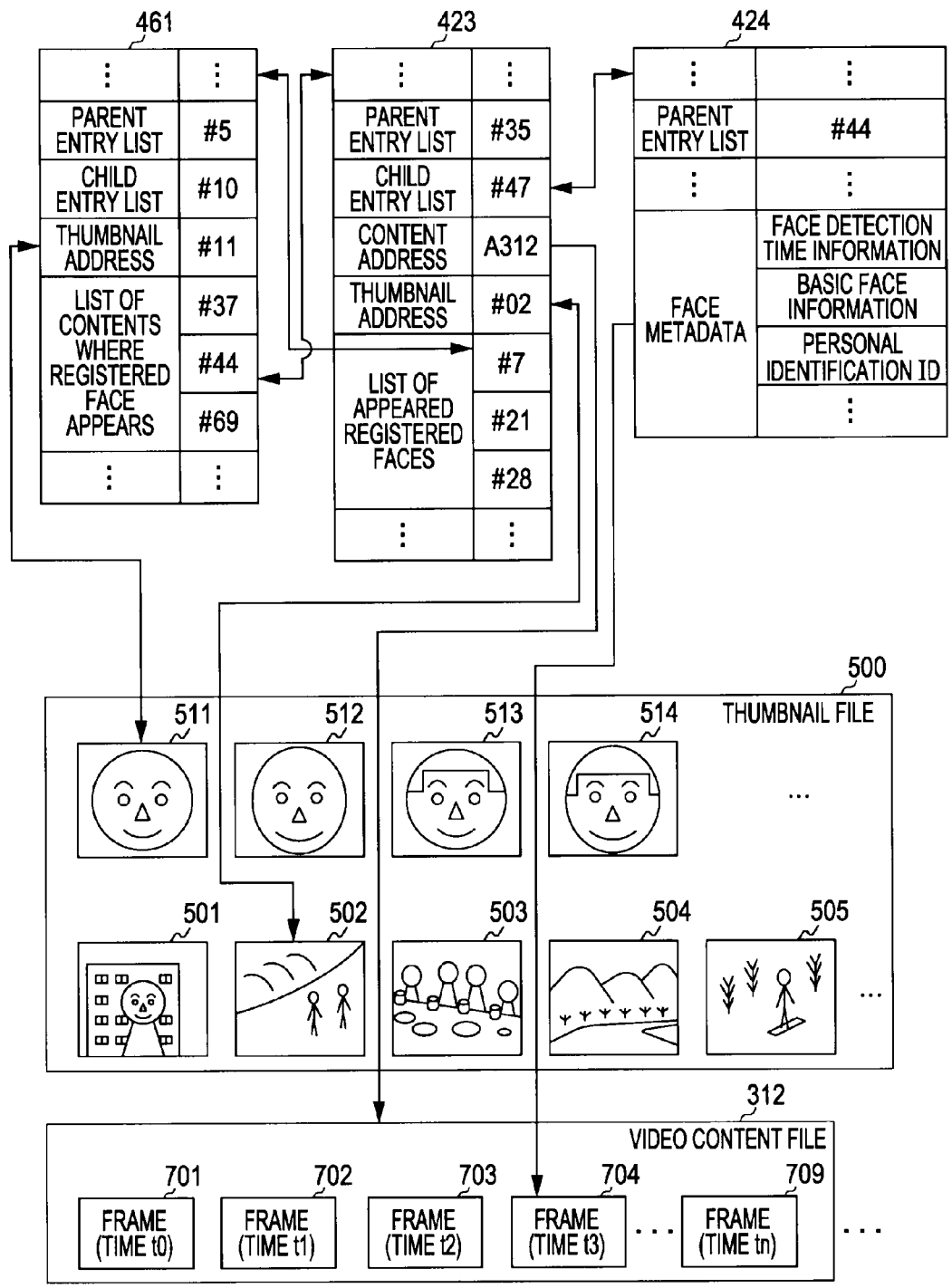
FIG. 27 is a diagram schematically illustrating the relationship among a registered face entry, a video file entry, a metadata entry, a thumbnail file, and a video content file.

FIG. 27 is a diagram schematically illustrating the relationship among a registered face entry (#7), a video file entry (#44) 423, a metadata entry (#47) 424, a thumbnail file 500, and a video content file 312.

For example, the registered face entry (#7) 461 stores "#11" that represents a thumbnail address of a registered face image 511. In addition, the registered face entry (#7) 461 stores an entry number "#44" of video file entry (#44) 423 that corresponds to a video content file 312 where a registered face in the registered face image 511 appears.

For example, a video file entry (#44) 423 stores "A312" that represents a content address of the video content file 312, and "#02" that represents a thumbnail address of a representative thumbnail image 502 of the video content file 312. A child entry list of the video file entry (#44) 423 stores an entry number "#47" of a metadata entry (#47) 424 in which metadata of the video content file 312 is stored. A parent entry list of the metadata entry (#47) 424 stores an entry number "#44" of the video file entry (#44) 423. As shown in FIG. 16, various kinds of face metadata about a detected face are stored in face metadata of metadata entry (#47) 424.

For example, based on the face detection time information of face metadata of the metadata entry (#47) 424, one frame (for example, frame 704) in each frame of the video content file 312 may be specified. In addition, based on the face basic information of face metadata of the metadata entry (#47) 424, a face image may be taken out from the specified frame. Furthermore, only a face image of a particular person may be taken out based on the personal identification ID of the face metadata of the metadata entry (#47) 424. In FIG. 27, an arrow represents these correspondence relations.

As the contents of the respective entries are associated with one another and managed as described above, a content file and a face image of a particular person will be searched quickly.

Hereinafter, an application using the content management file 340 will be described in detail with reference to the drawings.

FIG. 28 to FIG. 31 illustrates an example of an application using the content management file 340 in accordance with the embodiment of the present invention. This example describes a case in which a video content file where ICHIRO KODA 521 appears is searched and a case in which the video content file is played from a scene where ICHIRO KODA 521 appears.

Figure 28A:
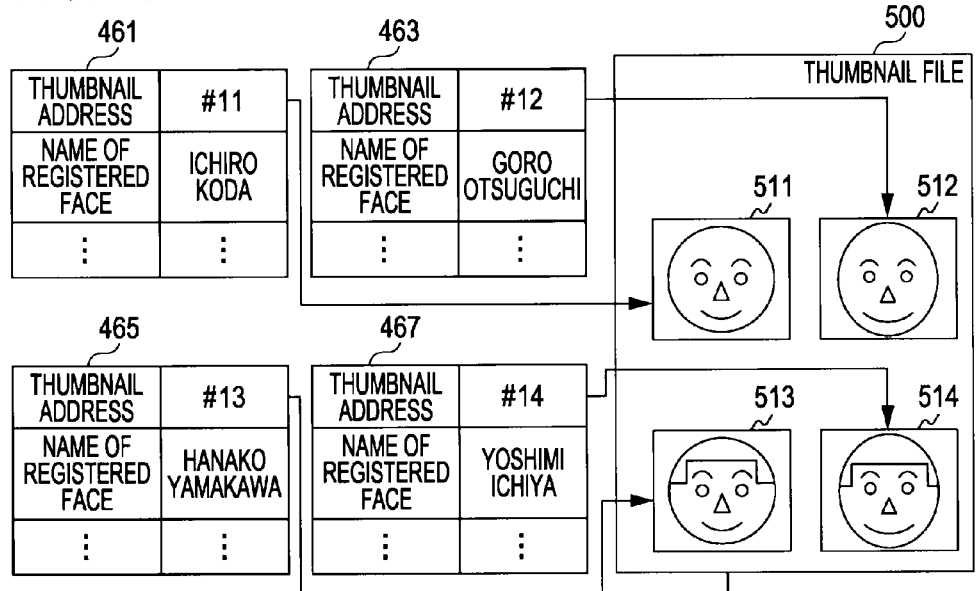
FIG. 28 illustrates an example of an application using a content management file in accordance with an embodiment of the present invention.

For example, in order to search a video content file in which the face of ICHIRO KODA 521 appears, a user performs an instructing operation for displaying a list of registered face images via the operation input receiver 140. If this instructing operation is received, then the property file 400 is opened and the registered face entry is searched in the property file 400. Then, the thumbnail address of the thumbnail file 500 stored in all the registered face entries is extracted. Subsequently, the thumbnail file 500 is opened. As shown in FIG. 28S, registered face images 511 to 514 are extracted from the thumbnail file 500 based on the extracted thumbnail address. Furthermore, as shown in FIG. 28B, registered face images 511 to 513 are displayed on a region 700 for displaying registered face images on the LCD 180.

Here, the names of the registered faces stored in the respective registered face entries are displayed on the right side of the registered face images 511 to 513 displayed on the display region 700. Furthermore, other registered face images may be displayed on the region 700 by moving the registered face images displayed on the display region 700 up and down by pressing move-up buttons 701 and 705 and move-down buttons 702 and 703 or moving a scroll bar 702. Any of the other registered face images, such as a registered face image 514, may be displayed on the region 700. Furthermore, a return button 704 may be pressed to change the display to the immediately preceding screen. FIG. 28 to FIG. 31 illustrate images such that, among images displayed on the display screen, an image selected by a user is provided with a selection mark 707. For example, FIG. 28B shows a state in which the selection mark 707 is given to the registered face image 511. The selection of such a registered face image may be performed by pressing a touch panel on the LCD 180.

Figure 28B:
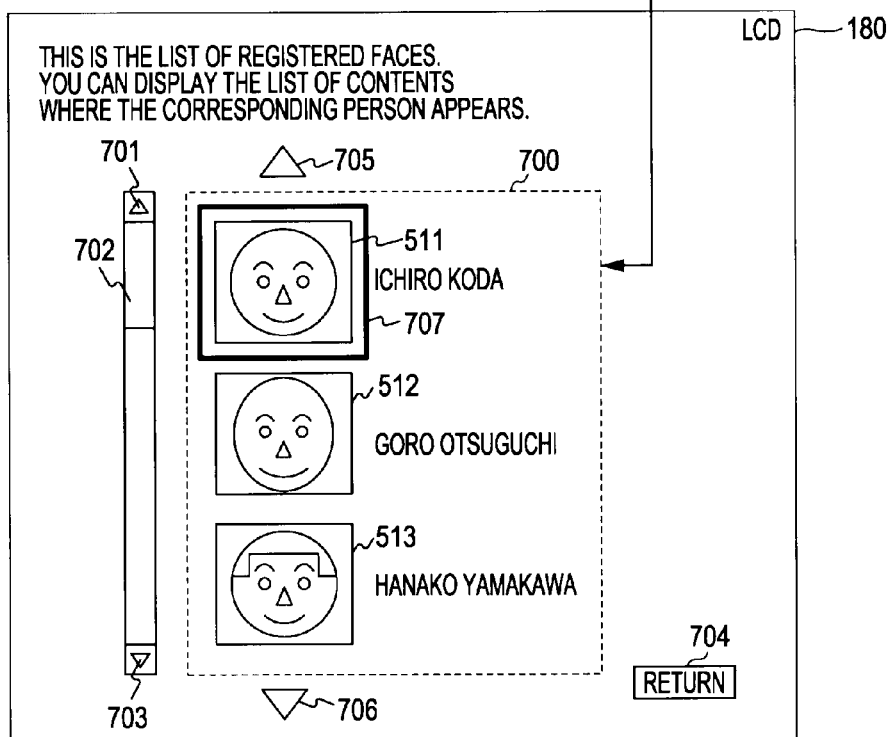
Figure 29A:
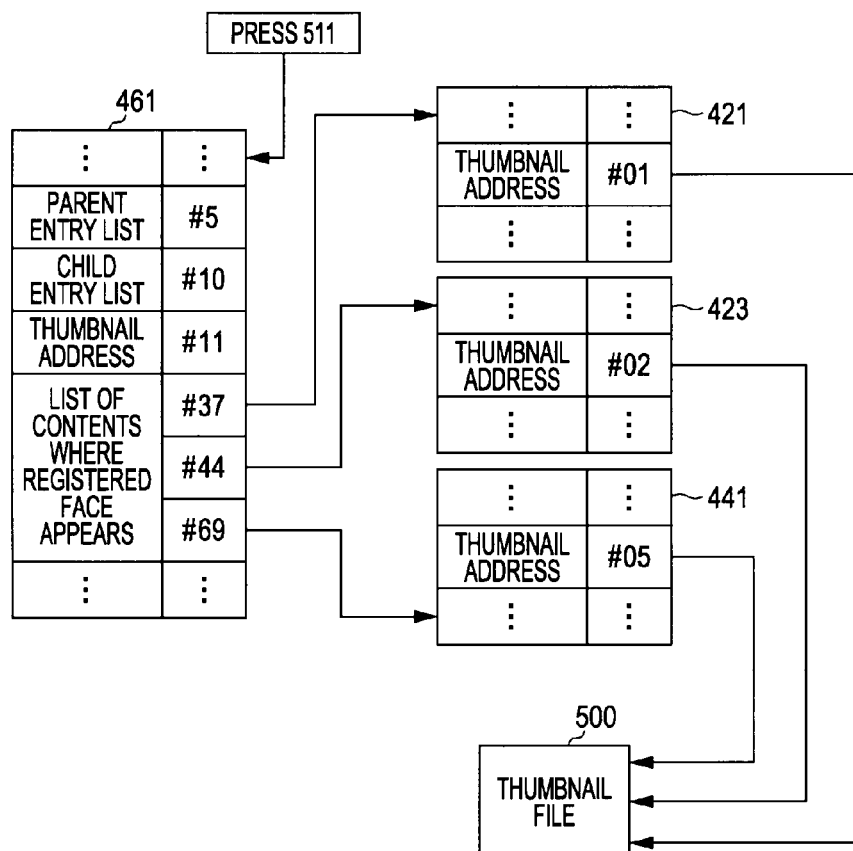
FIG. 29 illustrates an example of an application using a content management file in accordance with an embodiment of the present invention.

On the display screen shown in FIG. 28B, for example, the property file 400 is opened when the registered face image 511 is selected. Furthermore, as shown in FIG. 29A, a video file entry is extracted. That is, the extracted video file entry corresponds to each of entry numbers stored in the appeared registered face content list of the registered face entry (#7) 461 corresponding to the selected registered face image 511. For example, video file entries corresponding to the entry numbers "#37", "#44", and "#69" stored in the appeared registered face content list of the registered face entry (37) 461 are extracted. Then, thumbnail addresses "#01", "#02", and "#05" stored in the extracted move file entries (#37) 421, (#44) 423, and (#69) 441 are extracted therefrom, respectively. Then, it is opened by thumbnail file 500 and representative thumbnail images 501, 502, and 505 are extracted from thumbnail file 500 based on an extracted thumbnail address. And as shown in FIG. 29B, for example, representative thumbnail images 501, 502, and 505 are displayed on a display region 710 for displaying representative thumbnail images on the LCD 180.

Here, on the left side of the display region 710 for displaying representative thumbnail images on the LCD 180, for example, the face image of a particular person (for example, the registered face image 511) operated on the immediately preceding screen is displayed. Furthermore, when the number of the extracted representative thumbnail images is larger than the number of the representative thumbnail images allowed to be displayed on the region 710, any of other representative thumbnail image may be displayed by operation of the move-up button, the move-down button, or the scroll bar. In addition, the screen may be returned to a list of registered face images as shown in FIG. 28B by pressing the return button 714.

Figure 29B:
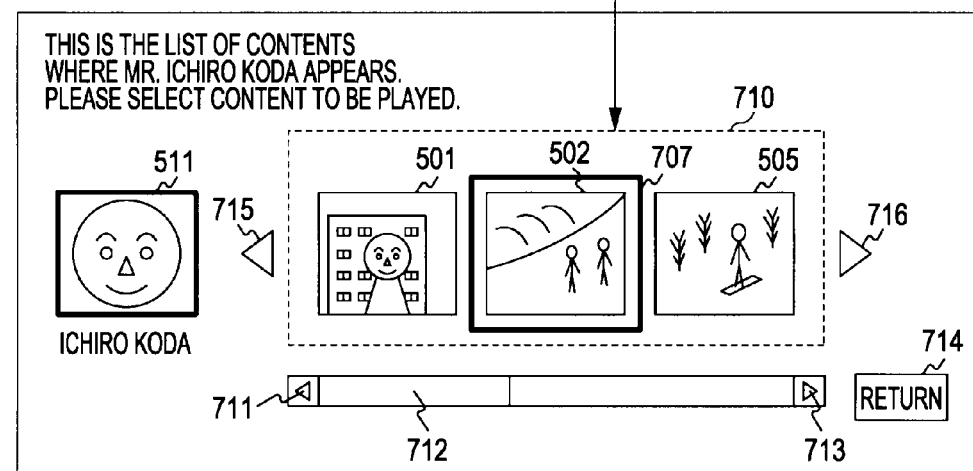
Figure 30A:
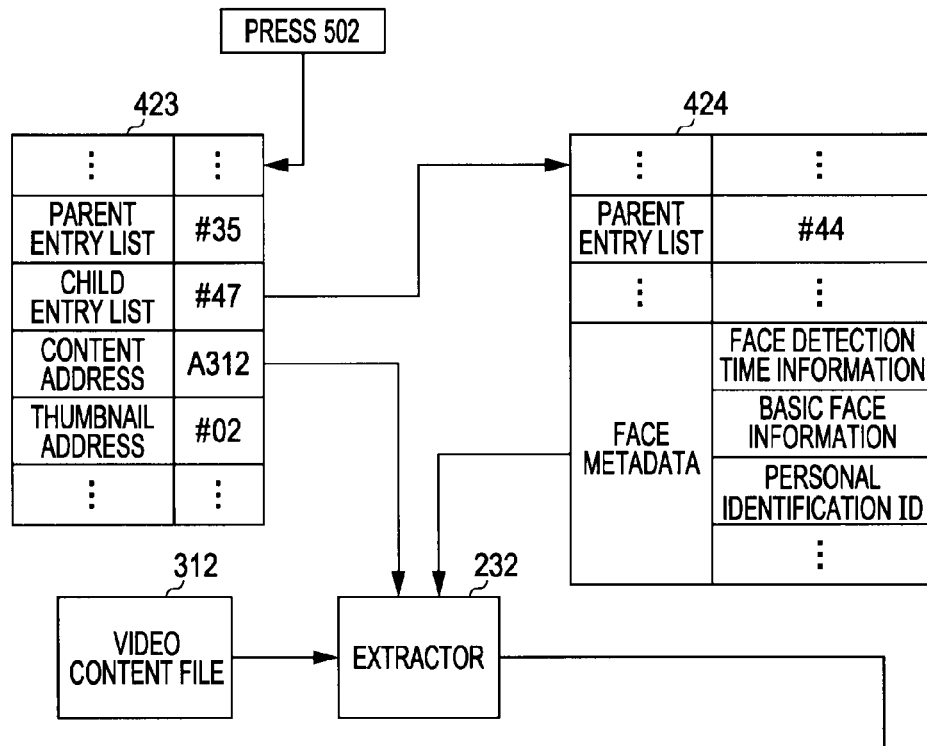
FIG. 30 illustrates an example of an application using a content management file in accordance with an embodiment of the present invention.
Figure 30B:
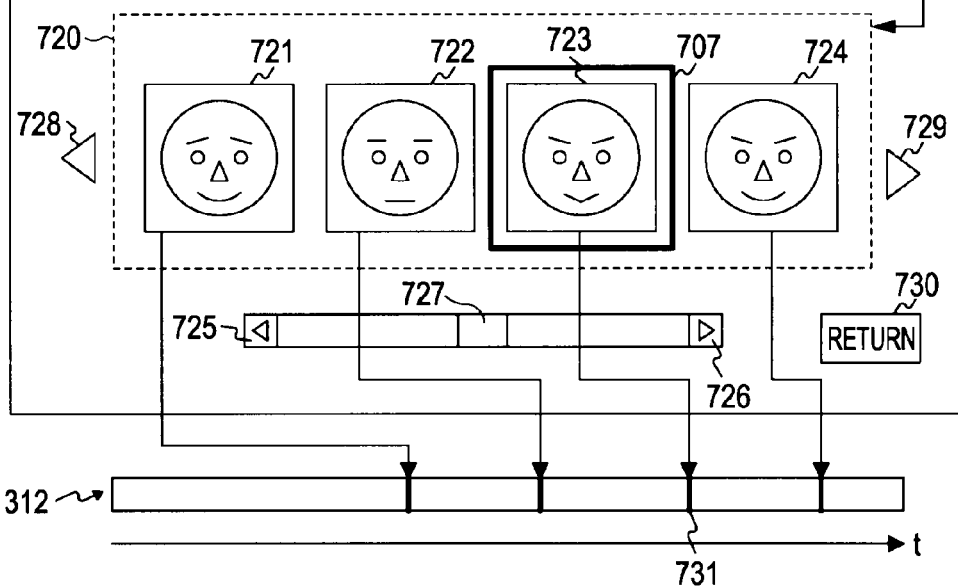

On the display screen shown in FIG. 29B, for example, the property file 400 is opened when the representative thumbnail image 502 is selected. Furthermore, as shown in FIG. 30A, a video file 312 is extracted on the basis of the content address "A312" stored in the video file entry (#44) 423 corresponding to the representative thumbnail image 502. A metadata entry (#47) 424 is extracted based on a child entry list "#47" stored in the video file entry (#44) 423. Then, based on face metadata (face detection time information 641, face basic information 642, and personal identification ID 646) currently stored in the metadata entry (#47) 424, a face thumbnail image of ICHIRO KODA is generated from the video content file 312. Furthermore, as shown in FIG. 30B, face thumbnail images 721 to 724 are displayed on a display region 720 for displaying face thumbnail images on the LCD 180. These face thumbnail images are rectangle images containing the face of ICHIRO KODA, for example, as shown in FIG. 30B. In this example, when generating a face thumbnail image, personal identification ID 646 is used to identify the specific face. However, for example, the feature quantities of the detected faces may be stored one by one in the face feature quantity 647 in advance. When generating a face thumbnail image, the face feature quantity is used for discriminating the faces to generate a face thumbnail image.

Here, FIG. 30B illustrates the correspondence relationship between face thumbnail images 721 to 724 displayed on the display region 720 for displaying face thumbnail images and the storage positions on the corresponding video content file by using arrows connecting them one another. Furthermore, if the number of the extracted face thumbnail images is larger than the number of face thumbnail images which may be displayed on the display region 720, any of other face thumbnail image may be displayed by operating a left button, a right button, or a scroll bar. In addition, the display screen may be returned to a list of representative thumbnail images as shown in FIG. 29B by pressing a return button 730.

Figure 31A:
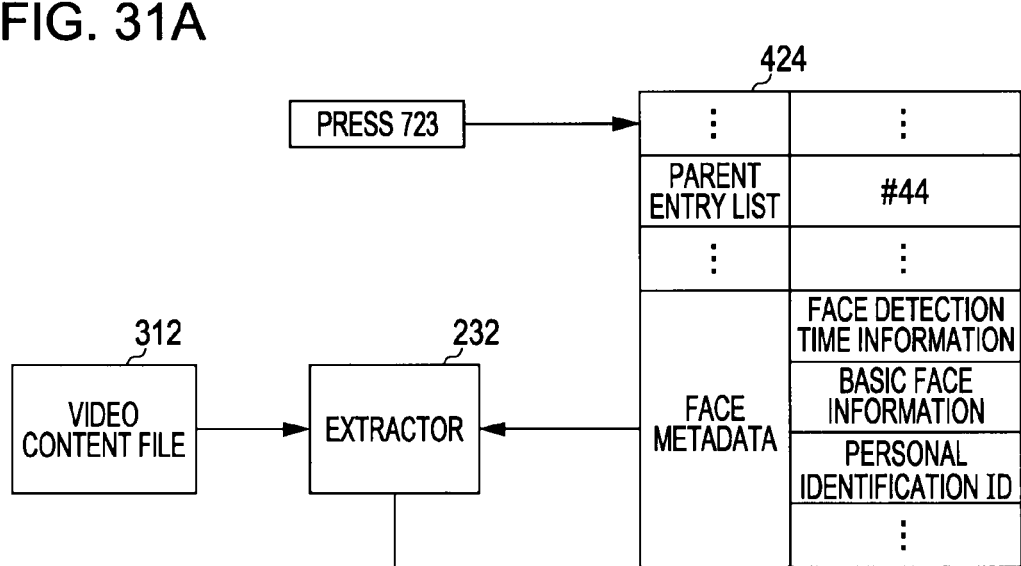
FIG. 31 illustrates an example of an application using a content management file in accordance with an embodiment of the present invention.

On the display screen shown in FIG. 30B, the property file 400 is opened when a face thumbnail image 723 is selected. Then, as shown in FIG. 31A, from face detection time information of face metadata stored in the metadata entry (#47) 424, the face detection time information corresponding to a face thumbnail image #723 is extracted. In this case, face data corresponding to the face thumbnail image 723 is specified from face metadata stored in the metadata entry (#47) 424 in order from the head of the selected face thumbnail image 723. Then, face detection time information contained in this specified face data is extracted. Then, based on the extracted face detection time information, a video from a time corresponding to the face detection time information of the video content files 312 is displayed on the LCD 180. For example, the video is played from the frame position 721 of the video content file 312 shown in FIG. 30B.

Figure 31B:
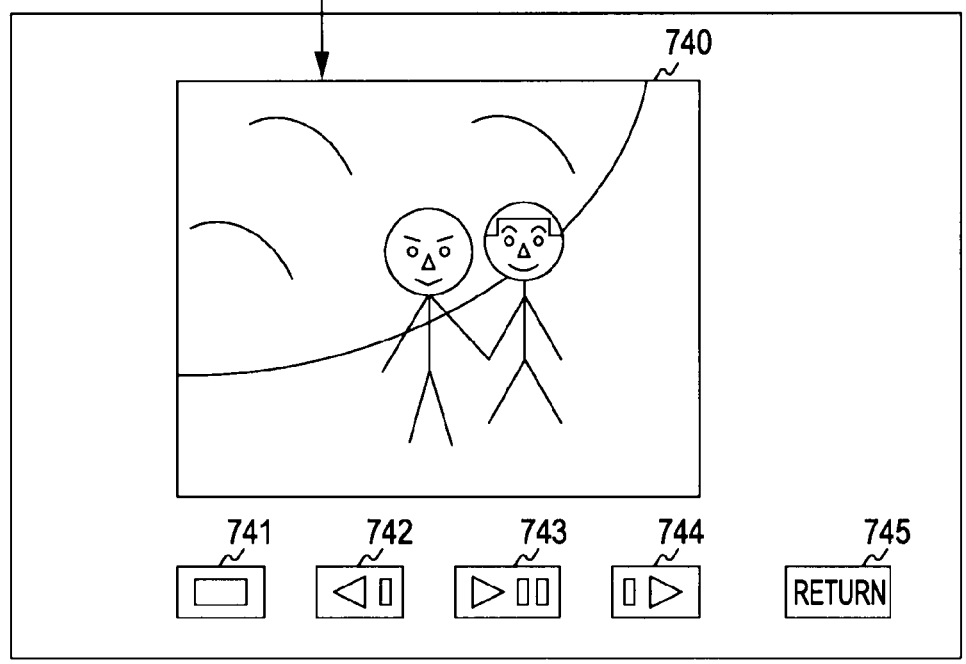

In addition, for example, as shown in FIG. 31B, a video-playing region 740 displays a video from a scene where a face corresponding to the face thumbnail image 723 appears. In addition, the video displayed on the video-playing region 740 may be first forwarded, stopped, or the like by pressing any of operation buttons 741 to 744. In addition, the screen may be returned to a list of face thumbnail images as shown in FIG. 30B by pressing a return button 745.

Thus, when searching a video in which a particular person (for example, ICHIRO KODA) appears, the video in which the particular person appears is easily searched by choosing the registered face image of the particular person on the LCD 180. In the case of the video where the particular person appears, when playing from a scene where the person appears, a face thumbnail image of the particular person contained in the searched video content is displayed on the LCD 18. Then, the face thumbnail image being displayed is selected on the LCD 180. The video is allowed to be played from a scene where the particular person contained in the selected face thumbnail image is contained.

Therefore, in the case of displaying a content file where a particular person appears, only a property file and a thumbnail file may be opened without opening all of other content files. Thus, fast processing is performed. In addition, with the fixed length management (entry number management) with the slot, fast processing is performed.

Figure 32:
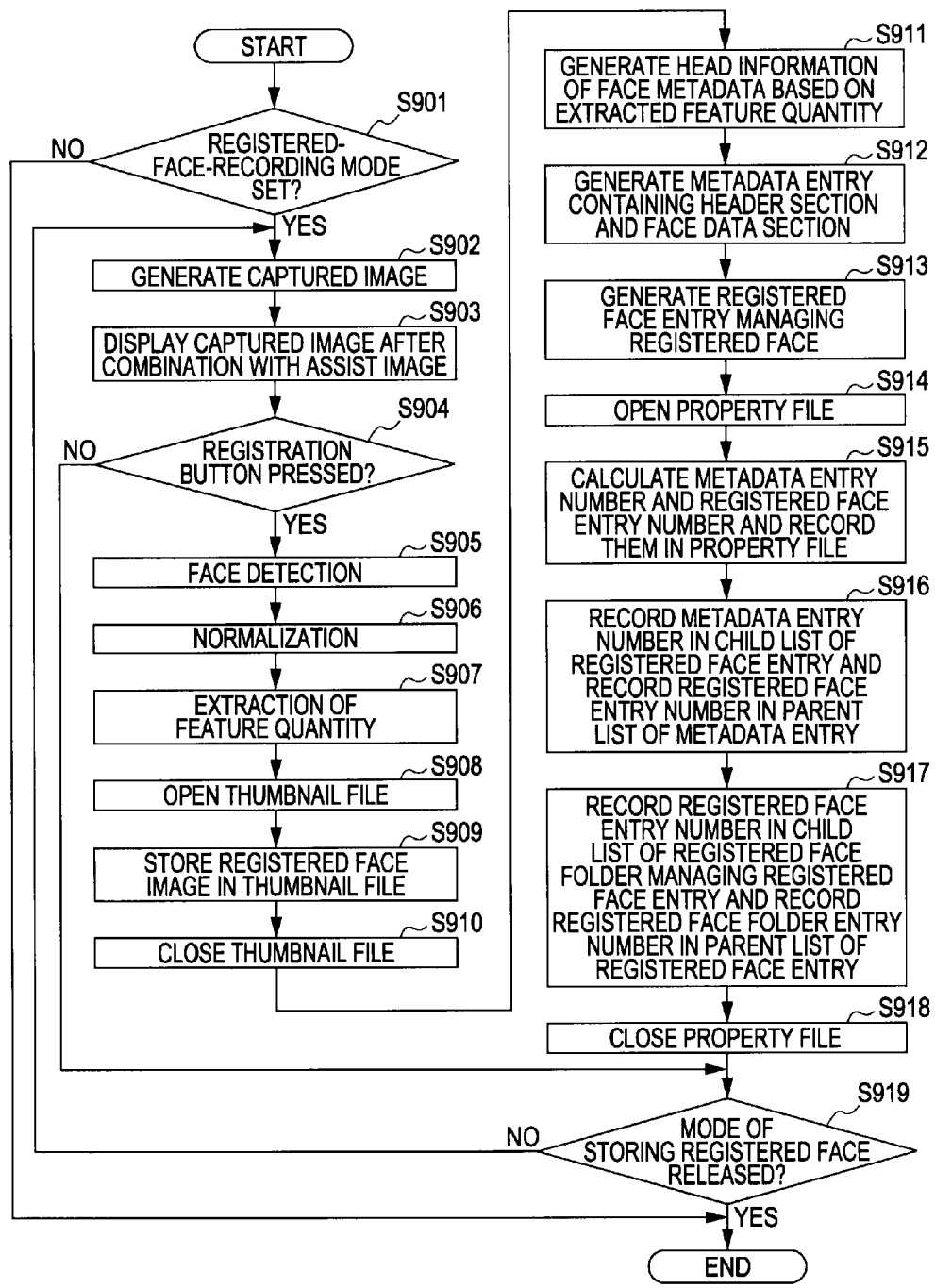
FIG. 32 is a flowchart that illustrates a process of registration a face to be registered by an imaging apparatus according to an embodiment of the present invention.

Operation of the imaging apparatus 100 of one embodiment of the present invention is described below with reference to the attached drawings. FIG. 32 is a flowchart that illustrates a process of registering a face to be registered by the imaging apparatus 100 according to the embodiment of the present invention. In this example, the process of face registration in a mode of storing a registered face will be described.

First, it is determined whether the mode of storing a registered face is set up (Step S901). If the mode of storing a registered face is not set up (Step S901), the registration process is ended. If the mode of storing a registered face is set up (Step S901), a captured image is generated by the imaging unit 211 (Step S902). A composite image composed of the generated image and an assist image (shown in FIG. 6) is displayed on the LCD 180 (Step S903). Then, it is determined whether the registration button is pressed (Step S904). If the registration button is not pressed (Step S904), then the process proceeds to Step S919.

If the registration button is pressed (Step S904), then the face detector 212 detects a face contained in the captured image (Step 905). Then, the normalization unit 220 normalizes a face image containing the detected face and then generates a normalized face image (Step S906). Subsequently, the feature quantity extractor 221 extracts feature quantity from the generated normalized face image (Step S907). After that, the recording controller 223 opens the thumbnail file 500 of the content management file storage 250 (Step S908) and then storages the generated normalized face image as a registered image in the thumbnail file 500 (Step S909). In this case, a thumbnail address of the thumbnail file 500 for the registered face image is stored in a memory. Then, the recording controller 223 closes the thumbnail file 500 (Step S910).

Then, the recording controller 223 generates header information to be stored in the header unit 630 of the face metadata based on the extracted feature quantity (Step S911). Then, the recording controller 223 generates a header section that stores the generated head information. The recording controller 223 generates a metadata entry that contains a face data section where face data corresponds to the extracted feature quantity (Step S912).

Then, the recording controller 223 generates a registered face entry that manages a registered face corresponding to the generated metadata entry (Step S913). The thumbnail address of the registered face image stored in the thumbnail file 500 in Step S909 is stored in the thumbnail address of the registered face entry.

Then, the recording controller 223 opens the property file 400 of the content management file storage 250 (Step S914). Then, the recording controller 223 calculates the entry numbers of the generated metadata entry and the registered face entry. Based on this calculation result, the generated metadata entry and the registered face entry are stored in the property file 400 (Step S915). That is, the metadata entry and the registered face entry are assigned to the property file 400 in order of slot numbers.

Then, the recording controller 223 stores the entry number of the metadata entry in a child entry list of the registered face entries stored in the property file 400. In addition, the recording controller 223 records the entry number of the registered face entry in a parent entry list of metadata entries (Step S916).

Then, the recording controller 223 stores the entry number of this registered face entry in a child entry list of the registered face folder entry in which the registered face entry stored in the property file 400. In addition, the entry number of the registered face folder entry is stored in the parent entry list of this registered face entry (Step S917). Then, the property file 400 closes the property file 400 (Step S918) and then determines whether the mode of storing a registered face is canceled (Step S919). If the mode of storing a registered face is canceled (Step S919), then the process of face registration is ended. On the other hand, if the mode of storing a registered face is not canceled (Step S919), then the process returns to Step S902.

Figure 33:
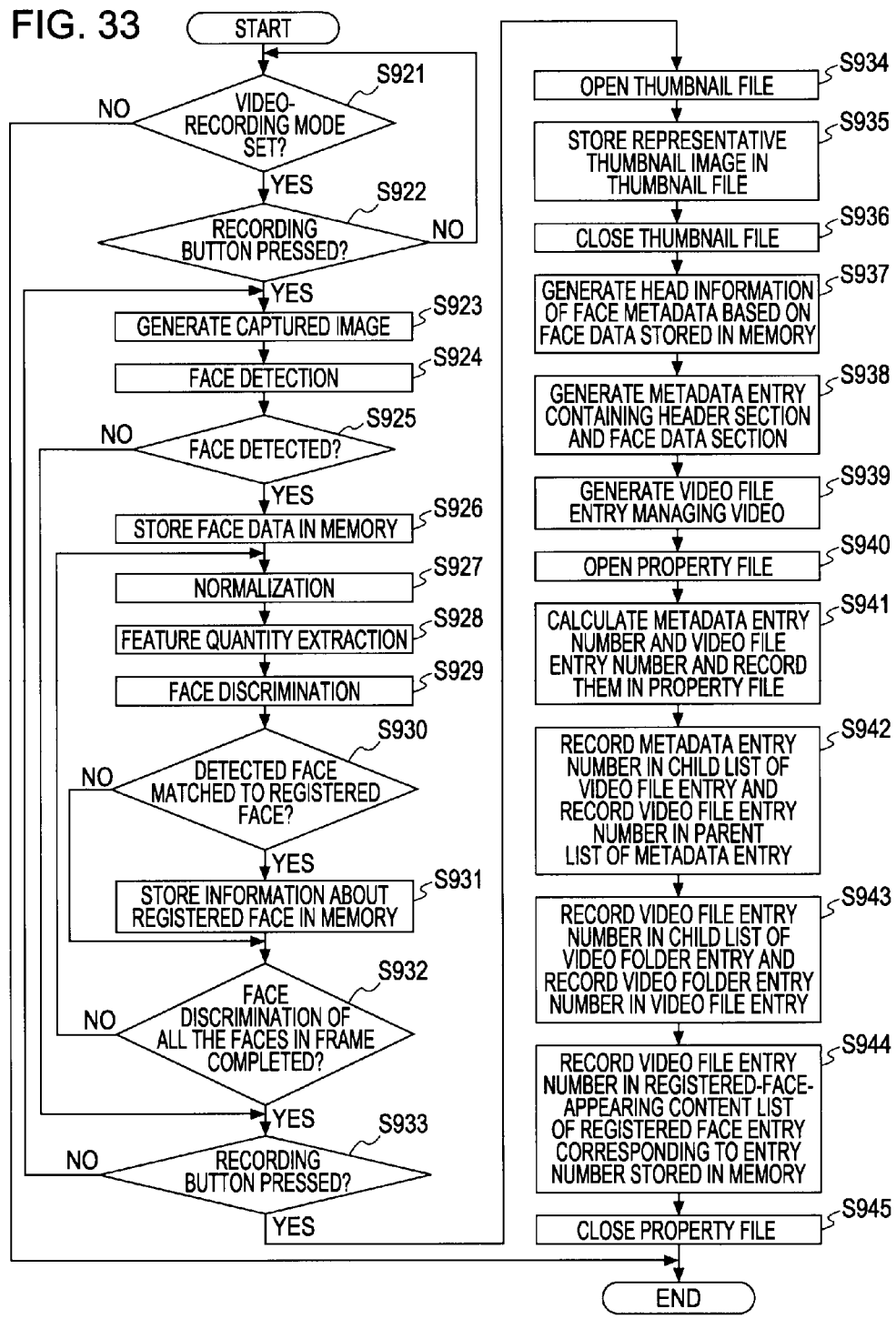
FIG. 33 is a flowchart illustrating a recording process of a content management file by an imaging apparatus according to an embodiment of the present invention.

FIG. 33 is a flowchart illustrating a recording process of the content management file 340 by the imaging apparatus 100 according to the embodiment of the present invention.

In this example, the process of storing a video content file in a mode of storing a video will be described.

First, it is determined whether the mode of storing a video is set up (Step S921). If the mode of storing a video is not set up (Step S921), the process of storing the content management file 340 is ended. If the mode of storing a video is set up (Step S921), it is determined whether a recording button is pressed (Step S922). If the recording button is not pressed (Step S922), then the process returns to Step S921.

If the recording button is pressed (Step S922), then the imaging unit 211 generates a captured image (Step S923) and the face detector 212 performs a process of detecting a face contained in the captured image (Step S924). The face-detecting process may be carried out for every generated image or may be periodically carried out. Here, Step S924 is an example of the procedure of face detection in accordance with the embodiment of the present invention. Then, it is determined whether a face is detected from the captured image (Step S925). If the face is not detected from the captured image, then the process proceeds to Step S993. Furthermore, in Step S925, even if the face is detected from the captured image, it is then determined whether the detected face falls within a predetermined range of a predetermined condition. If the detected face does not fall within the predetermined range, then the process may proceed to Step S933.

On the other hand, if the face is detected from the captured image (Step S925), then the face data generator 218 generates face data based on the detected face (Step S926). The generated face date is stored in the memory until the recording button is pressed. If the generated image corresponds to the leading frame, then the generated image (representative thumbnail image) is extracted by the representative thumbnail image extractor 215.

Then, the normalization unit 220 normalizes a face image containing the detected face and generates a normalized face image (Step S927). Then, the feature quantity extractor 221 extracts feature quantity from the generated normalized face image (Step S928). Then, the face discrimination unit 222 performs a face-discrimination processing by making a comparison between the feature quantity currently stored in the metadata entry linked to each registered face entry of the content management file storage 250 and the extracted feature quantity (Step S929). Here, Step S929 is an example of the procedure of face identification in accordance with the embodiment of the present invention. It is judged whether it was identified by this face-discrimination processing that a detected face is a registered face managed by registered face entry (Step S930). If the detected face is not identified as a registered face (Step S930), the process proceeds to Step S932. On the other hand, if the detected face is identified as a registered face (Step S930), then the entry number of a registered face entry corresponding to the registered face, the personal identification ID corresponding to the registered face, and the face detection time information are stored in the memory (Step S931).

Then, it is determined whether the face-discrimination processing was completed for all the faces detected from the captured image (Step S932). If the face-discrimination processing is not completed for all the faces detected from the captured image (Step S932), then the process returns to Step S927. That is, the face-discrimination processing is repeated for all the faces in one frame. On the other hand, if the face-discrimination processing is completed for all the faces detected from the captured image (Step S932), then it is determined whether the recording button is pressed (Step S933). If the recording button is not pressed (Step S933), then the process returns to Step S933.

If the recording button is pressed (Step S933), then the recording controller 223 opens the thumbnail file 500 of the content management file storage 250 (Step S934). Then the captured image corresponding to the leading frame stored in the memory at Step S926 is stored as a representative thumbnail image in the thumbnail file 500 (Step S935). In this case, a thumbnail address of the thumbnail file 500 for the representative thumbnail image is stored in a memory. Then, the recording controller 223 closes the thumbnail file 500 (Step S936).

Then, the header information generator 219 generates header information to be stored in the header unit 630 of the face metadata based on the face data currently stored in the memory (Step S911). Then, the recording controller 223 generates a header section that stores the generated head information and a metadata entry that contains a face data section where face data corresponding to the detected face (Step S938). This metadata entry stores a personal identification ID stored in the memory at Step S931 in the face data corresponding to the face detection time information stored in the memory at Step S931.

Then, the recording controller 223 generates a video file entry that manages a video content file that corresponds to a captured video generated by the imaging unit 211 (Step S939). The thumbnail address of this video file entry stores the thumbnail address of the representative thumbnail image stored in the thumbnail file 500 at Step S935. The appeared registered face list of the video file entry stores the entry number of the registered face entry stored in the memory at Step S931.

Then, the recording controller 223 opens the property file 400 of the content management file storage 250 (Step S940). Then, the recording controller 223 calculates an entry number for the generated metadata entry and the video file entry. And based on this calculation result, a metadata entry and a video file entry which were created are recorded on property file 400 (Step S941). In other words, the metadata entry and the video file entry are assigned to the property file 400 in order of slot numbers.

Then, the recording controller 223 stores the entry number of the metadata entry belonging to the video file entry in a child entry list of the video folder entry stored in the property file 400. In addition, the entry number of the video file entry that belongs to the metadata entry is stored in the parent entry list of this metadata entry (Step S942).

Then, the recording controller 223 stores the entry number of the video file entry in a child entry list of the video file entry where the video file entry stored in the property file 400. In addition, the entry number of the video folder entry is stored in the parent entry list of this video file entry (Step S943).

Then, the recording controller 223 records the entry number of this video file entry in the content list of appeared registered faces of the registered face entry corresponding to the entry number stored in the memory at Step 931 (Step S944). Here, Step S944 is an example of the procedure of control in accordance with the embodiment of the present invention. Subsequently, the recording controller 223 closes the property file 400 (Step S945) and then terminates the storage process of the content management file 340.

Next, an operation of playing a video content file from a scene where a desired characters appear when the video content file is played will be described with reference to the attached drawings.

Figure 34:
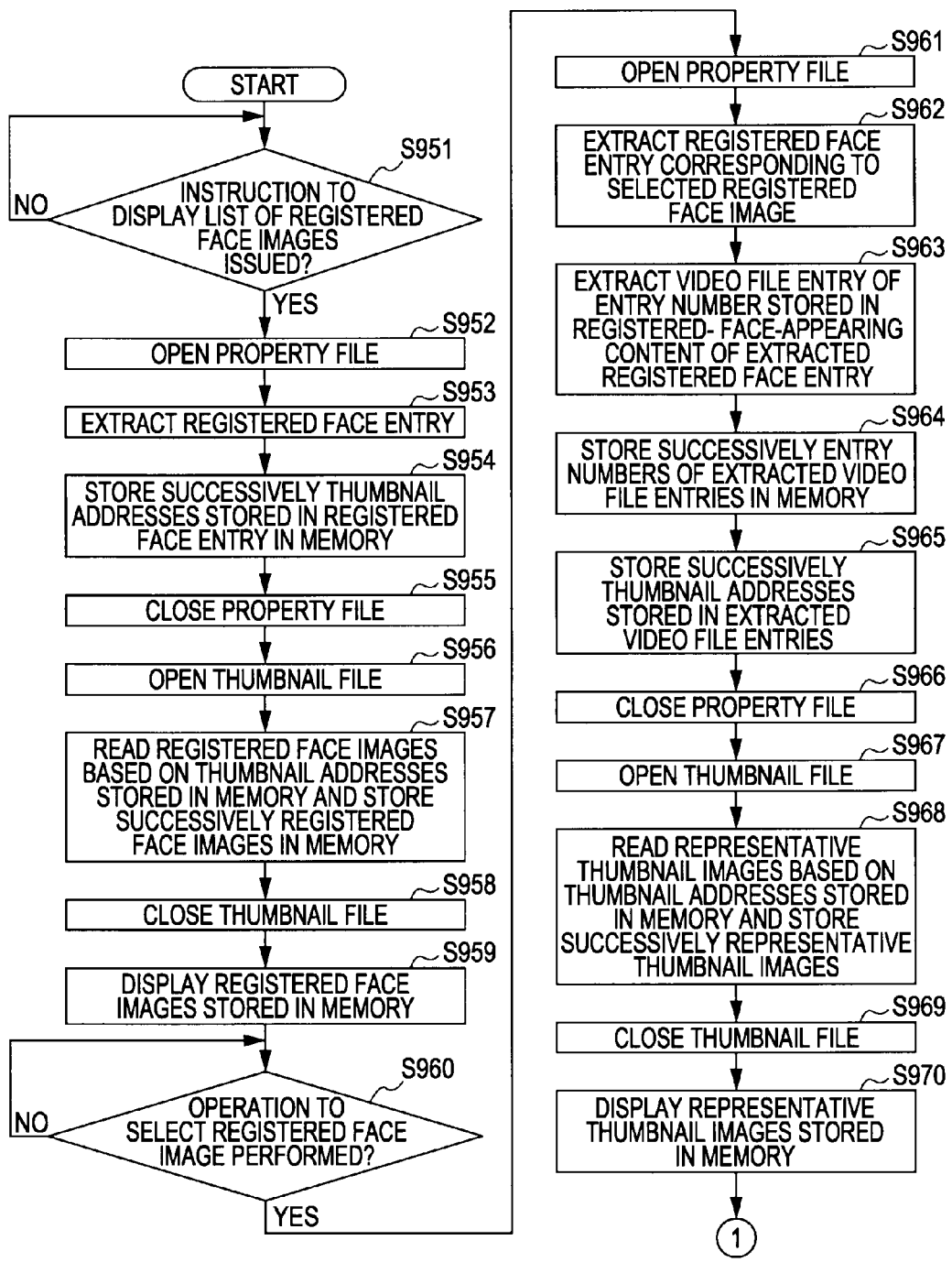
FIG. 34 is a flowchart of the procedures for playing a video content file by an imaging apparatus according to an embodiment of the present invention.
Figure 35:
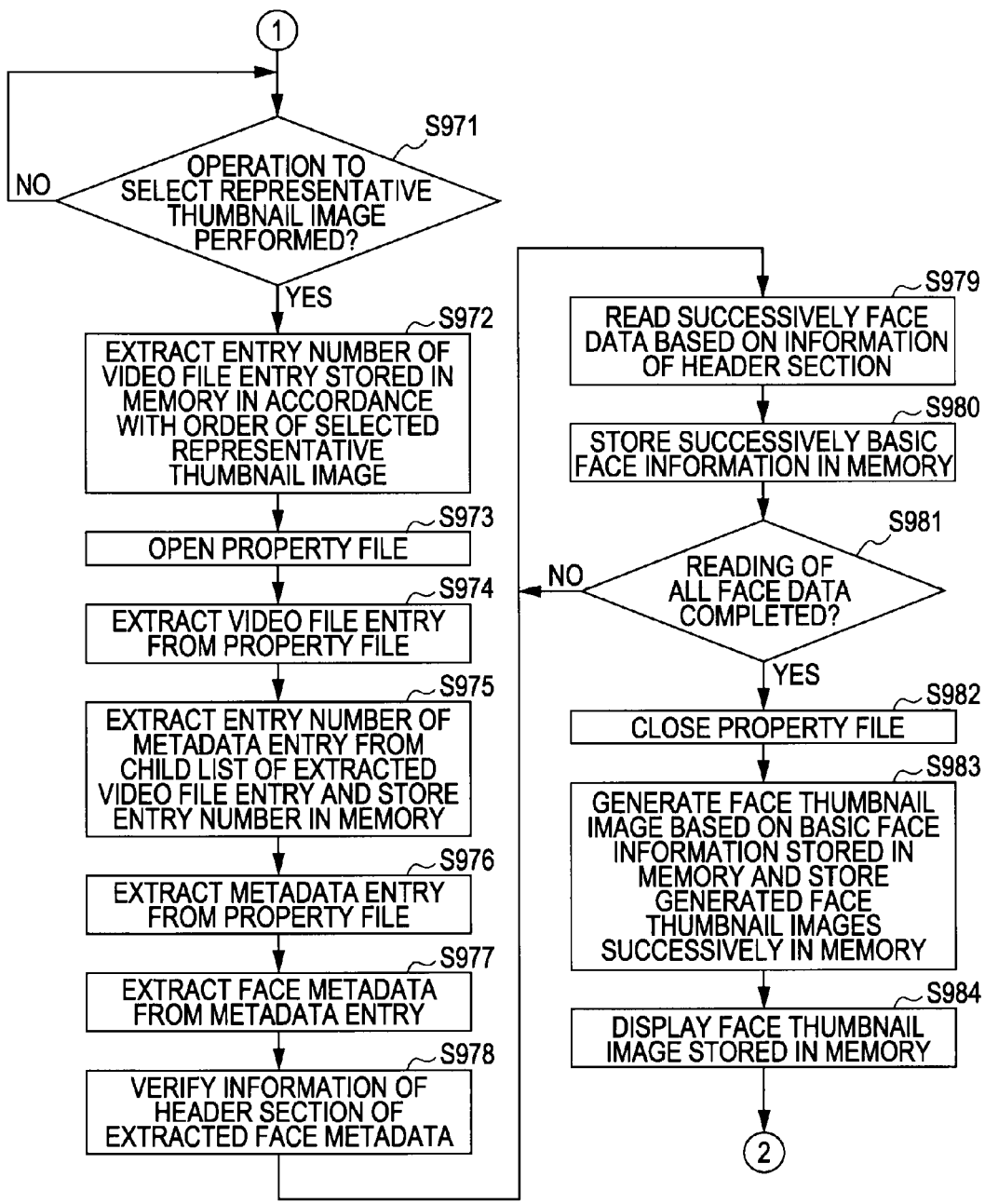
FIG. 35 is a flow of the procedures for playing a video content file by an imaging apparatus according to an embodiment of the present invention.
Figure 36:
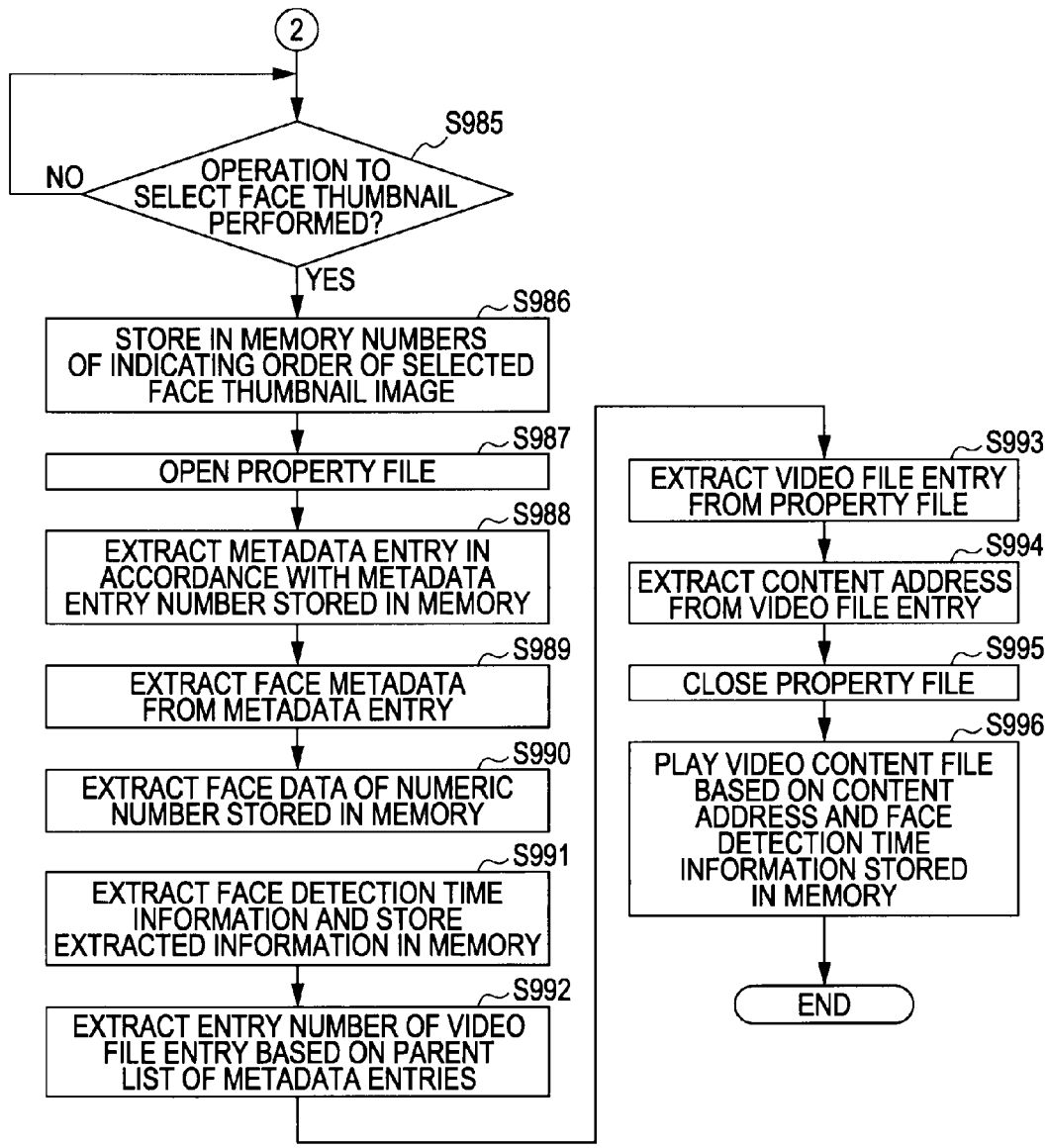
FIG. 36 is a flow of the procedures for playing a video content file by an imaging apparatus according to an embodiment of the present invention.

FIG. 34 to FIG. 36 are flowcharts of the procedures for playing a video content file by the imaging device 100 according to the embodiment of the present invention.

An operation input from the operation unit 140 is monitored to determine whether an instruction operation for displaying a list of registered face images is performed (step S951). If it is determined that no instruction of displaying the list of the registered face images is performed (Step S951), then the operation input is continuously monitored.

If the instruction operation for displaying a list of registered face images is carried out (Step S951), then the property file 400 is opened (Step S952) and each registered face entry is extracted from the property file 400 (Step S953). Then, thumbnail addresses currently stored in the respective extracted registered face entries are stored in the memory one by one (Step S954).

Then, the property file 400 is closed (Step S955) and the thumbnail file 500 is opened (Step S956). Then, registered images are read from the thumbnail file 500 based on the thumbnail addresses stored in the memory at Step S954 and then the read registered face images are then stored in the memory one by one (Step s957). Subsequently, the thumbnail file 500 is closed (Step S958). Then, the registered face images stored in the memory at Step S957 are displayed on the LCD 180 (Step S959). For example, these images may be displayed as shown in FIG. 28B.

Then, it is determined whether a selection operation for selecting one registered face image from all the registered face images displayed on the LCD 180 is performed (Step S960). If the selection operation for selecting the registered face image is not performed (Step S960), then the operation input is continuously monitored.

If the selection operation for selecting the registered image is performed (Step S960), then the property file 400 is opened (Step S961) and a registered face entry corresponding to the selected registered face image is extracted (Step S962). The entry number of a video file entry stored in an appeared registered face content list of the extracted registered face entry is extracted and a video file entry is then extracted based on the extracted entry number (Step S963). Subsequently, the entry numbers of the extracted video file entries are stored in the memory one by one (Step S964).

Thumbnail addresses currently stored in the extracted video file entries are stored in the memory one by one (Step S965). Then, the property file 400 is closed (Step S966) and the thumbnail file 500 is opened (Step S967). Subsequently, a representative thumbnail image is read from the thumbnail file 500 based on a thumbnail address stored in the memory at Step S964 and the representative thumbnail is then stored in the memory one by one (Step S968). Then, the thumbnail file 500 is closed (Step S969). The representative thumbnail images stored in the memory at Step S968 are displayed on the LC 180 (Step S970). For example, the images are displayed as shown in FIG. 29B.

It is determined whether a selection operation for selecting one representative thumbnail image from all the representative thumbnail images displayed on the LCF 180 (Step S971). If the selection operation for selecting the representative thumbnail image does not occur (Step S971), then the operation input is continuously monitored.

If the selection operation for selecting the representative thumbnail image is performed (Step S971), the entry numbers of the video file entries stored in the memory at Step S964 are extracted based on the order of the selected representative thumbnail images (Step S972). Then, the property file 400 is opened (Step S973) and video file entries corresponding to the extracted entry numbers are extracted from the property file 400 (Step S974).

Then, an entry number of a metadata entry currently recorded on a child entry list of extracted video file entries is extracted, and an entry number of an extracted metadata entry is recorded on a memory (Step S975). Then, metadata entries corresponding to the entry numbers stored at Step S975 are extracted from the property file 400 (Step S976). Then, face metadata is extracted from each of the extracted metadata entries (Step S977), and information on the header of the extracted face metadata is confirmed (Step S978).

Face data is read one by one based on the information of the header section (Step S979). Then, face basic information (face detection time information 641, face basic information 642, and personal identification ID 646) included in the read face data is stored in the memory one by one (Step S980). Then, it is judged whether read-out of all the face data is completed (Step S981). If no read-out of face data is completed (Step S981), read-out of face data and record in a memory are continued (Step S979 and Step S980). If read-out of all the face data is completed (Step S981), the property file 400 is closed (Step S982). Furthermore, on the basis of the face basic information stored in the memory at Step 980, a face thumbnail image is generated from a video content file based on face basic information stored in the memory at Step S980 and the generated face thumbnail image is then stored in the memory one by one (Step S983). Then, a face thumbnail image stored in the memory at Step S983 is displayed on the LCD 180 (Step S984). For example, it is displayed as shown in FIG. 30B.

Then, it is determined whether a selection operation for selecting one face thumbnail image from face thumbnail images displayed on the LCD 180 (Step S985). If the selection operation for selecting the face thumbnail image is not performed (Step S985), then the operation input is continuously managed.

If the selection operation for selecting the face thumbnail image is performed (Step S985), then numbers are stored in the memory in the order of displaying the selected face thumbnail images (Step S986). The property file 400 is opened (Step S987) and a metadata entry is then extracted from the property file 400 based on the entry number of the metadata entry stored in the memory at Step S975 (Step S988).

Face metadata is extracted from the extracted metadata entry (Step S989) and face data corresponding to the number stored in the memory at Step S986 is then extracted from the extracted face metadata (Step S990). Face detection time information is extracted from the extracted face data and the extracted face detection time information is then stored in the memory (Step S991).

Subsequently, the entry number of a video file entry corresponding to the parent entry of the metadata entry stored in the memory at Step S975 is extracted (Step S992). Then, a video file entry corresponding to the extracted entry number is extracted from the property file 400 (Step S993). A content address stored in the extracted video file entry is extracted and the extracted content address is then stored in the memory (Step S994). The property file 400 is closed (Step S995).

A video content file corresponding to the content address extracted at Step S957 starts to be played from the time indicated by the face detection time information started in the memory in step S991 (step S996). For example, the video content file is played as shown in FIG. 31B.

Next, an image processing system having an imaging apparatus 100 according to one embodiment of the present invention will be described.

Figure 37:
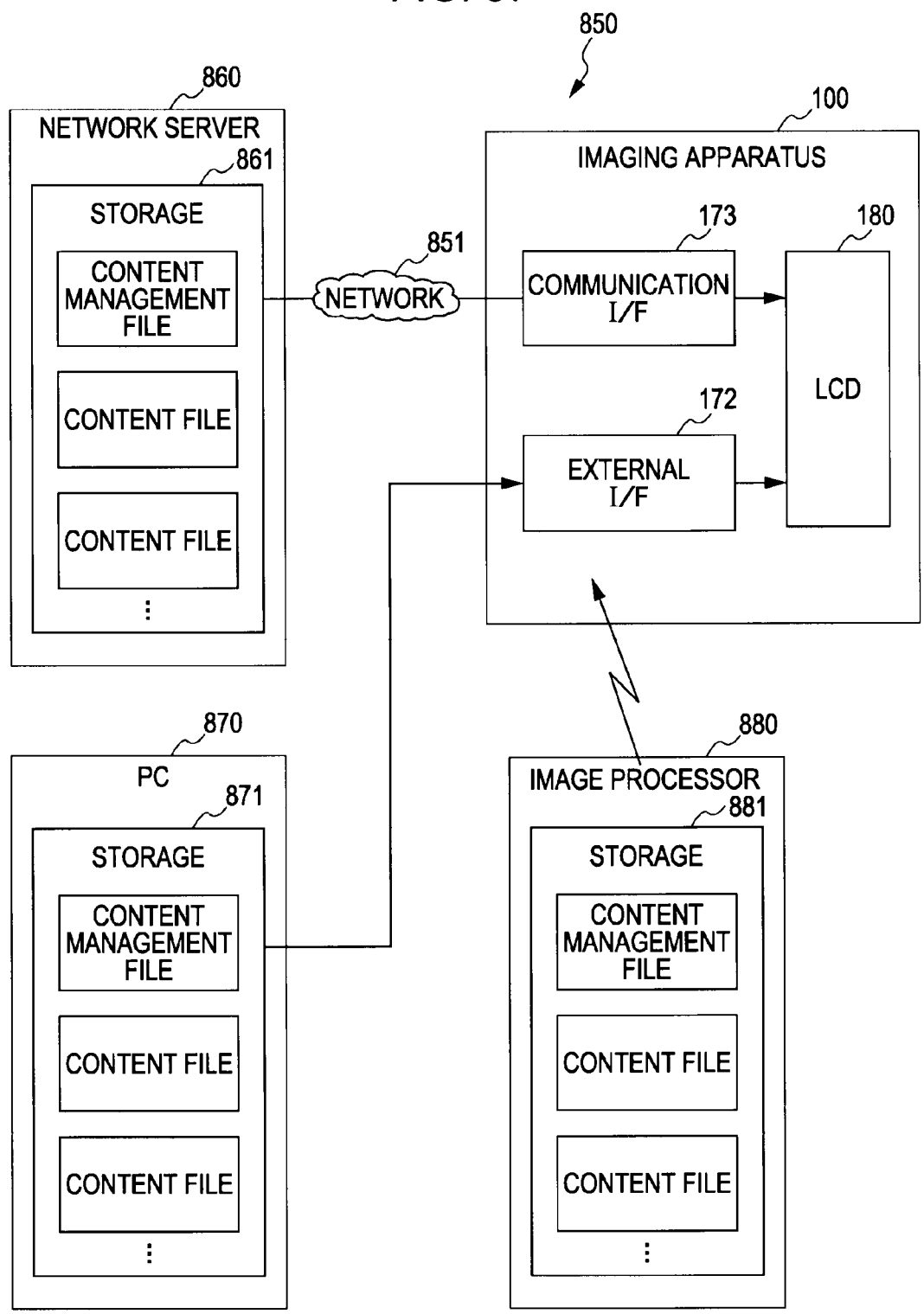
FIG. 37 illustrates a system configuration of an image processing system according to the present embodiment.

FIG. 37 illustrates a system configuration of an image processing system 850 according to the present embodiment. The image processing system 350 includes the imaging apparatus 100, a network server 860, a PC 870, and an image processing device 880. The network server 860 is capable of communicating with the imaging apparatus 100 via a network 851. The network server 860 includes a storage section 861 that stores a content file and a content management file.

The PC 870 is capable of communicating with the imaging apparatus 100 via an inter-device such as an universal serial bus (USB). The PC 870 includes a storage section 871 that stores a content file and a content management file. The inter-device interface may be a wireless interface such as one of an ultra wide band (UWB) type in addition to a wired interface such as a USB cable.

The image processing device 880 is capable of communicating with the imaging apparatus 100 via a wireless line. The image processing device 880 includes a storage section 881 that stores a content file and a content management file. Alternatively, these connections may be made via a network using a wired line or a wireless line.

Here, each of the content management files stored in the storage sections 861, 871, and 881 may be the same as the content management file 340 of the embodiment of the invention.

The same personal identification ID is given to the same person in image processing system 850. In other words, for example, the personal identification ID stored in the content management file in each of the storage sections 861, 871, and 881 and the personal identification ID stored in the imaging apparatus 100 are used for finding a desired content file from all the content files stored in the storage sections 861, 871, and 881. For example, the imaging apparatus 100 is able to obtain the content file in which the personal identification ID is identical to one stored in the imaging apparatus 100. Therefore, the imaging apparatus 100 easily acquires a contents file where a particular parson appears from an external device. In addition, a face thumbnail image or the like about the content file stored in the external device may be displayed using the personal identification ID.

As described above, according to the embodiment of the present invention, any content file where a particular parson appears can be quickly searched. For example, a list of representative thumbnail images corresponding to content files where a particular parson appears. Therefore, a desired application can be quickly performed. In addition, metadata of the content file can be quickly used. In other words, according to the embodiment of the present invention, the content file where a personal person appears can be quickly used.

A large number of application programs using the face metadata are currently being developed and a variety of application programs using the face metadata are expected to be available in future. Also, format extension of the face metadata is expected in future. In accordance with any of embodiments of the present invention, the player device assures compatibility with a format extension even if the format of the face metadata is extended in future. The metadata of the content file is used quickly.

Furthermore, the present embodiment has been described using the captured vide as a content. Alternatively, the present invention may be applied to any of other contents such as a still image. In addition, the present embodiment may be applied to any of contents input from the outside. The face metadata of a human's face has been described as an example of metadata. Alternatively, the present embodiment is applicable to any of other metadata. For example, a face of an animal contained in an image is detected using an animal recognition or pet recognition algorithm and metadata related to the detected animal face is used. The embodiment of the present invention is also applicable in such an application. A pet detection engine is substituted for the face detection engine. The metadata related to a pet detected by the pet detection engine is used. The embodiments of the present invention may also be applicable in such an application. Behavior of persons or animals is recognized and metadata containing a record of the recognized behavior expressed in a predetermined description is used. The embodiments of the present invention may also applicable in such an application. The content storage device is an imaging device in the above discussion. The embodiments of the present invention may also applicable to a content storage device such as a mobile terminal recording a content file. Furthermore, in the embodiment of the present invention, the imaging apparatus has been described as an example of a device for playing contents. The embodiments of the present invention may also applicable to a content player device such as a digital versatile disc (DVD) recorder playing content.

The embodiments of the present invention have been described for exemplary purposes only, and correspondence between elements of the claim and the features of the embodiments of the present invention are described below. The present invention is not limited to the above-reference embodiments and a variety of changes are possible to the above-described embodiment without departing from the scope of the present invention.

The series of steps described above may be identical to one of a method including the series of steps, a computer program for causing a computer to perform the series of steps and a recording medium storing the computer program. The recording medium may be a compact disc (CD), a mini disc (MD), a digital versatile disc (DV), a memory card, a Blue-ray Disc (registered trade mark), or the like.

The present application contains subject matter related to that disclosed in Japanese Priority Patent Application JP 2008-201295 filed in the Japan Patent Office on Aug. 4, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
a storage section configured to store a content management file that stores a file entry for managing contents and a particular face entry for managing a particular face which is a face of a particular person, where each of said file entry and said particular face entry is a hierarchical entry with a hierarchical structure in the content management file;
a face detection unit configured to detect a face contained in said contents;
a face discrimination unit configured to determine whether said detected face is said particular face by comparing said particular face with said detected face; and
a control unit configured to register said particular face entry with said file entry when said detected face is identified as said particular face, wherein said file entry identifies a content of said contents, and includes a list of registered faces appearing in said content, and
said particular face entry identifies said face of said particular person, and includes a list of contents of said contents in which said face has been detected.

2. The image processing device according to claim 1, further comprising:
a feature quantity extractor for extracting feature quantity of said detected face, wherein
a feature quantity entry, which is a hierarchical entry and contains feature quantity of said particular face, is linked to a lower layer of said particular face entry and stored in said content management file; and
said face discrimination unit determines whether said detected face is said particular face by comparing said feature quantity contained in said feature quantity entry with said extracted feature quantity.

3. The image processing device according to claim 2, wherein
said content management file stores metadata which is a hierarchical entry containing face data corresponding to said detected face while said metadata is linked to a lower layer of said file entry; and
said control unit stores said extracted feature quantity in said face data contained in said metadata entry when said detected face is identified as said particular face.

4. The image processing device according to claim 1, wherein
said particular face entry stores a particular person identifier that identifies said particular person;
said content management file stores metadata which is a hierarchical entry containing face data corresponding to said detected face while said metadata is linked to a lower layer of said file entry; and
said control unit stores said particular person identifier in said face data contained in said metadata entry when said detected face is identified as said particular face.

5. The image processing device according to claim 1, wherein
each of said hierarchical entries is provided with an entry identifier for identifying said hierarchical entry, and
said control unit correlates said particular face entry with said file entry by storing an entry identifier of said file entry in said particular face entry when said detected face is identified as said particular face.

6. The image processing device according to claim 1, wherein
said content management file stores a particular face image containing at least a part of said particular face, and
said particular face entry stores a storage position of said particular face image on said content management file.

7. The image processing device according to claim 1, wherein:
said file entry is identified, from among other file entries included in said content management file, by a file entry identifier; and
said list of contents included in said particular face entry is a list of file entry identifiers.

8. The image processing device according to claim 1, wherein:
said file entry identifies a content address of said content, and a thumbnail address of a thumbnail corresponding to said content; and
said particular face entry identifies a thumbnail address of a thumbnail corresponding to said face of said particular person.

9. The image processing device according to claim 1, wherein said file entry and said particular face entry are provided in separate hierarchies of a common root entry.

10. The image processing device according to claim 1, wherein said content management file is a separate file from said contents.

11. An image processing device, comprising:
a content storage unit configured to store contents;
a content management file storage unit configured to store a content management file with a hierarchical structure, which stores each of hierarchical entries provided with respective entry identifiers for identifying the corresponding hierarchical entries, where
said content management file includes
  a file entry which is a hierarchical entry for managing a content of said contents, said file entry identifying said content from among said contents, and including a list of registered faces appearing in said content, and
  a particular face entry provided as a hierarchical entry for managing a particular face which is a face of a particular person and provided for storing an entry identifier of a file entry corresponding to a content containing said particular face among contents stored in said content storage unit, and
  a particular face image provided as an image containing at least a part of said particular face and correlated with said particular face entry;
an operation input receiver configured to receive a selection operation for selecting a desired particular face image from particular face images currently stored in said content management file;
a selector configured to select a particular face entry corresponding to said selected particular face image from particular face entries currently stored in said content management file;
an extractor configured to extract content corresponding to an entry identifier currently stored in said selected particular face entry from contents stored in said content storage unit; and
a display to display said extracted content.

12. An imaging apparatus, comprising:
a storage unit configured to store a content management file that stores a file entry for managing a captured video and a particular face entry for managing a particular face which is a face of a particular person, where each of said file entry and said particular face entry is a hierarchical entry with a hierarchical structure in the content management file;
an imaging unit configured to capture an image of a subject to generate captured video;
a face detection unit configured to detect a face contained in said captured video;
a face discrimination unit configured to determine whether said detected face is said particular face by comparing said particular face with said detected face; and
a control unit configured to register said particular face entry with said file entry when said detected face is identified as said particular face by adding, to said file entry, said particular face to a list of appearing registered faces of said file entry and by adding, to said particular face entry, said content to a list of contents where said particular face appears of said particular face entry.

13. An image processing method, comprising the steps of:
detecting a face contained in a content;
discriminating faces by determining whether said detected face is a particular face by comparing said particular face with said detected face; and
performing control of a content management file including a file entry and a particular face entry, including correlating said file entry which is a hierarchical entry for managing said content with said particular face entry which is a hierarchical entry for managing said particular face when said detected face is identified as said particular face, including adding, to said file entry, said particular face to a list of appearing registered faces included in said file entry, and by adding, to said particular face entry, said content to a list of contents where said particular face appears included in said particular face entry.

14. A non-transitory computer readable medium storing a program, which when executed by a computer, causes the computer to execute procedures comprising:
a face-detecting procedure for detecting a face contained in a content;
a face-discriminating procedure for discriminating faces by determining whether said detected face is a particular face by comparing said particular face with said detected face; and
a control procedure for performing control of a content management file including a file entry and a particular face entry, including correlating said file entry which is a hierarchical entry for managing said content with said particular face entry which is a hierarchical entry for managing said particular face when said detected face is identified as said particular face, including adding, to said file entry, said particular face to a list of appearing registered faces included in said file entry and by adding, to said particular face entry, said content to a list of contents where said particular face appears included in said particular face entry.

* * * * *